(12) United States Patent
Fraser et al.

(10) Patent No.: US 9,708,205 B2
(45) Date of Patent: Jul. 18, 2017

(54) DEVICES FOR THE TREATMENT OF LIQUIDS USING PLASMA DISCHARGES AND RELATED METHODS

(71) Applicant: Reverse Ionizer Systems, LLC, Bethesda, MD (US)

(72) Inventors: Desmond A. Fraser, Herndon, VA (US); Patrick J. Hughes, Vienna, VA (US); Hossein Ghaffari Nik, Fairfax, VA (US); Akrem Hassen Adem Aberra, Fairfax, VA (US); Richard B. McMurray, Fairfax, VA (US); Shelley Marie Grandy, Fairfax, VA (US)

(73) Assignee: Reverse Ionizer Systems, LLC, Bethesda, MD (US)

( * ) Notice: Subject to any disclaimer, the term of this patent is extended or adjusted under 35 U.S.C. 154(b) by 0 days.

(21) Appl. No.: 15/069,971

(22) Filed: Mar. 15, 2016

(65) Prior Publication Data
US 2016/0251240 A1  Sep. 1, 2016

Related U.S. Application Data

(63) Continuation-in-part of application No. 14/979,501, filed on Dec. 27, 2015, which is a continuation-in-part of application No. 14/821,604, filed on Aug. 7, 2015, which is a continuation-in-part of application No. 14/820,550, filed on Aug. 6, 2015, which is a continuation-in-part of application No.
(Continued)

(51) Int. Cl.
*C02F 1/48* (2006.01)
*C02F 1/46* (2006.01)
*C02F 1/00* (2006.01)

(52) U.S. Cl.
CPC .............. *C02F 1/484* (2013.01); *C02F 1/008* (2013.01); *C02F 1/4608* (2013.01); *C02F 1/487* (2013.01); *C02F 2201/46* (2013.01); *C02F 2201/483* (2013.01); *C02F 2209/008* (2013.01); *C02F 2303/04* (2013.01); *C02F 2303/08* (2013.01); *C02F 2303/22* (2013.01); *C02F 2307/14* (2013.01)

(58) Field of Classification Search
CPC .......... C02F 1/48; C02F 1/487; C02F 1/4602; C02F 2301/08
See application file for complete search history.

(56) References Cited

U.S. PATENT DOCUMENTS 5,152,341 A   10/1992   Kasevich
5,326,446 A   7/1994   Binger
(Continued)

FOREIGN PATENT DOCUMENTS

WO   WO2007133634   11/2007

OTHER PUBLICATIONS http://www.dolphinwatercare.com/how-the-dolphin-system-works, Dolphin Watercare web site, "How it works: The Technology of Sustainable Water Treatment".
(Continued)

*Primary Examiner* — Bryan D. Ripa
(74) *Attorney, Agent, or Firm* — Capitol Patent & Trademark Law Firm, PLLC; John Curtin

(57) ABSTRACT

Plasma discharges and electromagnetic fields may be applied to a liquid, such as water, to treat unwanted material in the liquid.

19 Claims, 52 Drawing Sheets

Related U.S. Application Data

14/624,552, filed on Feb. 17, 2015, which is a continuation-in-part of application No. 14/170,546, filed on Jan. 31, 2014.

(60) Provisional application No. 61/759,345, filed on Jan. 31, 2013.

(56) References Cited

U.S. PATENT DOCUMENTS

| | | | |
|---|---|---|---|
| 5,568,121 A | 10/1996 | Lamensdorf | |
| 5,667,677 A * | 9/1997 | Stefanini | B01J 19/12 210/222 |
| 6,063,267 A | 5/2000 | Crewson et al. | |
| 6,267,933 B1 * | 7/2001 | Thomason | A01J 7/00 204/663 |
| 6,375,829 B1 | 4/2002 | Shevchenko et al. | |
| 6,641,739 B2 | 11/2003 | Dresty et al. | |
| 7,244,360 B2 | 7/2007 | Cho | |
| 7,419,603 B2 | 9/2008 | Cho | |
| 2001/0035342 A1 * | 11/2001 | Morse | B01J 19/087 204/164 |
| 2004/0141876 A1 * | 7/2004 | Paskalov | A61L 2/08 422/22 |
| 2005/0199484 A1 | 9/2005 | Olstowski | |
| 2011/0240567 A1 * | 10/2011 | Zolezzi-Garreton | C02F 1/4608 210/748.17 |
| 2011/0284231 A1 | 11/2011 | Becker | |
| 2013/0277045 A1 | 10/2013 | Parsche | |
| 2014/0216936 A1 | 8/2014 | Hughes et al. | |
| 2014/0326681 A1 * | 11/2014 | Denvir | C02F 1/4608 210/748.02 |
| 2014/0374236 A1 | 12/2014 | Moore et al. | |

OTHER PUBLICATIONS

Cho et al., "Mitigation of Calcium-Carbonate Fouling Using RF Electric Fields", Proc. of Intl. Conf. on Heat Exchange Fouling and Cleaning VIII, pp. 384-391, 612009, Austria.

* cited by examiner

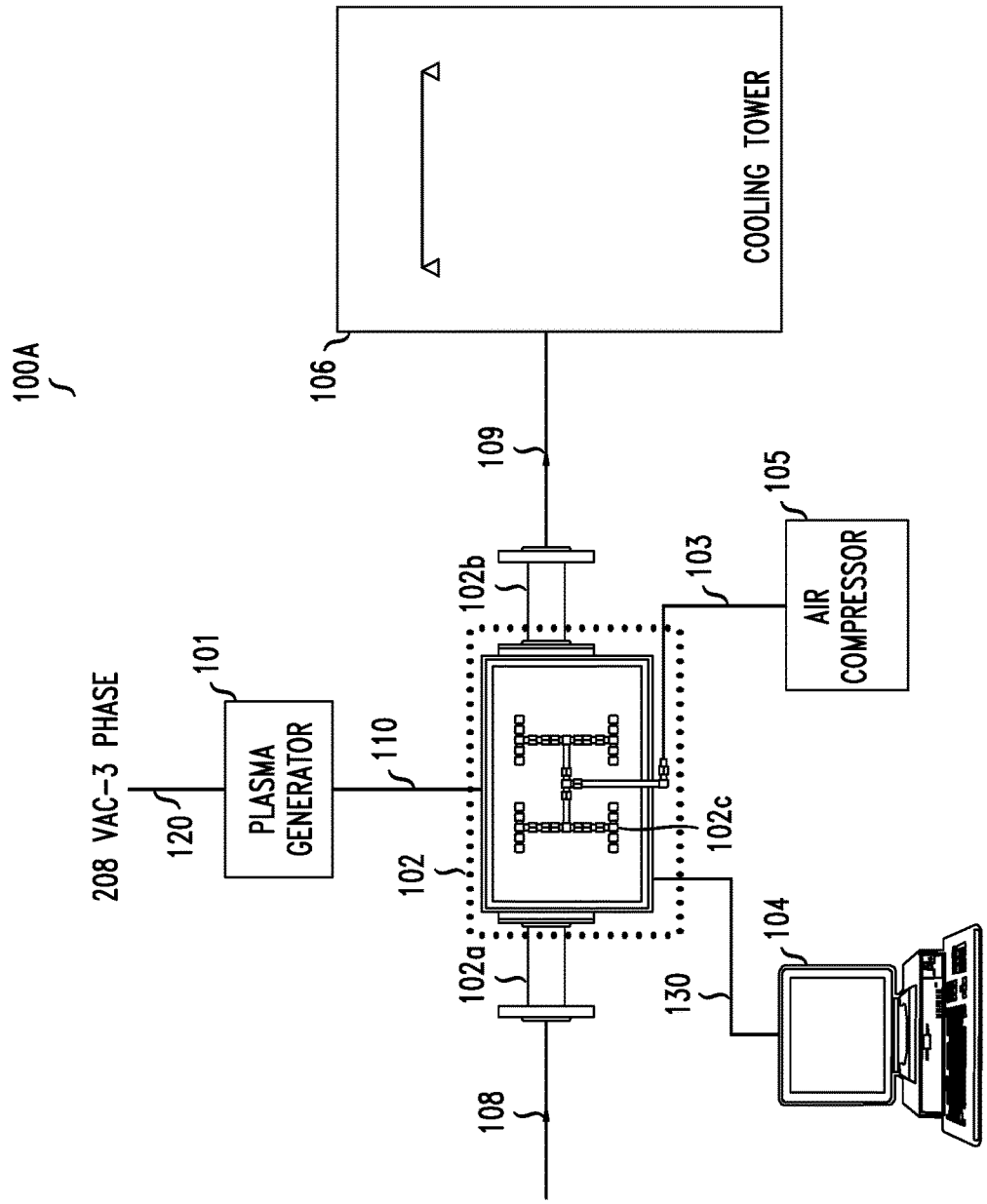

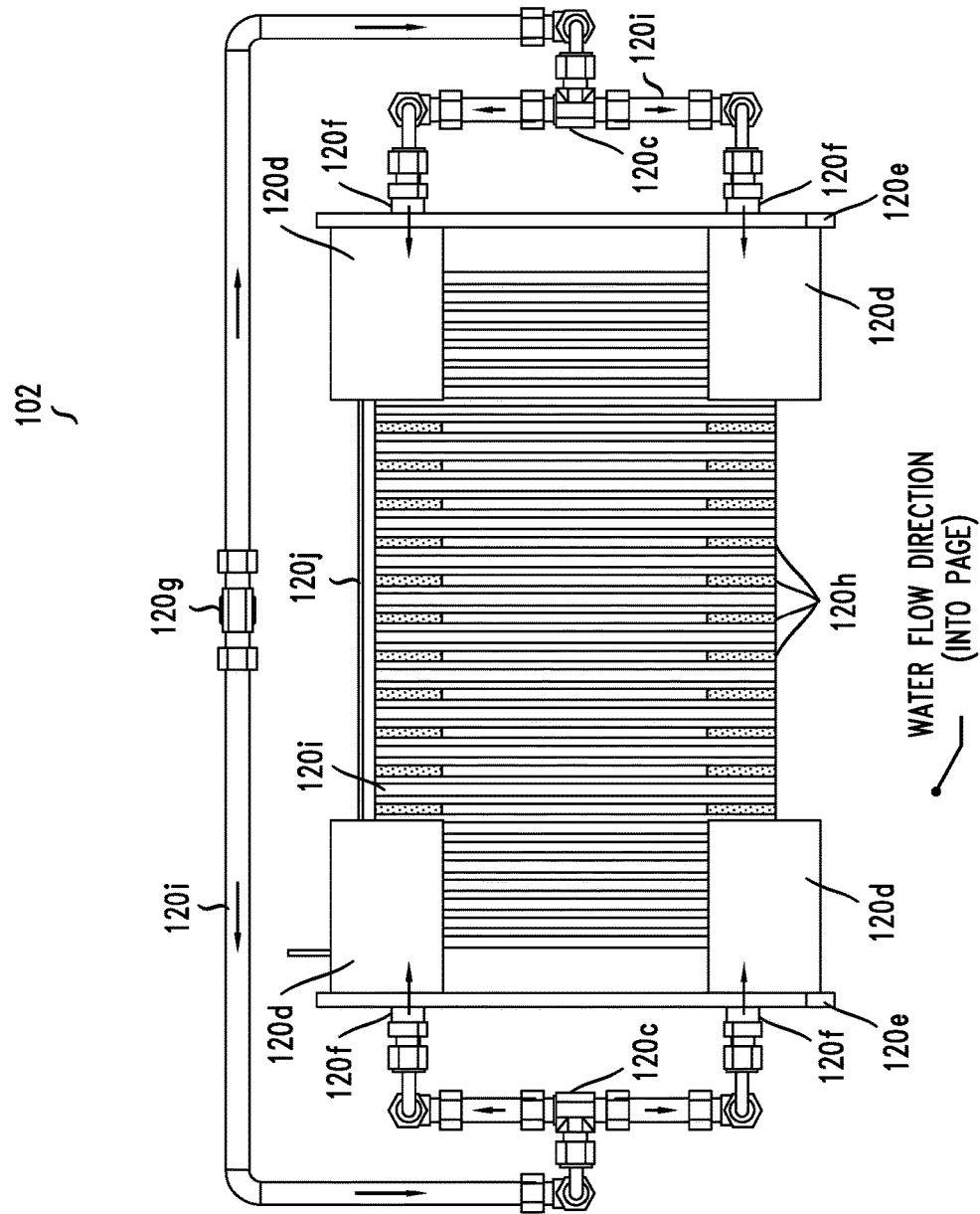

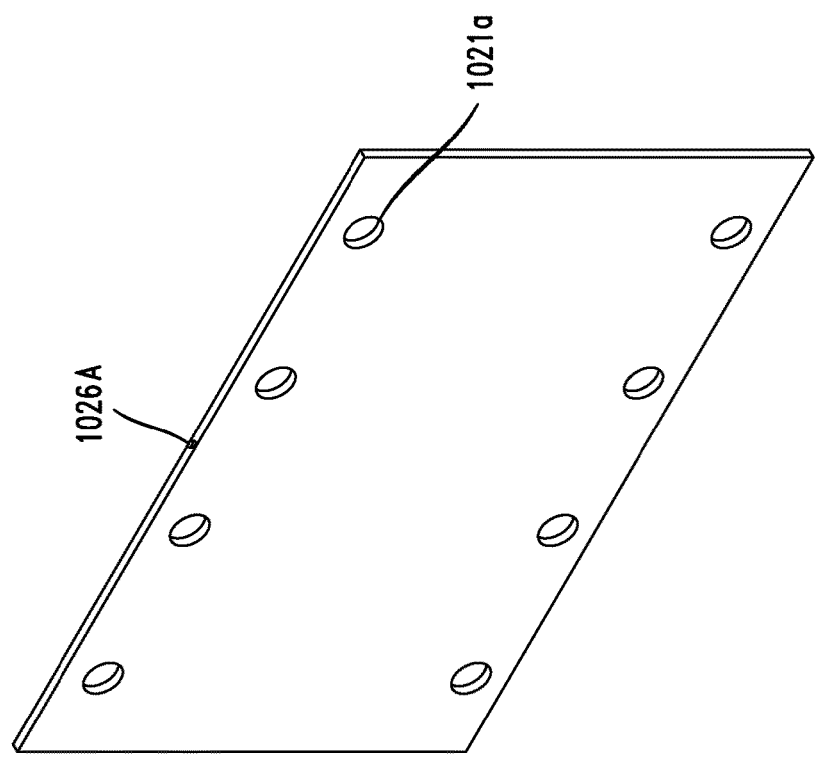

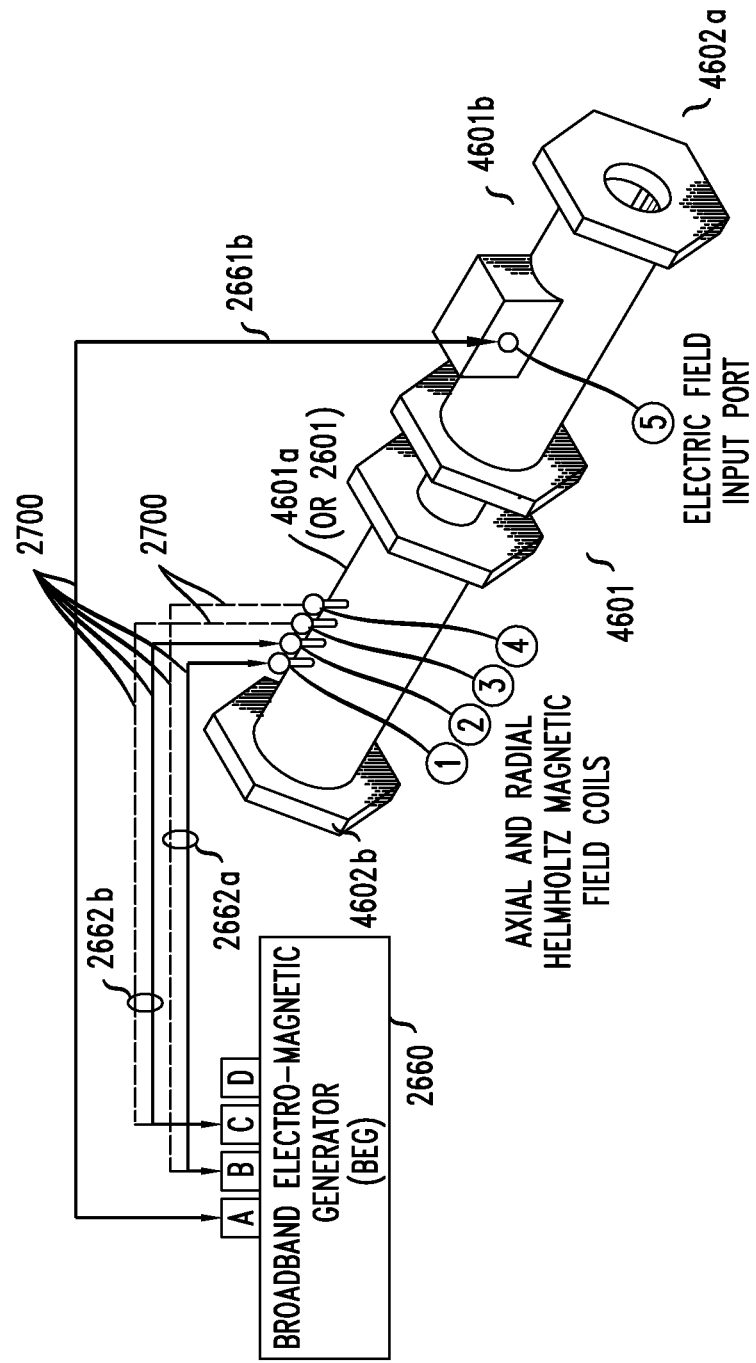

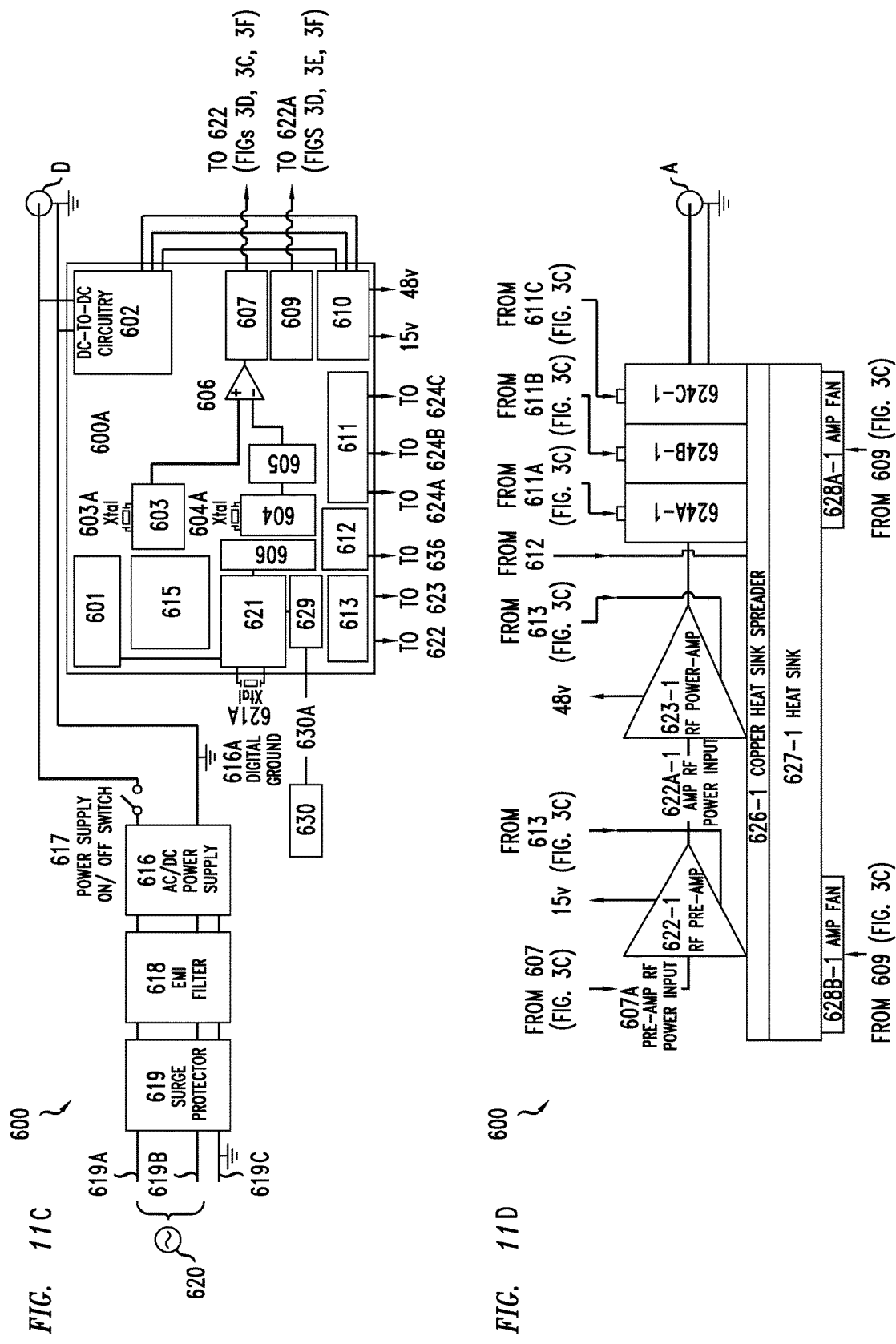

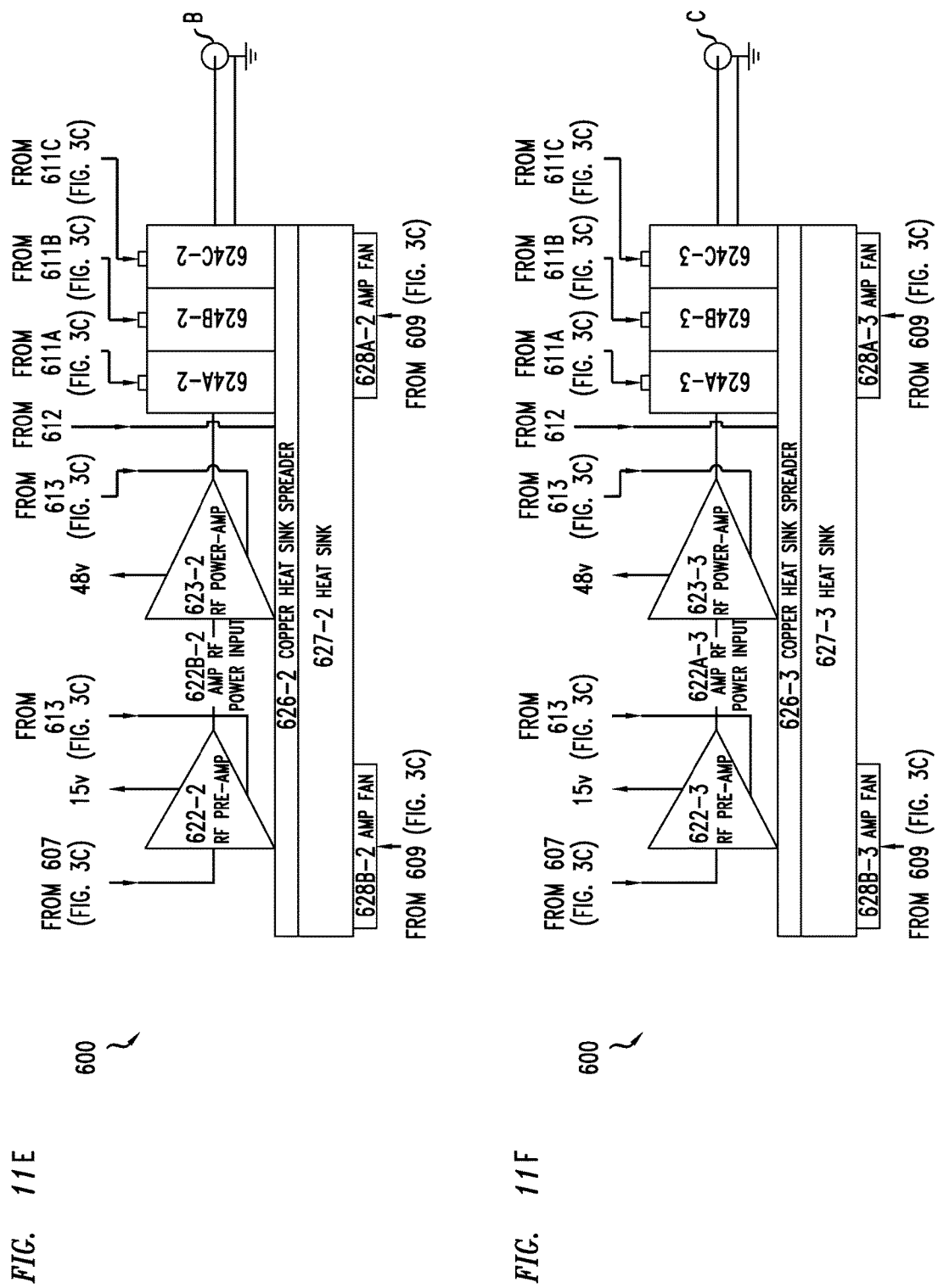

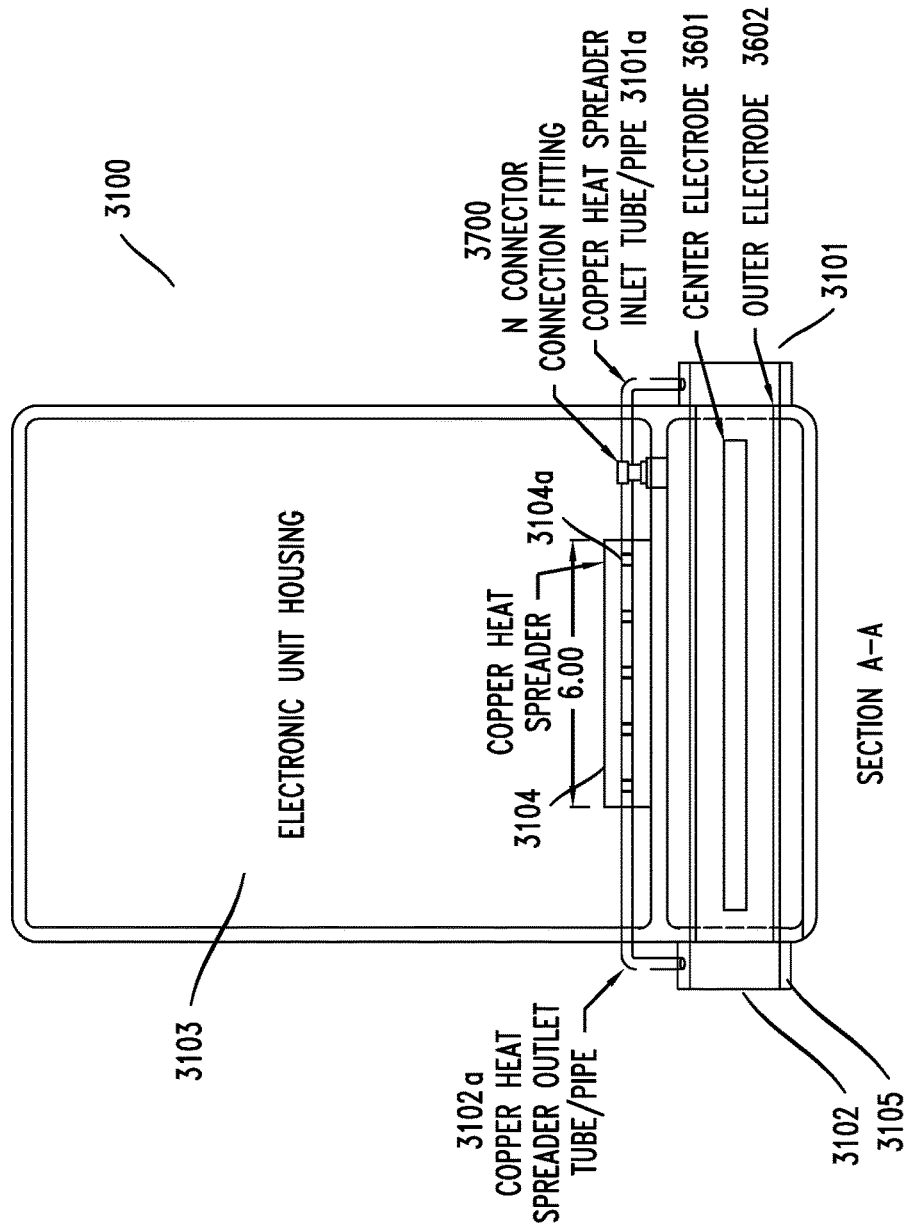

DEVICES FOR THE TREATMENT OF LIQUIDS USING PLASMA DISCHARGES AND RELATED METHODS

RELATED APPLICATIONS

This application is related to U.S. patent application Ser. No. 14/979,501 filed Dec. 27, 2015, ("'979 Application"), U.S. patent application Ser. No. 14/821,604 filed Aug. 7, 2015, ("'604 Application"), U.S. patent application Ser. No. 14/820,550 filed Aug. 6, 2015 ("'550 Application"), U.S. patent application Ser. No. 14/624,552 filed Feb. 17, 2015 ("'552 Application"), U.S. patent application Ser. No. 14/170,546 filed Jan. 31, 2014 ("'546 Application") and U.S. Provisional Patent Application No. 61/759,345 filed Jan. 31, 2013 ("'345 Application"). The present application incorporates by reference herein the entire disclosures of the '979, '604, '550, '552, '546 and '345 Applications, including their text and drawings, as if set forth in their entirety herein.

INTRODUCTION

Devices and methods for treating unwanted material in liquids have been proposed. Many of these devices and methods use electromagnetic fields to purify or alter the characteristics of water. For example, the '979, '604, '550, '552, '546 and '345 applications mentioned above use electromagnetic fields to treat ionic (mineral) impurities, biological contaminants and scale formations.

However, it is desirable to provide devices and methods for treating liquids that provide additional capabilities for eliminating bacterial and biological contaminants as well as removing ionic impurities, such as those related to unwanted scale deposits.

SUMMARY

Devices, systems and related methods for treating unwanted material (e.g., ions of calcium carbonate, a bacteria or biological contaminant) in liquids with plasma discharges and/or electromagnetic fields are provided. The devices, systems and methods disclosed herein are particularly applicable to treating liquids, such as water, in a water transport system.

According to one embodiment, an exemplary system for treating unwanted material in a liquid may comprise the following components: (a) a dual-field electromagnetic device (EM) section comprising an immersible magnetic field section operable to generate a time-varying magnetic field and an induced electric field in a liquid, and an immersible electric field section operable to generate a time-varying electric field, and an induced magnetic field in the liquid; and (b) a plasma discharge section comprising a plurality of immersible and parallel, dielectric barrier discharge elements, where the number of elements varies based on a desired mass flow rate, and each element comprises negatively charged and positively charged electrodes operable to generate one or more plasma discharges within the liquid to create reactive and molecular species of ions in the liquid.

The plurality of immersible and parallel, dielectric barrier discharge elements may comprise either double dielectric barrier discharge elements (DDBD) or single dielectric barrier discharge (DBD) elements. Further, each of the plurality of dielectric barrier discharge elements may comprise an isolation section operable to physically separate and electrically isolate the electrodes and create channels within each element.

In embodiments the immersible electric field section may comprise at least two immersible elements, where one of the elements is a positively charged element and the other element is a negatively charged element. The element may be configured in a variety of shapes, including cylindrical.

In embodiments, the immersible magnetic field section is operable to generate a time-varying magnetic field modulated at an ionic cyclotron frequency of an unwanted material in a liquid, and the immersible electric field section is further operable to generate a time-varying electric field modulated at the ionic cyclotron frequency.

In another embodiment the system may also include impedance matching circuitry that is operable to maintain an impedance of the EM device, a signal generator and a transmission medium connecting the EM device and generator at a matched impedance, and maintain a constant amplitude of an electric field created by the electric field section and a constant amplitude of a magnetic field created by the magnetic field section.

In yet another embodiment a system for treating unwanted material (e.g., ions of calcium carbonate, a bacteria or biological contaminant) in a liquid may comprise (a) a dual-field EM device section, the EM device section comprising an immersible magnetic field section operable to generate a time-varying magnetic field modulated at an ionic cyclotron frequency of unwanted material in a liquid and an induced electric field, and apply the time varying magnetic field and induced electric field to unwanted material in a liquid, and an immersible electric field section operable to generate a time-varying electric field modulated at the ionic cyclotron frequency, and an induced magnetic field, and apply the time-varying electric field and induced magnetic field to the unwanted material at the same time as the magnetic field section is applying the generated magnetic field and the induced electric field; (b) a plasma discharge section comprising a plurality of immersible and parallel, dielectric barrier discharge elements, where the number of elements varies based on a desired mass flow rate, and each element comprises negatively charged and positively charged electrodes operable to generate one or more plasma discharges within the liquid to create reactive and molecular species of ions in the liquid; and (c) a signal generator operable to output a time-varying signal modulated at the ionic cyclotron frequency to the immersible magnetic field section and the immersible electric field section of the dual-field EM device section.

As before, this the plurality of immersible and parallel, dielectric barrier discharge elements within such a system may comprise double dielectric barrier discharge elements or single dielectric barrier discharge elements, where each of the dielectric barrier discharge elements comprises an isolation section operable to physically separate and electrically isolate the electrodes and create channels within each element.

In this embodiment (as well as others described elsewhere herein) the signal generator may be further operable to output an oscillating or uniform time-varying signal modulated at the ionic cyclotron frequency to the immersible magnetic field section. The signal generator may be an integrated signal generator and further operable to generate or adjust a carrier frequency, percentage of modulation, modulation frequency, modulation waveform, output gain or offset levels of the time-varying signal.

In this embodiment (as well as others described elsewhere herein) the system may further comprise a controller that is operable to determine a carrier frequency of the time-varying signal and a modulation signal corresponding to an ionic cyclotron frequency, and control the signal generator to output the time-varying signal at the determined carrier frequency and including the determined modulation signal. The controller may be further operable to determine a percentage of modulation, a modulation frequency of the modulation signal, modulation waveform of the modulation signal, output gain or offset levels of the time-varying signal, and control the signal generator to output the time-varying signal and the modulation signal using the determined percentage of modulation, modulation frequency, modulation waveform, output gain and offset levels.

This embodiment, as well as other described elsewhere herein, may comprise a graphical user interface (GUI) for displaying a combination of a fouling resistance, conductivity, power consumption, turbidity, corrosion, pH, and temperatures of the liquid and pump speeds, fan speeds, flow rates, biofouling, saturation index, hot/cold temperature differentials of components of the system used to treat the liquid, as well as parameters and data associated with a plasma discharge section. The GUI may be part of an apparatus that communicates remotely with the signal generator.

Still further, such an embodiment may yet further comprise an impedance matching circuitry operable to maintain an impedance of the EM device section, the generator and a transmission medium connecting the EM device section and generator at a matched impedance, and maintain a constant amplitude of the electric field and a constant amplitude of the magnetic field.

In addition to the embodiments previously described the present invention may further provide for a device for treating unwanted material in a liquid, where such a device comprises a plasma discharge device comprising a plurality of immersible and parallel, dielectric barrier discharge elements, where the number of elements varies based on a desired mass flow rate, and each element comprises negatively charged and positively charged electrodes operable to generate one or more plasma discharges within the liquid to create reactive and molecular species of ions in the liquid, and an isolation section operable to physically separate and electrically isolate the electrodes and create channels within each element.

It should be understood that the present invention also provides related methods or processes that comprise steps that correspond to the functions and features of the embodiments described above and herein. For the sake of clarity, the inventors will not repeat such steps here.

Additional devices, systems, related methods, features and advantages of the invention will become clear to those skilled in the art from the following detailed description and appended drawings.

BRIEF DESCRIPTION OF THE DRAWINGS

FIG. 1A is a simplified block diagram showing exemplary, inventive devices within an exemplary water transport system for treating unwanted material in a liquid according to an embodiment.

FIG. 2 depicts an internal view of an exemplary, inventive device for treating unwanted material in a liquid according to an embodiment.

FIGS. 5A and 5B depict configurations of a component of an element shown in FIG. 3 or 4A through 4C.

FIGS. 10H through 10M depict simplified electrical circuit diagrams and associated, simplified electromagnetic generator connection diagrams that may utilize the device shown in FIG. 10G.

FIGS. 10N and 10O depict additional views of the device shown in FIG. 10G.

FIGS. 11C through 11F depict an electromagnetic waveform generator according to an embodiment.

FIGS. 11G through 11N depict an integrated device according to embodiments of the invention.

Figure 1B:
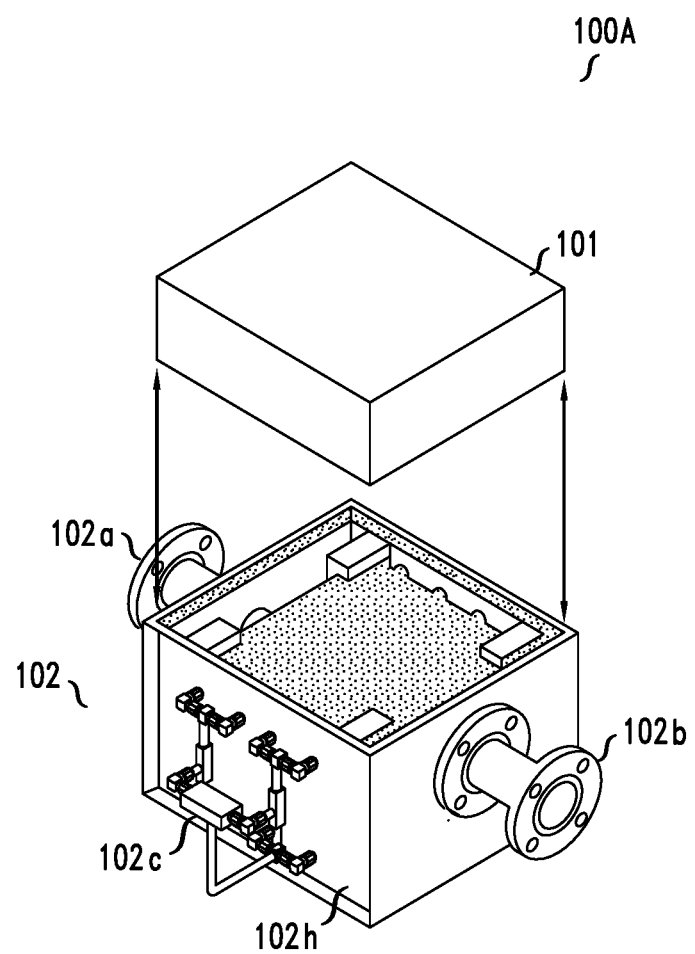
FIG. 1B depicts an external view of exemplary, inventive devices shown in FIG. 1A according to an embodiment.

To the extent that any of the figures or text included herein depicts or describes dimensional information (e.g., inches) it should be understood that such information is merely exemplary to aid the reader in understanding the embodiments described herein. It should be understood, therefore, that other dimensions may be used to construct the inventive devices, systems and components described herein and their equivalents without departing from the scope of the inventions.

DETAILED DESCRIPTION

Exemplary embodiments of devices, systems and related methods for treating unwanted material in a liquid are described herein and are shown by way of example in the drawings. Throughout the following description and drawings, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise.

As used herein, the term "embodiment" refers to an example of the present invention.

As used herein the phrase "unwanted material" includes all types of material, in dissolved or undissolved form, which degrades or otherwise detracts from a desired quality of a liquid, such as water. A non-limiting list of unwanted material includes, but is not limited to: scale, microbes (including, but not limited to bacteria), corrosive minerals, and contaminants of all kinds.

As used herein the phrases "treat", "treating," "treatment" and other tenses of the word treat mean the mitigation, reduction, removal, minimization, dissolution and elimination of unwanted material and the prevention of such unwanted material. Further the phrases "treating a liquid" and "treating unwanted material" and their other tenses may be used synonymously herein to describe the treatment of a liquid that contains unwanted material.

The phrase "liquid" means any known fluid that may be typically involved in, but not limited to, cooling and heating processes, energy exploration, or the transport of minerals, for example. One non-limiting example of a fluid is water, where by "water" is meant, but is not limited to, non-potable water, potable water and water that contains a combination of natural and man-made chemicals and minerals.

When used herein the phrases "probe", "probe device" or sometimes "inventive device" or just "device" means one of the inventive devices described herein that may be used to treat a liquid that contains unwanted material.

It should be understood that when the description herein describes the use of a "microcontroller", "controller", "computing device" or "computer" that such a device includes stored, specialized instructions for completing associated, described features and functions. Such instructions may be stored in onboard memory or in separate memory devices. Such instructions are designed to integrate specialized functions and features into the controllers, microcontrollers, computing devices, or computer that are used to complete inventive functions, methods and processes related to treating a liquid that contains unwanted material by controlling one or more inventive systems or devices/elements/components used in such a treatment.

It should be understood that the phrase "integrated" means one or more elements or components that are constructed substantially as one unitary device where, generally speaking, the elements or components are connected using short conductors or connectors, are placed on one or more adjacent printed circuit boards or the like that are themselves connected or are formed as a one or more miniaturized integrated circuits.

FIG. 1A shows an exemplary liquid (e.g., water) transport and treatment A, according to an embodiment (hereafter referred to as a "water transport system", "water treatment system" or just "system"). The system 100A may include a plasma discharge application device or "probe" 102 (hereafter "device 102") operable to generate one or more plasma discharges, a signal generator 101, a controller 104 and a gas compressor (e.g., air compressor) 105. It should be understood that the device 102 may be inserted in-line with other components of the system 100A such that elements of the device 102 that are used to generate plasma discharges are immersed in, in directly contact with or are substantially close to, a liquid (e.g., water) flowing through or a material passing into, the device 102. In an embodiment, the device 102 may be located (i.e., inserted) at or near a location that is susceptible to the formation or accumulation of unwanted material (e.g., scale, microbes, etc.). Once the device 102 is installed in the system 100A, desired characteristics of the plasma discharges can be controlled as described elsewhere herein, for example.

As shown the device 102 is connected to a commercial cooling tower 106 via an outlet pipe 109 on one side and to a makeup water supply (not shown) via inlet pipe 108 on another side. More particularly, the inlet pipe 108 may be connected to the probe 102 by inlet flange 102a which may be a part of the device 102 or separate from it, while outlet pipe 109 may be connected to the probe 102 by outlet flange 102b which also may be a part of the device 102 or separate from it. Though the system 100A is depicted as being a part of a cooling tower 106, this is just exemplary.

While the system 100A is shown as a single loop, it should be understood that an actual system may include more than one loop, and further, such loops may be a combination of an open loop and closed loop system. Nonetheless, to simplify the following explanation the system 100A shown in FIG. 1 will suffice. Further, although the system 100A is shown as including a single device 102, a single generator 101 and a single compressor 105 it should be understood that the system 100A may include many different numbers, types and combinations of devices 101, 102, 104 and 105.

As shown, the device 102 is inserted in-line with the pipes 108 and 109 so that elements of the device 102 may be immersed in the liquid (e.g., water) passing through the pipe 108, into the inner portion of probe 102 and exiting pipe 109. It should be understood that it is possible to provide additional systems 100A. For example, large complexes, buildings or structures, or complexes with multiple locations that are likely to promote the growth of unwanted materials, such as bacteria and scale, (e.g., data centers, industrial and commercial buildings and complexes, hotels/motels, large residential buildings and complexes, petrochemical complexes, municipal, state and federal office buildings, warehouses, paper and steel mills/processing facilities, hydroelectric power generating facilities, nuclear power generating facilities, and hospitals/medical centers) may benefit from having multiple systems 100A.

Generally stated, and as described later in more detail, the system 100A can apply one or more plasma discharges to a liquid, such as water, via the device 102. With the proper application of appropriate plasma discharge(s), the system 100A can effectively treat water that includes unwanted materials. As will be described later in more detail, the system 100A can generate a wide variety of plasma discharges depending upon the particular application and existing water conditions. In addition, the plasma discharges may be combined with electromagnetic fields that are generated by an electromagnetic device (i.e., probe), such as the probes described in the '979, '604, '550, '552, '546 and '345 Applications mentioned above and described elsewhere herein. As explained in more detail elsewhere herein, the electromagnetic fields assist the plasma discharges in treating unwanted material such as scale by changing the morphology of scaling ions from hard needle-like crystalline structure to soft non-needle-like crystalline structure and keeps the scaling ions in suspension.

The electromagnetic fields may be a steady-state electromagnetic field, a high, low or medium frequency electromagnetic output field, a combination of multiple high frequency, low frequency, and/or medium frequency electromagnetic fields. For example, carrier frequencies in the following frequency bands may be used by the electromagnetic fields: 1 to 2 MHz, 5 to 6 MHz, 13 to 14 MHz, 27 to 28 MHz, 40 to 41 MHz, 433 to 435 MHz and 902 to 928 MHz, 2400 to 2500 MHz and 5700 to 5900 MHz to name just a few exemplary ranges. Further, in one embodiment, 40.68 MHz may be used as a default carrier frequency. Electromagnetic fields that have various wave shapes (e.g., sine, triangular, square, saw tooth or pulse) may also be used. Additionally, the electromagnetic fields can be adaptively varied in frequency, voltage, current and/or waveform shape (e.g., amplitude modulation (AM), frequency modulation (FM)) based on conditions of the water in the system 100A.

Continuing with our description of FIG. 1A, compressor 105 may be operable to supply the device 102 with a compressed gas, such as air, to create ozone gas and supply the gas to the device 102 via tubes 103. Generator 101 may be operable to supply a high voltage signal to device 102 via a high voltage cable 110 in order to permit the device 102 to generate one or more plasma discharges. In embodiments, the device 102 may be operable to generate non-thermal plasma micro-discharge filaments (discharges for short) in order to treat scale (calcium carbonate, for example), biological contaminants, (biofilm, Legionella bacteria, etc.) and biologically induced corrosion in a liquid, such as water, that is used as a coolant in a cooling tower of a commercial building (hereafter, "make-up water").

Device 102 may be connected to controller 104 via suitable communication and interface means, such as a data transfer cable 130. Though the controller 104 is only shown connected to the device 102, it should be understood that the controller 104 may be connect to, and operable to control and monitor, the operation (e.g., functions, features and interoperability) of, all of the components depicted in FIG. 1A, including but not limited to, controlling the generation of plasma discharges by the device 102.

Still referring to FIG. 1A, the compressor 105 may be operable to supply a compressed gas to device 102 via tubes 103 and a gas distribution system 102c. The system 102c may be operable to receive the compressed gas from compressor 105 and to distribute the compressed gas into the inner portions of the device 102. More particularly, the distribution system 102c may comprise a manifold that equally distributes compressed gas in the each of the elements, and may be further operable to inject gas into the top and bottom of internal elements of device 102 (not shown in FIG. 1A). The introduction of a compressed gas (e.g., air) into the device 102 increases the amount of ozone that can be created within the water flowing into the device 102.

FIG. 1B depicts another view of the system 100A. As shown the generator 101 may be combined with the probe 102 to form a one-piece device, though it should be understood that the generator 101 and probe 102 may be separate devices (i.e., the arrowed lines in FIG. 1B indicate that the generator 101 may be combined with the device 102, or separated, yet still be connected to the device 102).

Referring now to FIG. 2, there is depicted a view of the device 102 that shows the inner structure of the device 102 according to one embodiment. As shown, device 102 may comprise a plurality of parallel, DDBD elements 102h. The elements 102h may be configured so as to be arranged substantially parallel to one another. The number of DDBD elements that may be included in the device 102 may vary based on the mass flow rate of a particular application (e.g., cooling tower). That is to say, the higher the flow rate desired, the more likely there is to be a greater number of elements 102h, and vice versa. Said another way, it should be understood that any number of elements 102h may be configured in parallel to accommodate a desired flow rate, though the size of the device 102 may increase or decrease depending on the number of elements 102h included in a device 102. Further, while the overall shape of the device 102 depicted in the figures herein is rectangular, and the elements 102h are planar shaped it should be understood that other shapes may be formed, such as a cylindrically-shaped device 102 and cylindrically shaped elements 102h, for example.

In an alternative embodiment, the elements 102h may comprise one or more DBD elements that can be configured in a parallel arrangement. Similar to DDBDs, the number of DBD elements included in a particular device 102 may vary based on a desired flow rate of liquid passing through the device 102. Each element 102h may be separated from one another by a mica separator 102i. In one embodiment each mica separator 102i may be 4 millimeters ("4 mm") in.

In accordance with embodiments of the invention, and as described in more detail below and elsewhere herein, each element 102h may comprise one or more electrodes. When the appropriate signals from the generator 101 are applied to each electrode one or more (typically more) plasma discharges occur (e.g., a partial and/or full discharge) between electrodes. A partial discharge occurs when a spark or arc, also known as a pulsed corona discharge, originating from one electrode does not reach a second electrode, and instead is distributed throughout the water. In contrast, if a discharge reaches a second electrode, a full discharge is said to have occurred.

In embodiments of the invention, as make-up water is input into the device 102 via pipe 108 it flows through each of the elements 102h where it is subjected to an applied plasma discharge generated by each element 102h. Each so-applied discharge forms ions in the water (or, in general, ions in a liquid). More particularly, the application of the plasma discharges by the elements 102h may create molecules and ions within the water that may be used to treat unwanted material in the water, such as scale (calcium carbonate, for example), biological contaminants, (e.g., biofilm, Legionella bacteria, etc.) and biologically induced corrosive material.

As further shown in FIG. 2, the exemplary device 102 may further comprise a plurality of spacers 102d (e.g., glass filled Polyoxymethylene, commonly referred to as Delrin), compression fittings 102f, and bus bar 102j. The spacers 102d may be configured to electrically isolate the elements 102h from the outer housing 102k of the probe 102.

Figure 3:
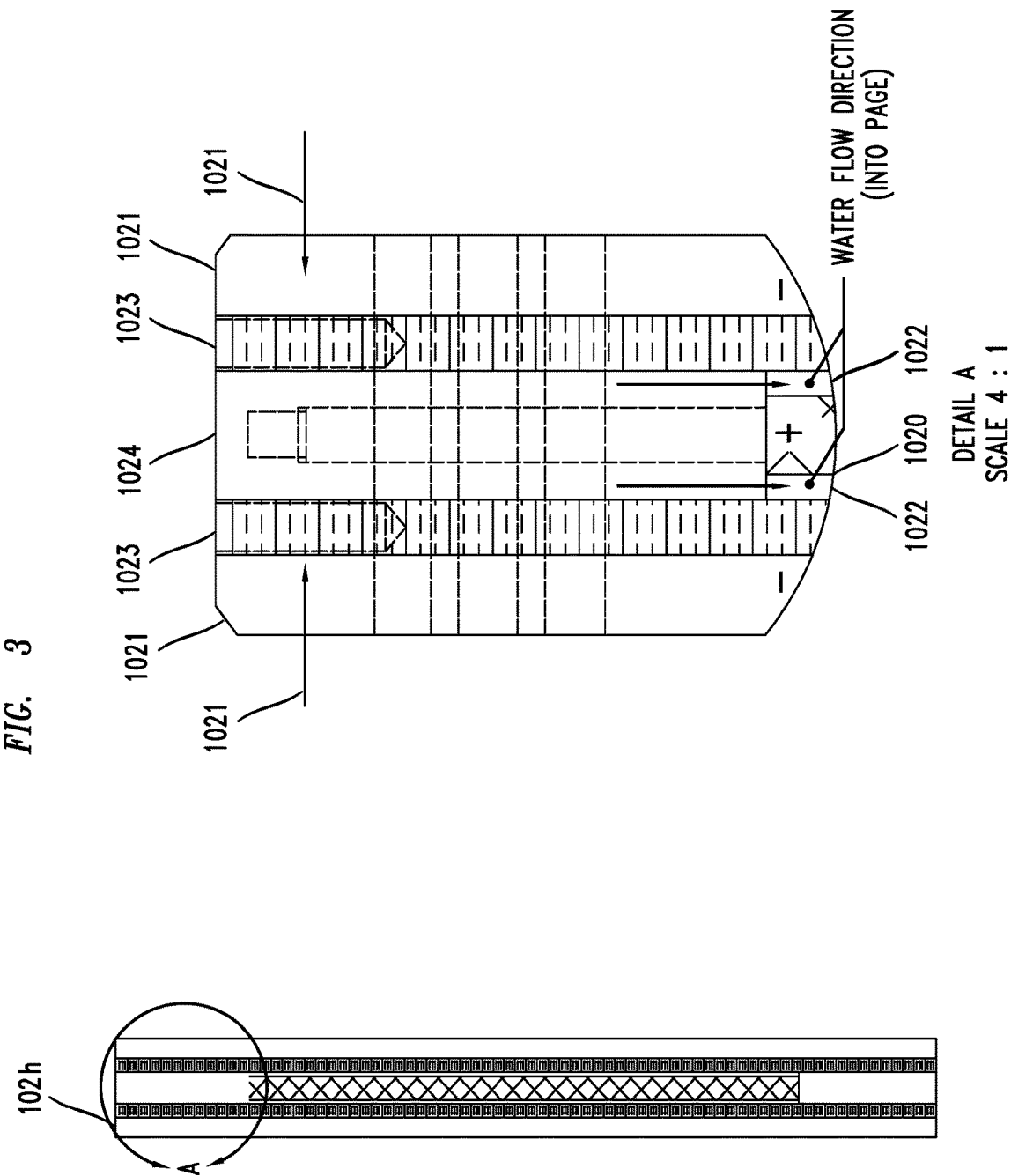
FIG. 3 depicts a view of elements of the device depicted in FIG. 2 according to an embodiment.

Referring now to FIG. 3 there is depicted a close up view of an exemplary element 102h. As shown each element 102h may comprise two negatively charged, 316L stainless steel cathode electrodes 1021 (indicated by the "−" sign), an isolation section 1023 (e.g., made from Mica or a ceramic coating), a slotted laminate section 1024 that maintains a 2 mm distance between the anode and the cathodes, and a positive, 316L stainless steel anode electrode 1020 Indicated by the "+" sign). In an embodiment, sections 1023 may comprise a Mica laminate and a slotted mica laminate section 1024 or a ceramic coating. In either event each section 1023 is configured, and is operable to, form a dielectric barrier to electrically isolate the positive electrode 1020 and negative electrodes 1021 from each other creating two equally spaced 2 mm channels or gaps (here after referred to as "channels") through which a liquid flows in an exemplary direction 102l. Sections 1023 also function to increase the strength of the plasma discharges generated by each element 102h within each channels.

In one embodiment, the electrodes 1020, 1021 may have dimensions of 280 mm (length), 180 mm (width) and 6.5 mm (thickness), for example.

As described herein, a plasma discharge is generated within the channel 1022 between each electrode 1020, 1021 when appropriate signals are applied to the oppositely charged electrodes. The plasma discharge, in turn, is created within a channel 1022. Again, the discharges may be partial, in that they originate from one electrode 1020, 1021 and terminate within the channel 1022 in between electrodes 1020, 1021 or full, in that they originate at one electrode and terminate at another. In embodiments, a plasma discharge occurs within a liquid, such as water, flowing through the channel 1022 in an exemplary direction 102l. Accordingly, plasma discharges are applied to the water flowing through the channels 1022.

Figure 4C:
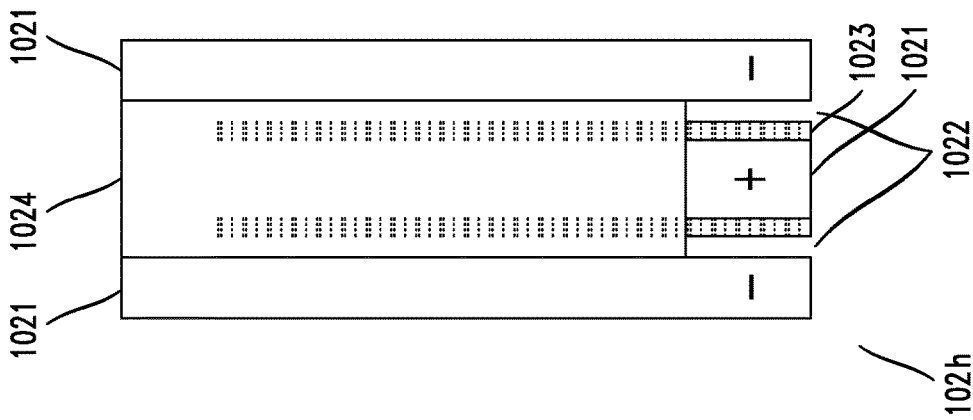
FIGS. 4A to 4C depict views of alternate configurations of the elements depicted in FIG. 3 according to embodiments of the invention.
Figure 4B:
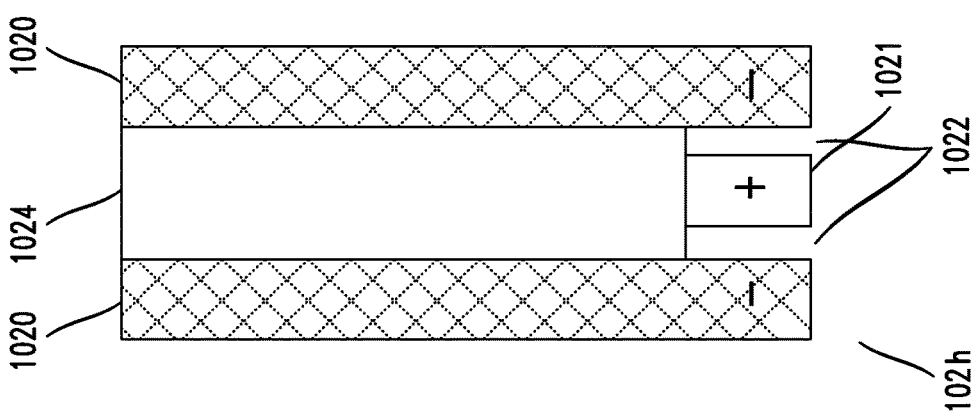
Figure 4A:
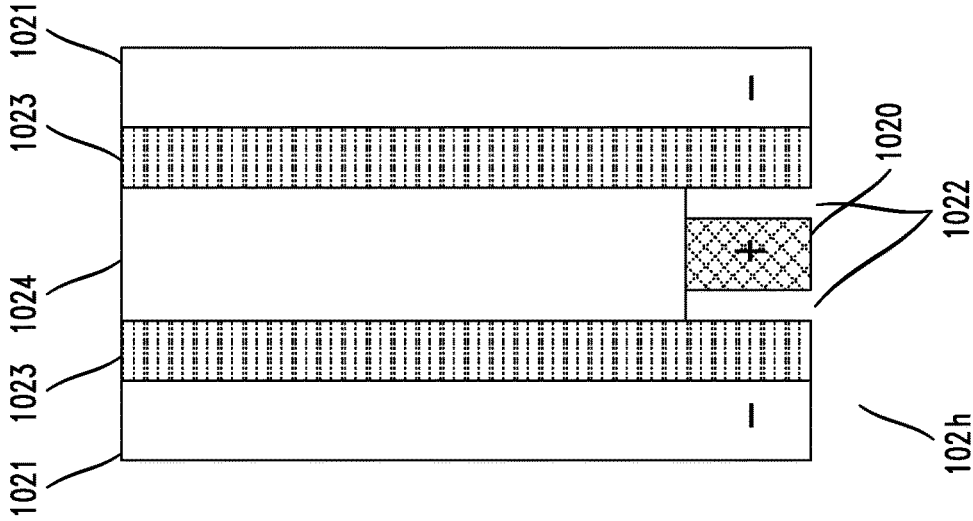

FIGS. 4A through 4C depict alternative embodiments of electrode configurations which may be used to form an element 102h.

In more detail, in FIG. 4A element 102h may comprise a DDBD plasma discharge application element ("element" for short). As depicted the DDBD element 102h comprises isolation sections 1023, where each section 1023 may comprise a layer or coating (hereafter collectively referred to as a "layer") of a dielectric material. As shown, each surface (i.e., sides) of the positive electrode 1020 and one surface (i.e., side) of each of the two negative electrodes 1021 is covered with such a layer. In embodiment, the entire lengthwise side surfaces of the positive electrode may be covered with such a layer. As described previously, the layer 1023 may comprise a Mica laminate or a ceramic.

In more detail, in one embodiment the positive electrode 1020 may be coated with a layer of aluminum oxide ($Al_2O_3$) ceramic (see FIG. 5B as well) and the negative electrodes 1021 may be coated with a layer of a Mica laminate 1023. In embodiments of the invention, each layer of Mica laminate 1023 may be operable to electrically isolate a negative electrode 1021 from a positive electrode 1020 (and isolate negative electrodes 1021 from one another). Accordingly, the configuration in FIG. 4A forms two substantially, equally spaced 2 mm channels 1022 within the element 102h.

In an embodiment, aluminum oxide ($Al_2O_3$) ceramic layers described herein may have a 5% porosity, 8-10 permittivity (Cr), and a resistivity of >1014 Ωm, while Mica laminate layers may have a permittivity (∈r) of 7-9 and a resistivity of >1015 Ωm.

In FIG. 4B, an element 102h may form a DBD element. In one embodiment the DBD element 102h may be formed by coating or otherwise applying or connecting (collectively "coating") both surfaces (i.e., sides) 1020b of the negative electrode 1020 with a layer of a ceramic or dielectric laminate both of which function as an isolating section. Again, ceramic layers may comprise an aluminum oxide ($Al_2O_3$) ceramic. A slotted Mica section 1024 is operable to separate and electrically isolate all three electrodes 1020, 1021 and create two equally spaced 2 mm channels 1022 within the element 102h.

FIG. 4C depicts yet another embodiment of an element 102h. As depicted, element 102h may comprise a DBD element comprising one 316L, stainless steel positive electrode 1021 with a layer 1023 of a Mica laminate on both surfaces (i.e., sides) and two 316L, stainless steel negative electrodes 1021 that are not coated with a layer of a ceramic or Mica laminate. A slotted Mica section 1024 is operable to electrically isolate all three electrodes 1020, 1021 and form two equally spaced 2 mm channels 1022 within the element 102h.

Figure 5B:
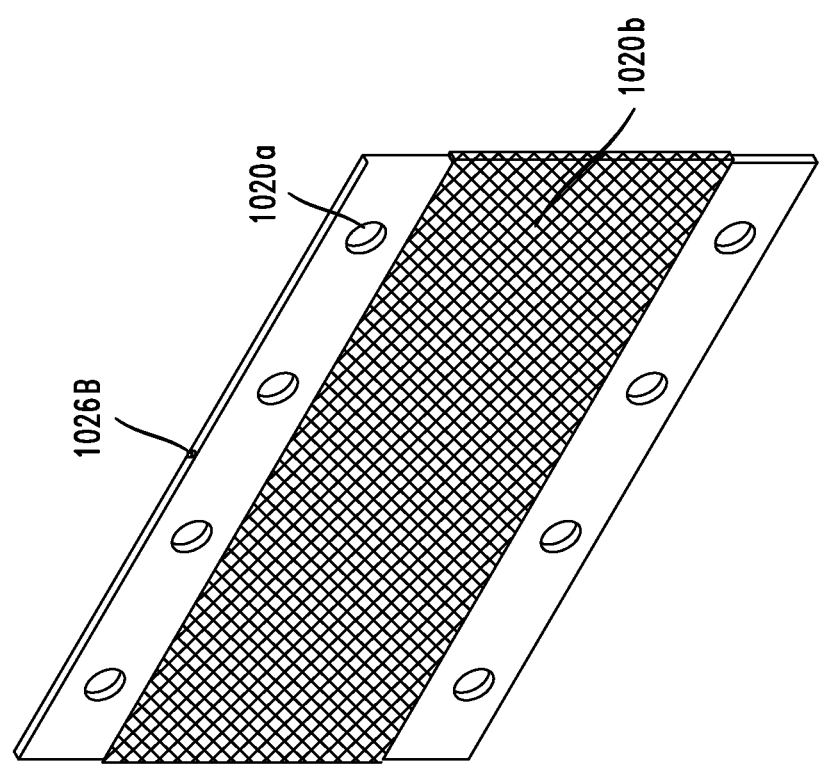

FIGS. 5A and 5B depict exemplary electrodes 1026A and 1026B. Referring first to FIG. 5A the electrode 1026A may be configured as either a positive or negative electrode for use in configuring a DDBD or DBD element.

In more detail, referring to FIG. 5A the electrode 1026A may comprise a 316L, stainless steel electrode with one or more (typically more) mounting holes 1021a, used to assemble the DDBD or DBD element.

Referring to FIG. 5B the electrode 1026B may comprise a 316L, stainless steel electrode that may be configured as a positive (anode) electrode. The electrode 1026B may include one or more (typically more) mounting holes 1020a used to assemble the DDBD or DBD element and a layer 1020b of a dielectric ceramic or Mica laminate. The ceramic layer 1020b may be an aluminum oxide ($Al_2O_3$).

Similar to the other electrodes described herein, the electrodes 1026A, 1026B depicted in FIGS. 5A and 5B may have dimensions of 280 mm (length) by 180 mm (width) by 1 mm (thickness).

In embodiments of the invention, including the embodiment of the electrode 1026B shown in FIG. 5B, ceramic layers (such as layer 1020b in FIG. 5B) may be operable to increase the conductivity of a stainless steel electrode, and, thereby, decrease the voltage necessary to generate plasma discharges in a liquid (e.g., water) flowing through adjacent channels, such as channels 1022. In more detail, ceramic layers provided by the present invention may comprise a 2-5 micron (thickness) layer of aluminum oxide $AL_2O_3$ that may have the following characteristics: a 5% porosity, a permittivity ($\in_r$) of 8-10, and a conductivity ($\sigma$) of 2 μS/cm, for example. Though such a layer is described as having a thickness of 2-5 microns, it should be understood that this thickness may vary based on the permittivity and conductivity desired. However, it should also be understood that there is a minimum thickness required to take into account pitting of an electrode due to discharges.

Figure 5C:
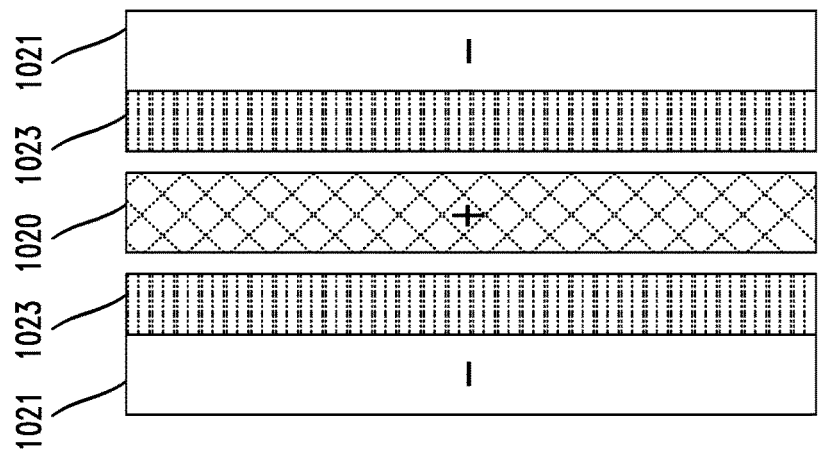
FIG. 5C depicts an exemplary element of a device according to an embodiment of the invention.

Referring now to FIG. 5C, in general the characteristics of the electric field generated by an exemplary element, such as element 102h, is affected by the permittivity and resistivity of the components (e.g., positive and negative electrodes) making up the element 102h, and of the permittivity and resistivity (i.e., conductivity) of the liquid (or another material) flowing or residing in the channels 1022 therein as well. Permittivity and resistivity are measures of the physical "resistance" to the formation of an electric field (voltage and current components, respectively) exhibited by a component of element 102h and by a liquid (or, for that matter, any other material) residing within, or flowing through, the element 102h.

In general, the lower the permittivity, the greater the strength of the electric field and vice-versa. Said another way, a layer of a dielectric ceramic or a dielectric laminate is operable to control the strength of the electric field which is applied to a liquid flowing through the element 102h. As a result of the aforementioned embodiments, the electric field may be increased and redistributed on the electrodes 1020, 1021 during the pre-discharge phase.

Referring to FIG. 5C there is depicted an exemplary element 102h comprising a positive electrode 1020, two negative electrodes 1021 and layers 1023 of a dielectric ceramic or laminate. To understand how an electric field, $E_{C1}$, generated by exemplary element 102h is affected by the permittivity of the components making up element 102h and any liquid (or other material) residing or flowing therein we provide the following explanation.

In one embodiment, the electric field, $E_{C1}$, generated by element 102h is affected (i.e., increased or decreased) by the permittivities of the components making up the element 102h and the permittivity (in this case) of the liquid residing in, or flowing through, the element 102h.

In an embodiment, the electric field, $E_{C1}$, of the exemplary element 102h in FIG. 5C may be computed as follows:

$$E_{C1} = \frac{\varepsilon_w^2}{\varepsilon_m \varepsilon_c} E_A \quad (1.1)$$

$$E_{C1} = \frac{\varepsilon_w^2}{\varepsilon_m \varepsilon_c} E_A = \frac{81^2}{10*8} = \frac{6560}{80} = 82 * E_A = 82 * \frac{V_A}{d} \quad (1.2)$$

$$E_{C1} = 82 * 5600 = 459.2 \text{ GV/m} \quad (1.3)$$

where $E_{C1}$=electric field on the surface of a layer of dielectric ceramic (e.g., $Al_2O_3$), ($\in_w$)=permittivity of a liquid, in this case water, ($\in_c$)=permittivity of a layer of a ceramic on a (cathode)electrode, in this case $Al_2O_3$, ($\in_m$)=permittivity of a layer of a Mica laminate, $E_A$=electric field on a stainless steel (anode) electrode that is not covered with a layer of a ceramic dielectric, and d=thickness of the layer of the ceramic dielectric on the cathode electrode.

Figure 5D:
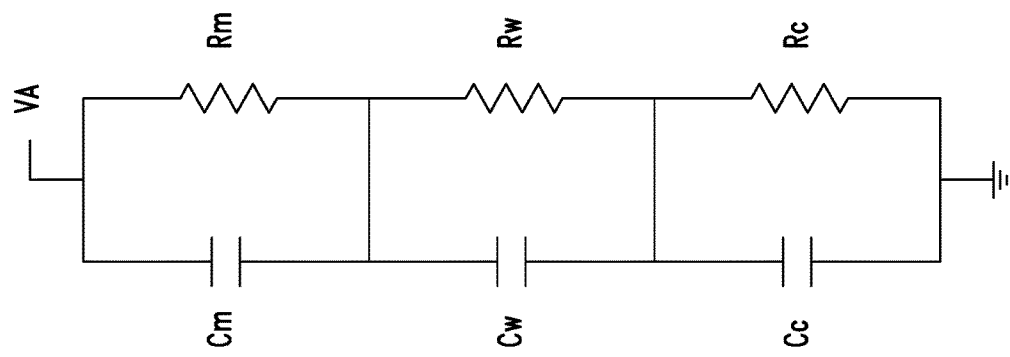
FIG. 5D depicts an electrical representation of the element depicted in FIG. 5C.

The element 102h may also be characterized by its resistivity. Referring now to FIG. 5D there is depicted a representative electrical diagram of the element 102h shown in FIG. 5C that may be used to compute an exemplary resistivity of the element 102h. As depicted, the element 102h may be represented in terms of electrical resistances $R_m$, $R_W$ and $R_c$ and electrical capacitances $C_M$, $C_W$ and $C_C$, respectively, for a given applied voltage on the anode (positive) electrode, $V_A$.

For present purposes, we will focus on the resistances $R_m$, $R_W$ and $R_c$ which collectively can be referred to as the equivalent resistivity of the element 102h. Accordingly, the effect of the resistivity of element 102h on the electric field $E_{C1}$ applied to a liquid (or another material) residing in, or flowing through, exemplary element 102h in FIG. 5C may be computed as follows:

$$E_{C2} = \frac{V_A}{d} * R_{eqv} = \frac{V_A}{d} * \frac{R_m^2}{R_m^2 + R_m R_c} \quad (1.4)$$

$$R_m \gg R_c \text{ --} > R_{eq} \approx 1 \quad (1.5)$$

$$R_m = R_c \text{ --} > R_{eq} = 0.5 \quad (1.6)$$

$$R_m \ll R_c \text{ --} > R_{eq} \approx 0 \quad (1.7)$$

$$E_{C2} = \quad (1.8)$$

$$\frac{V_A}{d} * \frac{R_m^2}{R_m^2 + R_m R_c} = \frac{2.8*10^4}{5*10^{-6}} * \frac{10^{30}}{10^{30} + 10^{15}*10^{14}} = 5600 * \frac{1}{1.1}$$

$$E_{C2} \approx 5040 \text{ MV/m} \quad (1.9)$$

where $E_{C2}$=the electric field on a layer of a ceramic dielectric ($Al_2O_3$) of an electrode, $R_w$=resistance of water, $R_c$=resistance of a layer of a ceramic ($Al_2O_3$), $R_m$=the resistance of a layer of Mica laminate, $R_{eq}$=equivalent resistivity of element 102h, d=thickness of the layer of the ceramic dielectric, $V_A$=the voltage on the anode (positive) electrode.

Though aluminum oxide ($Al_2O_3$) is described as being used as the layer of a dielectric ceramic in the examples above, it should be understood that other dielectric ceramics may be used as well. For example, in alternative embodiments the following ceramics may be applied as a layer to an electrode (anode or cathode) to create high and distributed electric fields (e.g., 150 kV/cm) on the surface of such electrodes:

Cordierite ($2MgO.2Al_2O_3.5SiO_2$), with a 5% porosity, a permittivity ($\in_r$) of 4.5-5.6, and a resistivity>2e+11 Ωm;

Steatite ($MgO.SiO_2$), with a 5% porosity, a permittivity ($\in_r$) of 8-10, and a resistivity of >$10^{14}$ Ωm;

Forsterite ($2MgO.SiO_2$), with a 5% porosity, a permittivity ($\in_r$) of 6.4, a resistivity of >$10^{14}$ Ωm;

Yttria ($Y_2O_3$), with a 5% porosity, a permittivity ($\in_r$) of 23-29, and a resistivity of >$10^{13}$ Ωm;

Aluminum Nitrite (AlN), with a 5% porosity, a permittivity ($\in_r$) of 9, and a resistivity of >$10^{14}$ Ωm;

Silicon Nitrite ($Si_3N_4$), ceramic layer with 5% porosity, a permittivity ($\in_r$) of 7-8, a resistivity of >$10^{14}$ Ωm;

Almandine ($Fe_3Al_2(SiO_4)_3$, ceramic layer with 5% porosity, a permittivity ($\in_r$) of 8, a resistivity of >$10^{14}$ Ωm; and Having presented a description of some of the many different variations of an element or elements 102h that may make up an exemplary device 102, we now turn to a discussion of how an exemplary device 102 may operate in conjunction with an exemplary generator, such as generator 101.

Referring back to FIGS. 1A and 1B, in embodiments of the invention the generator 101 may provide signals to the electrodes 1020, 1021 of each element 102$h$ at voltages that make it possible for each element 102$h$ to create extremely high electric fields in the order of 150 kV/cm (i.e., electric field strength) at atmospheric pressure with electron densities between $10^{14}/cm^3$ and $10^{15}/cm^3$, and current densities, J, between 75 A/cm$^2$ and 225 A/cm$^2$.

$$J = \sigma \times E \tag{2}$$

Where the current density, J, is computed from the conductivity, $\sigma$, and the applied electric field, E. These electric fields in turn create discharges within each channels 1022 between a positive electrode (anode) 1020 and two negative electrodes (cathodes) 1021. Again, the layers of ceramic and Mica laminates on the electrodes are operable to improve the redistribution of the electric field during a pre-discharge. In more detail, the layers distribute a generated electric field across an entire lengthwise surface of an electrode. Such a distribution allows for discharges across the entire plate rather than just a few sections of the plate. In an embodiment, this in turn results in an increase of the resulting electric field by a factor of 10 compared with electrodes that are not so covered (i.e., "plain" stainless steel electrodes without dielectric layers), and an increase in the relative permittivity and conductivity of a channel 1022 within a DDBD element (treating purified water). Increases in the electric field may produce larger amounts of discharges and may result in improved rotational and vibrational excitation, electron avalanche, dissociation, and ionization processes.

Before describing additional devices and systems provided by the present invention, we now present a brief discussion of the operation of the system 100A in FIG. 1A described above (and elsewhere herein).

As noted elsewhere herein, the generation and application of a plasma discharge (both partial and full discharges) by device 102 causes water (e.g., make-up water in a cooling tower) to breakdown.

During a discharge, water that is not in the path of a discharge remains in a liquid state, while water in the path of a discharge may evaporate or break down when the temperature of the discharge exceeds a threshold (i.e., the discharge heats the water above a threshold temperature). Said another way, when the temperature of the discharge exceeds either the thermal threshold for evaporation or breakdown of water, a discharge occurs between the two electrodes. It should be understood that if the temperature of a discharge does not exceed the threshold for evaporation or breakdown of water, then only electrolysis may occur.

It is believed that discharges produced by devices provided by the present invention, such as device 102, initiate energetic electrons, and space charge accumulation, in water that thereafter produce reactive (ionic and excited atomic) and molecular species in the water. These reactive and molecular species are characterized by electron avalanche, rotational and gravitational excitation, dissociation, and ionization processes with energies up to 20 electron Volts (eV). These reactive and molecular species created by plasma discharges react with unwanted material, such as bacteria, biofilm, and scale in the cooling tower, make-up water in order to effectively treat such unwanted material.

More particularly, it is believed that rotational and vibrational excitation of cooling tower, make-up water may occur below a 1 eV energy threshold while electron avalanche produces various charged particles (e.g., electrons, positive ions, negative ions, complex ions, etc.) between a 5 eV to 20 eV energy threshold. Disassociated reactive and molecular species within the cooling tower, make-up water may be formed between 8 eV and 9 eV. Ionization of materials (e.g., minerals) within cooling tower, make-up water may occur at a threshold of approximately 13 eV to 14 eV.

In embodiments of the invention, determining the required applied voltage needed to produce plasma discharges in cooling tower, make-up water (as well as other water systems) requires a discussion of the thermal breakdown instability, $\Omega$, of such water.

In more detail, discharges may be created due to the effects of joule heating of electrons present in the water in channels (e.g., channels 1022) between electrodes of each element of a device, such as device 102. In one embodiment, an electric field associated with an applied voltage between electrodes results in electrons in the water being accelerated. As the electrons accelerate their temperature increases. At a specific temperature, $T_0$, the accelerated electrons cause a discharge between the electrodes in water. This temperature can be determined by the thermal breakdown instability value, $\Omega$, which corresponds to the characteristics of a particular medium, such as water. The thermal breakdown instability, $\Omega$, can be expressed as:

$$\Omega = \left[\frac{\sigma_0 E^2}{\rho C_p T_0}\right] \frac{E_a}{RT_0} - D\frac{k}{R_0^2} \tag{3}$$

Where $R_0$ is the radius of the breakdown channel (e.g., the radius of the cross sectional area of the plasma discharge), $D=1.5*10-7$ m$^2$/s is the thermal diffusivity of water, the specific heat constant of water, $C_p=4179$ K/kg*K, and k is thermal conductivity of water, 0.6 W/mK. The first term (i.e., the symbols to the right of the equal sign (=), and in brackets) represents the heating element where the numerator is the joule heating, and the denominator is the heat stored in the water. $E_a/RT_0$ represents the ratio of the activation energy, $E_a$, to the temperature $T_0$ and R is the universal gas constant of steam. The second term, $D\,k/R_0^2$, represents the ratio of thermal diffusivity, k, to the square characteristic width of the breakdown channel (e.g., the radius of the cross-sectional area of the plasma discharge, in microns squared $R_0^2$) for radial heat conduction.

When the thermal breakdown instability is greater than 0, thermal "explosion" occurs, and in turn creates discharges (e.g., a plasma streamer or arc is created). Taking this phenomenon into account, equation (3) can be rewritten as:

$$\left[\frac{\sigma E^2}{\rho C_p T_0}\right] \frac{E_a}{RT_0} \geq D\frac{k}{R_0^2} \tag{4}$$

Given that the breakdown voltage is the product of the electric field strength, E, and the distance between the two electrodes L (e.g., 2 mm), and using a geometric factor $G=L/R_0$, (e.g., the distance between electrodes and the radius of a plasma discharge) equation 2 can be rewritten as:

$$\left[\frac{\sigma V^2}{\rho C_p T_0}\right] \frac{E_a}{RT_0} \geq Dk G^2 \tag{5}$$

From this equation the breakdown voltage, V, can be determined using:

$$V \geq \sqrt{\frac{kRT_0^2}{\sigma_0 E_a}}\, G \tag{6}$$

Equation (6) can be applied to exemplary embodiments of the invention. For example, if the total width (e.g., 4 mm) of the two channels 1022 between anode and cathodes 1020, 1021 of each element 102h of the device 102 is 4 mm and the radius of a discharge is on the order of 4 μm, the breakdown voltage in water can be estimated to be:

$$V \geq \sqrt{\frac{kRT_0^2}{\sigma_0 E_a}} G = \tag{7}$$

$$\sqrt{\frac{0.613 \times 461.5 \times (300)^2}{0.1 \times 700,000}} G \approx 28.4 \times \left(\frac{4000}{4}\right) \approx 28,400 \text{ V}$$

$$V \geq 28,400 \text{ V}$$

Accordingly, equation (7) results in a breakdown voltage of at least 28,400 V. Thus, in one embodiment, a voltage of 28,400V would be needed to breakdown water at 300 K given a channel width of 4 mm in order to create a plasma discharge. As the conductivity increases, the required minimum breakdown voltage would decrease, and vice-versa.

As noted elsewhere herein, and now reiterated, the generation of plasma discharges by devices of the present invention, such as device 102, may be effective at treating scale, biological contaminants, (biofilm, Legionella bacteria, etc.), and biologically induced corrosion scale through the ionization of cooling tower, make-up water.

More particularly, in one embodiment, the formation of hydrogen ions in the water due to such discharges may remove bicarbonate ions that are associated with the formation of scale.

Scale formation typically occurs in a cooling tower when highly soluble and naturally occurring calcium ions ($Ca^{2+}$) and bicarbonate ($HCO_3^-$) ions precipitate into calcium carbonate ($CaCO_3$) and carbon dioxide ($CO_2$) gas as a result of temperature, pressure and pH changes in the cooling tower make-up water.

It is believed that the rotational and vibrational excitation, electron avalanche, dissociation, and ionization processes produced by the generation of plasma discharges in cooling tower, makeup water further initiate chemical reactions that include hydroxyl (OH), hydrogen (H), Oxygen (O), hydrogen peroxide ($H_2O_2$), hydronium ($H_3O$), super oxide anion ($.O_2$—), singlet oxygen ($1O_2$) ions, ozone ($O_3$) and ultra violet light. Ultra violet (UV) light exerts a mutagenic effect by exciting electrons and molecules. The excitation of electrons and molecules denatures bacteria.

In more detail, from equation 8.1 below, it is believed that positive hydrogen ions may attach to a cooling tower, make-up water molecule to produce oxoniumyl ($H_2O^+$). The oxoniumyl ($H_2O^+$) further attaches to the cooling tower, water molecule to produce hydronium ($H_3O^+$) and Hydroxyl (OH) shown in equation 8.2 below.

The hydrogen ions produced react with bicarbonate ions ($HCO_3^-$) present in the cooling tower make-up water to produce additional water ($H_2O$) and carbon dioxide gas ($CO_2$) shown in equation 6.3 below:

$$H_2O^+ + H_2O \rightarrow H_2O^+ + OH \tag{8.1}$$

$$H_2O^+ + H_2O \rightarrow H_3O^+ + OH \tag{8.2}$$

$$H^+ + HCO_3^- \rightarrow H_2O^+ + CO_2\uparrow \tag{8.3}$$

By removing bicarbonate ions from cooling tower, make-up water, devices provided by the present invention (e.g., device 102) reduce the ability for scale to form on cooling tower heat exchanger elements and the inside walls of any pipes of an associated water treatment system.

In a second embodiment, plasma discharges created by devices provided by the present invention may be effective at treating biological contaminants and biologically induced corrosion when used with ozone that is applied to the water.

For example, in one embodiment, plasma discharges created by the device 102 may generate ozone ($O_3$) gas within cooling tower, make-up water through the electron impact dissociation of molecular oxygen ($O_2$) and molecular nitrogen ($N_2$) of a gas (sometimes referred to as a "carrier" gas) that is injected into, or otherwise supplied to, the device 102 (see equations 9.1 and 9.2 below):

$$O_2 + e \rightarrow O^+ + e \tag{9.1}$$

$$O^+ + O_2 \rightarrow O_3^+ \tag{9.2}$$

The carrier gas may be supplied to the device 102 via gas distribution system 102c, and compressor 105 described elsewhere herein (e.g., see FIG. 1A). The gas may be either dry air or ambient air, for example.

In one embodiment, molecular oxygen ($O_2$) gas (i.e., the carrier gas) reacts with a dissociated oxygen atom from the carrier gas to form ozone gas. The ozone gas is effective at treating biological contaminants and biologically induced corrosion dissolves into the cooling tower, make-up water.

In a third embodiment, plasma discharges created by devices provided by the present invention may be effective at treating scale within cooling tower, make-up water through the generation of nitric oxide.

For example, device 102 may treat scale by the ionization of cooling tower, make-up water through the disassociation of nitric acid ($HNO_3$) into hydrogen ($H^+$) ions and nitrate (NO) ions. The disassociated ions can, thereafter, be used to remove bicarbonate present within the water that is associated with the formation of scale.

In more detail, a carrier gas (i.e. ambient air or compressed air) may be applied to water flowing through device 102 via distribution system 102c and compressor 105 in FIG. 1A. Application of plasma discharges on the carrier gas (i.e. ambient air or compressed air) causes ionization and disassociation of the carrier gas to molecular nitrogen ($N_2$) gas and molecular oxygen ($O_2$) gas. Both molecular nitrogen ($N_2$) gas and molecular oxygen ($O_2$) gas further reacts with nitrogen atoms and oxygen atoms from the carrier gas (i.e. ambient air or compressed air) to produce nitric oxide (NOX) gas. The oxygen atoms from the carrier gas oxidizes nitrate (NOx) to nitrogen dioxide ($NO_2$). The nitrogen dioxide ($NO_2$) in the cooling tower, make-up water results in the production of nitric acid ($HNO_3$) production. The hydrogen ions produced from nitric acid contributes further to the removal of bicarbonate ions to treat and or mitigate scale. The above description is set forth in the chemicals equations that follow:

$$N_2 + O_2 \xrightarrow{Plasma\ Temp.} NO_X \tag{10.1}$$

$$NO_X + H_2O \rightarrow HNO_3 \rightarrow H^+ + NO_3^- \tag{10.2}$$

In yet a fourth embodiment, plasma discharges created by the device 102 may be effective at treating biological contaminants and biologically induced corrosion treatment by the creation of hydrogen peroxide.

For example, the device 102 may be operable to create plasma discharges and apply the discharges to minerals within the cooling tower, make-up water in order to produce hydrogen peroxide. The hydrogen peroxide may be produced through electron impacts initiated by the disassociation of vibrational excited molecules, where vibrational excitation of cooling tower make-up water ($H_2O^*$) (where the asterisk "*" denotes vibrational excited) molecules decompose. Referring to Equation 11.1, excited water molecules ($H_2O$) reacts with cooling tower make-up water molecules ($H_2O$) molecules to produce hydrogen ions (H), hydroxyl ions (OH), and additional water molecules ($H_2O$). The production of hydrogen peroxide $H_2O_2$ is governed by the reactions set forth in Equations 11.1 through 11.4 below:

$$H_2O + e \rightarrow H_2O^* + e \quad (11.1)$$

$$H_2O^* + H_2O \rightarrow H. + OH. + H_2O \quad (11.2)$$

$$H. + H_2O^* \rightarrow H_2 + OH \quad (11.3)$$

$$OH + H_2O^* \rightarrow H_2O_2 + H \quad (11.4)$$

Figure 6:
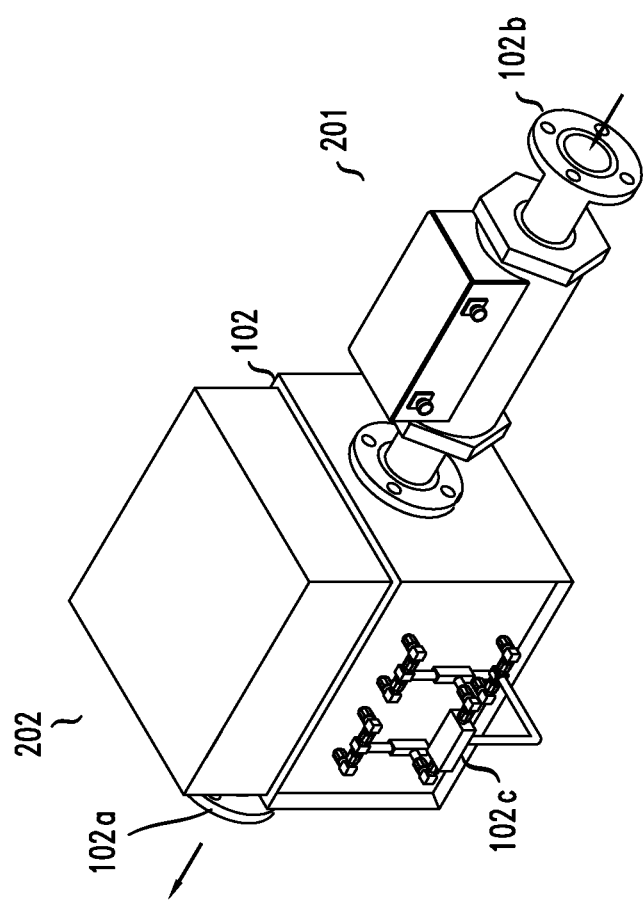
FIG. 6 depicts an external view of an alternative, inventive exemplary device for treating unwanted material in a liquid according to an embodiment.
Figure 7:
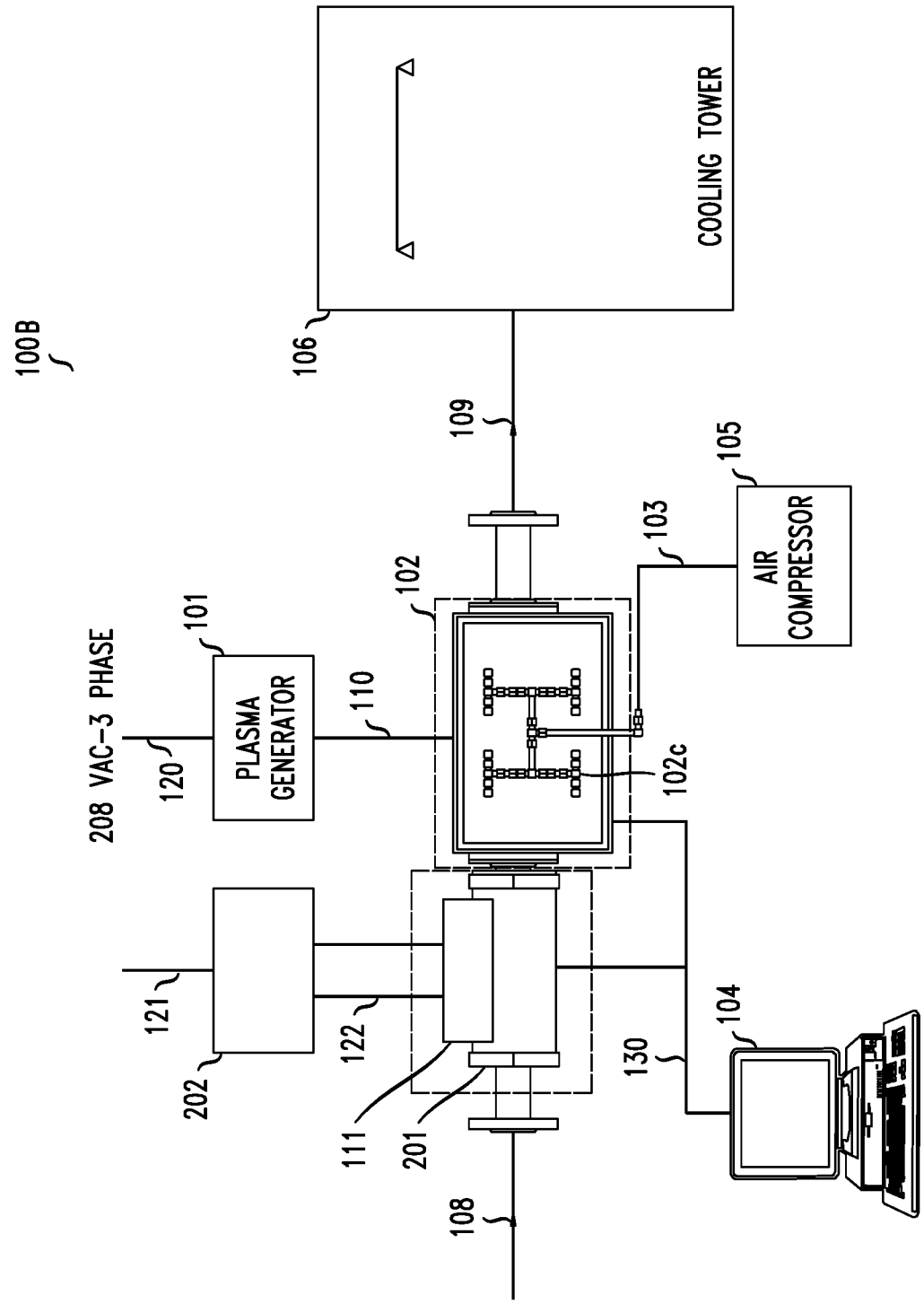
FIG. 7 is a simplified block diagram showing the alternative, exemplary, inventive devices of FIG. 6 within an exemplary water transport system according to an embodiment.

Referring now to FIG. 6 there is depicted an alternative device 202 in accordance with another embodiment of the invention. The device 202 comprises a plasma discharge section 102 (similar to device 102 discussed previously), and an electromagnetic field section 201, such as the electromagnetic devices disclosed in the '979, '604, '550, '552, '546 and '345 applications mentioned above and as described elsewhere herein. The device 202 may also be used in a cooling tower system 100B depicted in FIG. 7.

The plasma discharge section (e.g., device 102) has been discussed previously herein. Below we present a discussion of embodiments of the electromagnetic (EM) field section 201. In embodiments of the invention, the EM field section 201 may be operable to generate and apply time varying, modulated electric and magnetic fields, substantially perpendicular to each other, to treat unwanted material (e.g., scale, biological contaminants, biofilm, Legionella bacteria, biologically induced corrosive material) in water flowing through the EM field section 201. Though FIG. 6 depicts the EM field section 201 to the right of the plasma discharge section 102 it should be understood that typically a liquid would first enter the EM field section 201 prior to entering the plasma discharge section 102 (though the invention covers alternative embodiments where the arrangement is reversed). Accordingly, in embodiments of the invention the electric and magnetic fields generated by the EM field section 201 may be applied prior to, application of the plasma discharges by the plasma discharge section 102. For example, in the embodiment illustrated in FIG. 7, the electromagnetic fields are applied prior to application of the plasma discharge. Though placing the EM field section 201 after the plasma discharge section 102 is believed to be less advantageous, this is also possible.

In an embodiment, when the plasma discharge section 102 and EM section 201 are combined and used in sequence, the electric field generated by the EM field section 201 is perpendicular to the magnetic field generated by the EM field section 201. As a result, ions present in a liquid to which the EM fields are applied are believed to accelerate, and their trajectory changes into a cycloid (see FIG. 9). This process is believed to keep the ions soluble which is advantageous upon application of plasma discharges. In particular, the EM fields produced by the EM field section 201 assist the plasma discharges produced by the plasma discharge section 102 in treating scale by changing the morphology of scaling ions present in the liquid from hard needle-like crystalline structures to soft non-needle-like crystalline structures and keeps such scaling ions in suspension.

The plasma discharges eliminate bicarbonate ions, which in turn prevents the so-eliminated bicarbonate ions from reacting with scaling ions to form hard needle-like crystalline structures, and treats biofilm and biologically induced corrosive material.

It can be said that time-wise, the electric and magnetic fields created by the EM field section 201 are applied substantially simultaneously.

Figure 9:
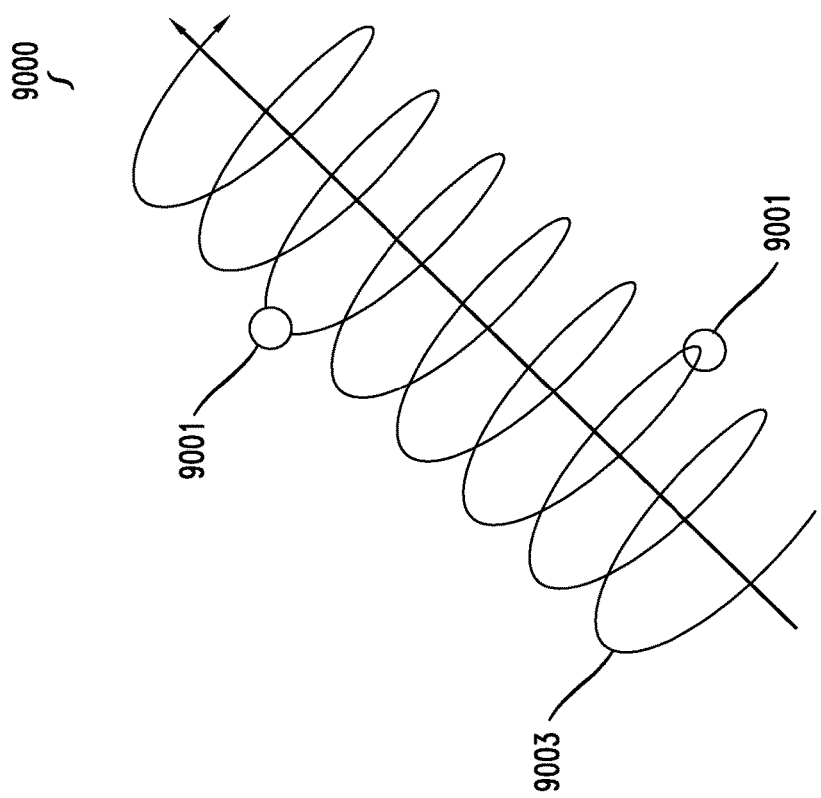
FIG. 9 depicts a representative path of the motion of ions in a liquid upon application of applied fields provided by exemplary devices of the present invention.

In more detail, as mentioned above it is believed that the simultaneous application of time varying, modulated electromagnetic fields within the EM field section 201 causes ions in the liquid (e.g., water) to simultaneously accelerate (i.e., speed up) and vibrate or otherwise move in a spiral, helical or cycloid motion as illustrated by the path 9000 in FIG. 9. In an embodiment of the invention, application of electromagnetic fields to unwanted material, such as scale, causes the scale to remain soluble in water prior to entering the plasma discharge section 102. The soluble scale then reacts with reactive and molecular species created by the plasma discharge section 102 to further treat the scale, as well as treat biological contaminants (biofilm, Legionella bacteria, etc.), and biologically induced corrosive materials.

In an embodiment, the time varying, modulated electric field generated by the EM field section 201 effectively treats biological contamination in cooling tower, make-up water through the application of an exemplary 1.5 kHz-5 kHz modulated square wave pulse to denature biofilm and biological contaminants. Additionally, the time varying, modulated magnetic field generated by the EM field section 201 effectively treats corrosive material (and formation) in cooling tower, make-up water when the applied field is modulated with a particular frequency, for example, the ionic cyclotron frequency of iron (Fe).

Figure 8A:
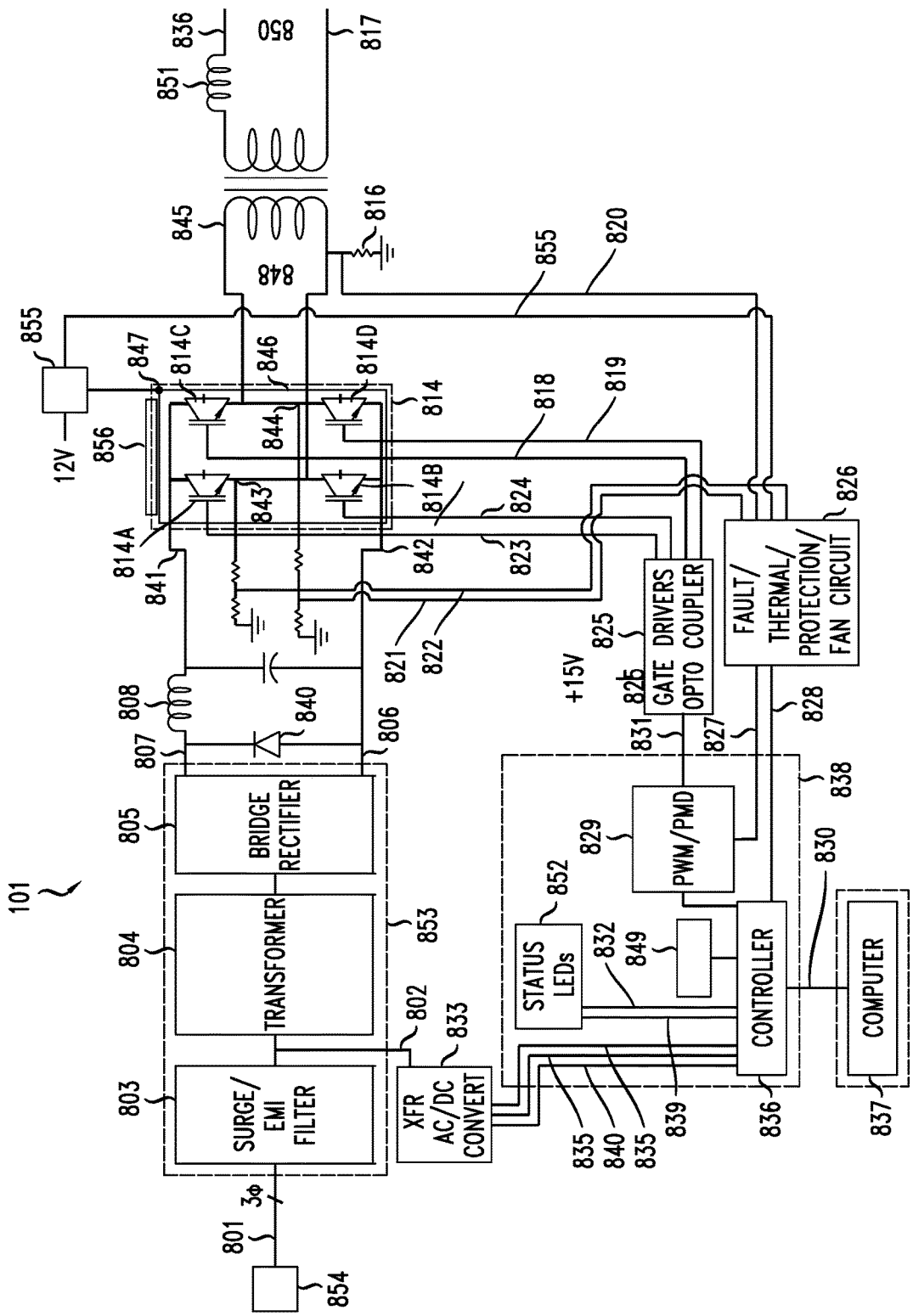
FIG. 8A depicts a diagram representing electrical components that may comprise a generator used to provide signals to devices for treating unwanted material in a liquid according to an embodiment.

As indicated previously, the high energy, electric fields generated by the plasma discharge section 102 is believed to further accelerate ions associated with scale (and scale formation) within a liquid, such as cooling tower make-up water scaling ions as well as maintain the motion of such scaling ions (see FIG. 9, for example). Referring now to FIG. 8A there is depicted a diagram representing electrical components that may comprise a generator, such as generator 101 shown in FIGS. 1A and 1B.

In one embodiment, the generator 101 may comprise a 10 KW, unipolar/bipolar device with an automatic operating pulse density modulation (PDM) frequency range from 1 kHz to 30 kHz. The generator 101 may be connected to a 208 VAC 3-phase electrical utility source 835 via a 3 phase electrical power cable 801 to produce a 30 kV output voltage and a 0.333 A current 850 to power the generator 101 and plasma discharge section 102 to produce high electric fields and resulting discharges in a liquid. The generator 101 may be designed to be combined with the plasma discharge section 102 within a housing, for example, to provide power to electrodes, such as those used in elements 102h, as further explained elsewhere herein.

The generator 101 may include the following sub-circuitries, circuitry, and modules: AC to DC circuitry, bus-bar voltage/current circuitry 851, IGBT (insulated gate bipolar transistor) module 814, microcontroller 836 and status LEDs 852, pulse width modulator/pulse density modulator 829, gate driver opto-couplers 825, fault detection circuitry 826, AC-to-DC low voltage converters 833 and thermal management circuitry 826. A brief description of each of the above mentioned components follows.

In an embodiment, AC to DC bus bar voltage/current circuitry may include the following components. A power supply module 851 operable to receive 3-phase AC power at an input receptacle 835 and an AC power surge filter module 803 comprising metal oxide varistors (MOV) connected in parallel between 3-phase 208 VAC power line conductors 801 in order to protect the generator 101 from electric power utility surges, voltage dips, variations, and brownout conditions.

Module 803 may further comprise an electromagnetic interference filter operable to reduce conducted emissions that are produced by the generator 101 which can be conducted by the 3-phase AC power line conductors 801. The 3-phase power lines 801 may comprise 208 VAC AC power lines that connect the generator 101 (e.g., transformer 804) to power utilities. The power from lines 801 (e.g., conductors) may be "stepped down" (i.e., reduced) by transformer 804 and rectified by a 3-phase AC bridge rectifier 805 in order to produce a 240V peak DC bus bar voltage and a 41.7 A peak DC bus current. The DC bus bar voltage may be stabilized by a Zener diode 840 and filtered by inductor 808 and capacitor 810. The DC bus bar voltage is used to power the IGBT module 814.

The generator 101 may further include current limiters imbedded in module 803 to limit in-rush current during start-up and normal operational conditions of the generator 101.

In one embodiment an exemplary IGBT module 814 may comprise a full-bridge IGBT circuit consisting of two upper and two lower Insulated gate bipolar transistors (IGBTs) 814A to 814D which function as switches connected in a cascade arrangement. The IGBT module 814 may comprise a 5-terminal circuit which includes a DC bus voltage input section 841, two mid-points 843, 844 between the four switches 814A to 814D, a ground return 842, two low-side gate drive input sections 819, 824 and two high-side gate drive input sections 823, 818. The diagonal pairs of IGBT switches (8112A-814D or 8112B-814C) may conduct alternately, thus, achieving current reversal in the transformer primary side 848. The output of the IGBT module 814 may connect directly to the primary side 848 of the pulse transformer 845.

In an embodiment, low voltage AC-to-DC circuitry 833 may comprise a step down transformer, an AC to DC rectifier, and six DC-to-DC converters. The low voltage Ac-to-DC circuitry 833 may generate a range of voltages/currents, such as +15V/1.5 A; 835, −15V/1.5 A; 835, +12/5 A; 840, −12V/5 A; 840, +5V/1.5 A; 840, and −5V/1.5 A; 840, for example, and provide these voltages/currents to other components of the generator 101.

The generator 101 may further comprise thermal management circuitry. In one embodiment such circuitry may include a heat sink 856 that contains a fan mounted to the IGBT module 814 to remove heat from the IGBT module 814. In addition, the thermal circuitry may include a microcontroller 836 operable to receive high-temperature "lockout" signals indicating temperature changes of the generator 101 (i.e., its components). Thereafter, the microcontroller 836 may be further operable to disconnect power from one or more components of the generator 101 to protect such components from damage due to high temperatures. The high-temperature lockout signals may be generated by a 5 kΩ negative coefficient thermistor 847 (e.g., a temperature sensor) mounted on the IGBT module 814 and heat sink 846. Two comparators (numbers not shown) within the fault thermal protection circuitry 826 monitor the temperature sensor 847.

In an embodiment, the comparators within the circuitry 826 are configured to switch "on" the fans 855 whenever the temperature at the temperature sensor 847 rises to an upper threshold temperature of approximately 110° F., and to switch the fans 855 "off" when the temperature drops to a lower threshold temperature, e.g., to 105° F. degrees. In more detail, a resistor within circuitry 826 is operable to introduce a small differential in temperature, (e.g., 5° F.) in order to allow enough heat to be drawn away from the heat sink 856 so that the fans 855 will not stutter "on" and "off" as the heat stored in the core of the heat sink 856 is conducted to the sensor 847 mounted on the surface of the heat sink 856. In an embodiment, one or more variable threshold temperatures for turning the fan enable circuitry 826 "on" and "off" may be set (pre-programmed into, or adjustably programmed into) the microcontroller 836 and, thereafter, be used to trigger operation of the fans of the fan enable circuitry 826.

The generator 101 may also include fault protection circuitry 826. In one embodiment the fault protection circuitry may further comprise voltage feedback resistors 812, 813, current feedback resistor 816 and circuitry 826 for disabling certain drive signals of the generator 101. In one embodiment fault protection logic module 826 is operable to receive signals (e.g., voltage signals) from voltage feedback resistors 812, 813 connected to midpoints 843,844. If the signals from resistors 812,813 comprise output voltage signals that exceed preset reference values stored within microcontroller 836, then microcontroller 836 is operable to generate disable drive signals 823, 824, 818, 819 and forward such signals to the IGBT switches 814A, 814B, 814C, and 814D. Similarly, should the microcontroller 836 detect a load current through the full bridge (e.g., IGBT module 814) via a voltage drop over resistor 816 that exceeds preset reference values then microcontroller 836 may be operable to generate disable drive signals 823, 824, 818, 819 and forward such signals to the IGBT switches 8112A, 8112B, 814C, and 814D.

In one embodiment, the fault protection logic module 826 may comprise two high speed comparators (not shown in figure) connected to the heat sink 847.

The generator 101 also comprises a control section 838 comprising microcontroller 836 having two serial peripheral interface ports, 832, 839, memory 849, serial peripheral interface (SPI) ports 839 and 832 and a Universal Serial Bus (USB) port 830, the later port operable to form an interface between the control section 838 and computer 837 (or computer 104 shown in FIG. 1A). The microcontroller 836 may be operable to automatically tune (auto-tune) the frequencies output by the generator 101 to the plasma device section 102 by measuring the current from a voltage drop across resistor 816, and automatically changing the operating frequency and duty cycle of the pulse width modulator/pulse density modulator (PWM/PDM) 829. In one embodiment, the microcontroller 836 may be operable to so control the frequency output by the generator 101 so that the output frequency corresponds to the dielectric barrier resonance frequency of the plasma discharge section 102. As a result of operating the plasma discharge section 102 at its dielectric barrier resonance frequency, the section 102 may generate fields whose amplitudes are maximum and constant (and, thus, apply optimum treatment to a liquid) while making efficient use of the available power.

Figure 8B:
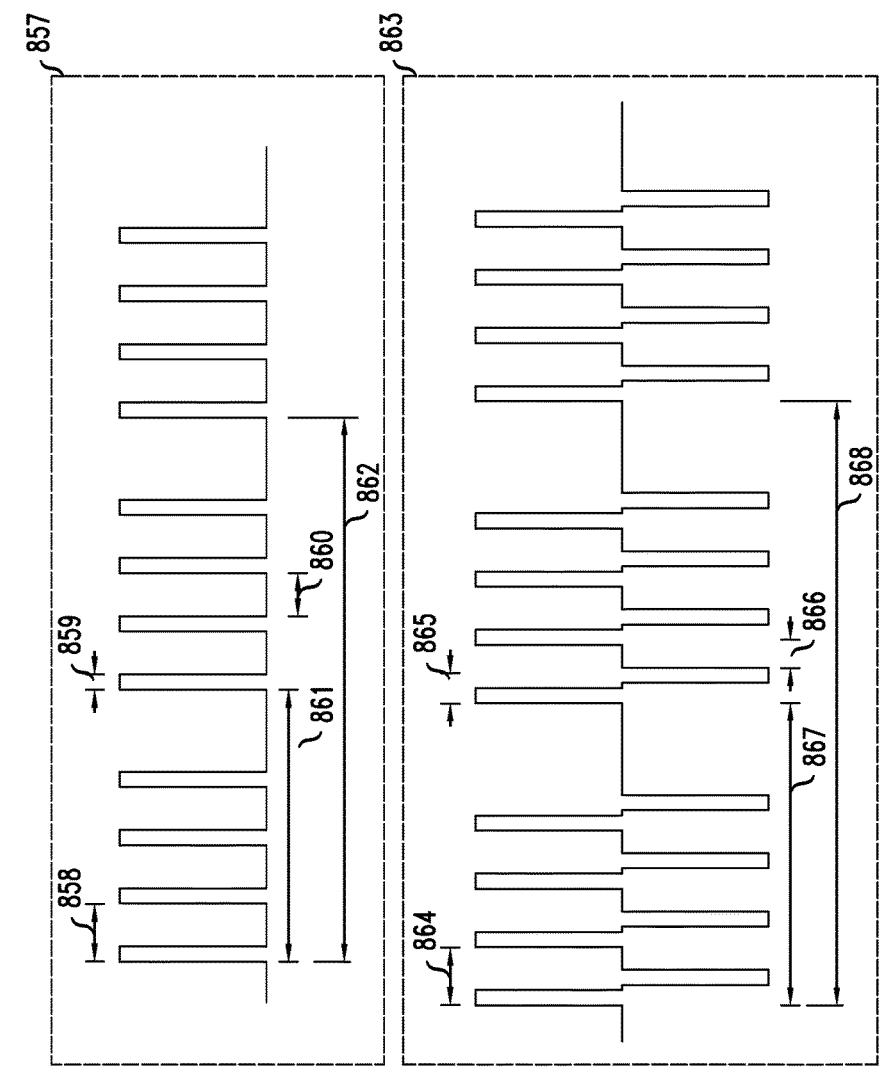
FIG. 8B depicts exemplary waveforms of signals produced by the generator in FIG. 8A according to an embodiment.

As mentioned above, the generator 101 may include a PWM/PDM 829 operable to generate unipolar/bipolar pulse wave signals. Referring now to FIG. 8B, there are shown unipolar and bipolar signal waveforms 857, 863 respectively. Such signals may be used to set the on-time 859 and 865 and off-time 860 and 866 of the unipolar/bipolar pulse wave signals, setting each pulse period 858 and 864 of the unipolar/bipolar pulse signals, setting the duty cycle 861 and 867 of the unipolar/bipolar pulse wave signals and setting the PDM duty cycle 862 and 868 of the unipolar/bipolar pulse wave signals. The overall on-time of the square wave pulse is established by the combination of the pulse width duty cycle and the duty cycle of the PDM. The operating frequencies of the square wave signal 831 may range from 1 kHz to 30 kHz. The PWM/PDM 829 may be connected to an opto-coupler 827 that is operable to output signals 823, 824, 818, and 819 to control the operation of IGBT switches 8112A, 8112B, 814C, and 814D.

Also shown as being a part of the generator 101 in FIG. 8A are monitoring and status LEDs and corresponding circuitry 832. The LEDS may be controlled by the corresponding circuitry to turn on (or off as the case may be) depending on whether the following conditions exist (or not): faulted (e.g., system faults), IGBT FLT (e.g., IGBT faults), HS temperature (e.g., IGBT temperature alert), hot load (e.g., high voltage alert), load LFT (e.g., load fault temperature); high PWR/low PWR (maximum/minimum power of the generator's output), locked (generator inverter disabled due to a previously detected fault), INV ON (inverter switched on).

FIG. 8A also depicts a pulse transformer 845. The transformer 845 may comprise a step-up transformer configured to produce 5 kVA of power based on an input voltage of 240 V, an input current of 41.7 A, an output voltage of 30 kV, and an output current of 0.33 A. The pulse transformer 845 may operate in a unipolar or bipolar pulse mode. In a bipolar pulse mode, the transformer 845 may produce magnetic field lines in its core (not shown in FIG. 8A) that alternate between positive and negative values (i.e., positive field lines crossover zero to negative field lines). This reduces the heat produced by the transformer 845 during its operation as well as core losses of the transformer. In a unipolar mode, an internal bias coil (not shown) of the transformer 845 is connected to a fixed direct current produced by AC/DC transformer 833 to produce biased, magnetic field lines that cross zero. This may also reduce the heat produced by the transformer 845 during its operation as well as core losses of the transformer. Power to the transformer 845 may be controlled by turning the IGBT switches within module 814 "on" or "off" over an operating frequency of 1 kHz to 30 kHz, in which the PDM on time 861, 867 is 35% and the PDM's "off" time is 65%. Further, a Tesla tuning coil 851 may be operable to tune the operating frequency of a power signal provided by the transformer 845 to correspond to a dielectric barrier resonance frequency, $f_0$, of the plasma device 102. The leakage inductance of transformer 845, $L_T$, and the inductance of the Tesla tuning coil 851, $L_{TC}$, and the capacitance of the device 102 $C_P$, determines the dielectric barrier resonance frequency, where:

$$f_0 = \frac{1}{2\pi\sqrt{(L_T + L_{TC})C_P}}$$

Accordingly, a reliable and constant source of power may be provided by the transformer 845 and its associated components to other components of the generator 101 so such other components may, in turn, provide a reliable and constant signal to the plasma discharge section 102 at a power level and operating frequency that corresponds to the creation of optimum fields used to treat unwanted material in a liquid flowing through the plasma discharge section 102.

Figure 10A:
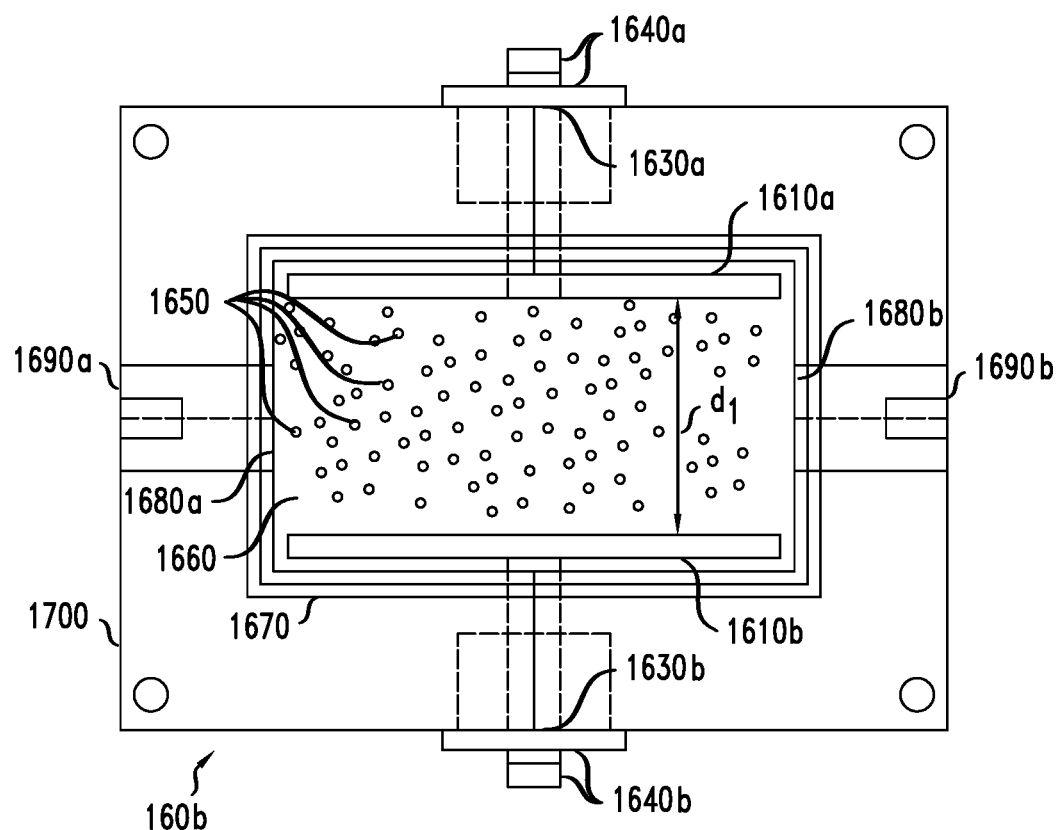
FIG. 10A depicts one view of a device for treating liquids according to one embodiment.
Figure 10B:
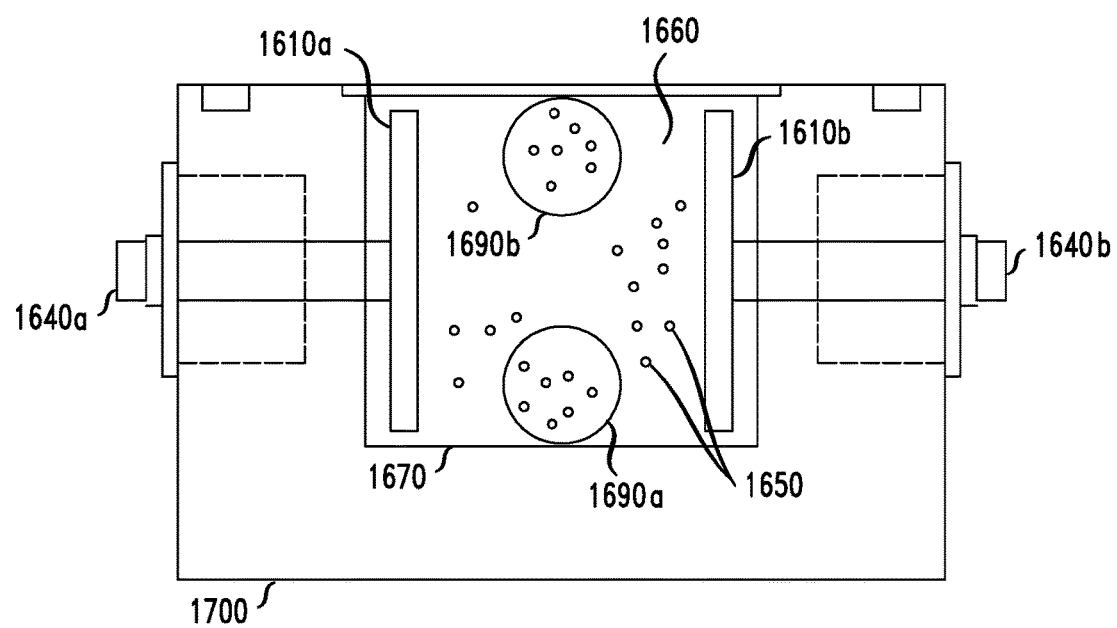
FIG. 10B depicts a second view of the device shown in FIG. 10A.
Figure 10C:
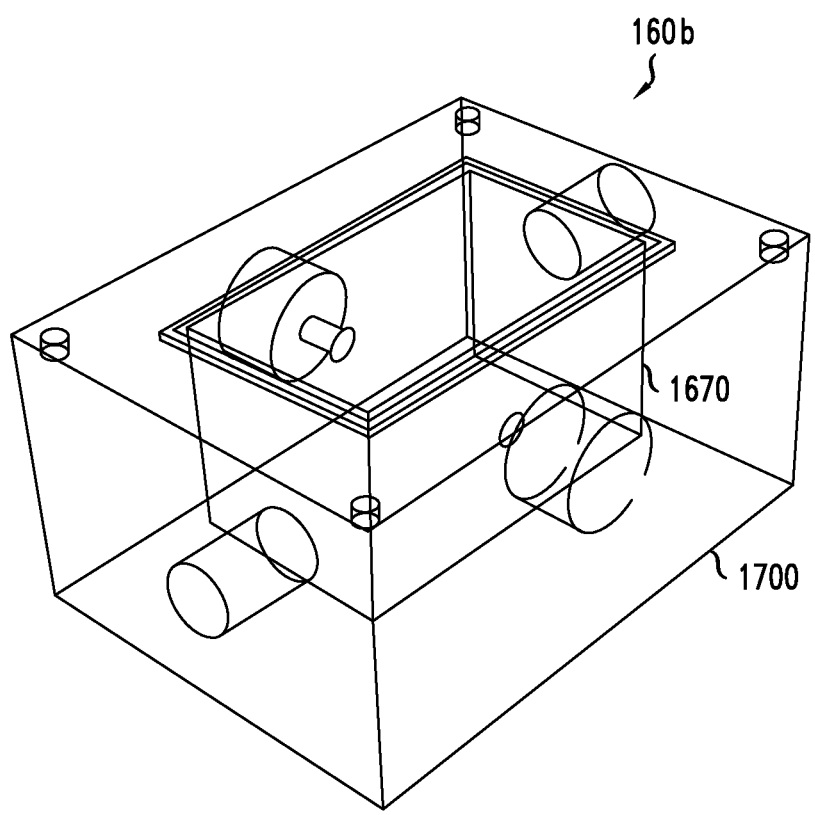
FIG. 10C depicts a third view of the device shown in FIG. 10A.

Referring now to FIGS. 10A through 10C there are depicted views of another EM field section 160 according to an embodiment of the invention. It should be understood that although the EM field section 160 is depicted as being a standalone device (i.e., a separate device or separate from another type of device), it may be combined with a plasma discharge section, such as section 102, described herein, to form device 202 for example. Alternatively, device 160 may be a standalone or separate EM device.

In general, each of the EM or plasma discharge sections described herein may be standalone devices, or sections of another combined device. Accordingly, the phrases "device" or "field section" may be used interchangeably herein unless the context and common sense dictates otherwise.

As shown, the device 160 may comprise immersible elements 1610a, 1610b that may be configured with respect to one another to reduce fringing effects. In more detail, device 160 may comprise: an immersible, positive conductive element 1610a; an immersible, negative conductive element 1610b separated from the first conductive element 1610a by an adjustable distance, $d_1$; means for supplying and/or applying an electrical signal 1630a,1630b, such as a power unit and electrical wires, having a first polarity to the positive conductive element 1610a and an electrical signal having a second, opposite polarity to the negative conductive element 1610b to create an electromagnetic field between the first and second elements 1610a,1610b to treat a liquid within the electromagnetic field that contains unwanted materials.

The elements 1610a, 1610b can be constructed of any electrically conductive material, however, it is preferable that the elements be constructed of a corrosion-resistant material such as stainless steel, aluminum or graphite, for example. The elements 1610a, 1610b may be configured to receive signals from a generator (described elsewhere herein) in order to generate electromagnetic fields that can be applied to unwanted material in a liquid.

The device 160 may further include means for moving 1640a, 1640b the positive and negative conductive elements 1610a, 1610b to adjust the adjustable distance $d_1$, (such as a control system that includes a servo-motor or another controllable motor along with a motor controller), in order to, for example, change a cavity resonant frequency to optimize the treatment of a liquid (such as mineralized water) within the electromagnetic field that contains unwanted materials 1650, such as scale. It should be understood that the unwanted material 1650 depicted in the figures is not shown to scale. That is, it has been enlarged for illustrative purposes. In many cases the unwanted material is microscopic and cannot be seen by the naked eye. In the embodiments depicted in FIGS. 10A through 10C the elements 1610a, 1610b may comprise plates that may be configured with respect to one another to reduce fringing effects, and may be enclosed by a treatment chamber 1670. The chamber 1670 may be operable to surround the immersible elements 1610a, 1610b, and comprise first and second openings 1680a, 1680b connected to input and output supply lines 1690a, 1690b (e.g., pipes) that operate to supply a liquid 1660, such as mineralized water, into the chamber 1670 (via line 1690a, for example) and operate to allow such a liquid to exit the chamber 1670 (via line 1690b, for example). In one embodiment the chamber 1670 may be a chamber having the dimensions of 3 inches in length, 3 inches in width and 5 inches in height while the openings 1680*a*, 1680*b* and associated lines 1690*a*, 1690*b* may have a diameter of ½ inch.

The device 160 may comprise a support structure 1700 that provides support for, and encloses, immersible components 1610*a* through 1690*b*, for example. The support structure 1700 may be made from a Delrin material, for example.

As depicted the first and second immersible elements 1610*a*, 1610*b* may comprise respective, substantially parallel plates that may be configured with respect to one another to reduce fringing effects. For example, in an embodiment of the invention, the surface area of the respective plates 1610*a*, 1610*b* are not the same in order to reduce the effects of fringing. Fringing refers to the portion of an electromagnetic field that is not located between the two elements but instead extends outside of the area between the elements. For example, that portion which surrounds the perimeter or edge of each element. Because this field is outside of the area between the two elements it is not usually involved in the treatment of unwanted materials (e.g., scale) from liquid that flows between the two elements.

In accordance with one embodiment, to reduce the effects of fringing, or, said another way, to focus more of the electromagnetic field to the area between the two elements 1610*a*,1610*b*, the elements 1610*a*,1610*b* may be configured as different sized or shaped elements with respect to one another. That is, different sized or shaped elements may be used. The different sized or shaped elements affect the shape of the resulting electromagnetic field such that more of the field is located in the area between the two elements 1610*a*, 1610*b* than outside the area.

For example, the ratio of the surface area of the positive element 1610*a* to the surface area of the negative element 1610*b* may be in the range 0.75 to 0.90. That is to say the surface area of the positive element 1610*a* may be only 75% to 90% of the surface area of the negative element 1610*b* (i.e., the positive element is smaller than the negative element). In an embodiment of the invention, the different surface areas of the elements 1610*a*, 1610*b* reduces the effects of fringing. It should be noted that although the elements 1610*a*, 1610*b* in FIGS. 10A and 10B are depicted as if they are of equal size (e.g., length) and surface area this is not the case. Rather, the sizes and surface areas of the two elements 1610*a*, 1610*b* differ in order to achieve a reduction in fringing effects described herein.

Continuing, as depicted the elements 1610*a*, 1610*b* may be perpendicularly attached to the means for moving 1640*a*, 1640*b* the first or second conductive elements 1610*a*, 1610*b*. In one example means 1640*a*, 1640*b* may comprise a control system (microcontroller, etc.,) and, in addition, horizontally aligned rods attached to a suitable servo-motor or other motor, and a motor control system (e.g., programmable controller; not shown for clarity). The rods may be made from stainless steel, for example. In one example, the dimensions of each rod may be ½ inch in diameter, and 6 inches in length. In an embodiment, the rods may be compression fitted on each side of the chamber 1670.

Referring more specifically now to FIG. 10B, in one example, mineral water 1660 may traverse a path through the treatment chamber 1670. For example, water 1660 may be input into the chamber 1670 from supply line 1690*a* located at the bottom of the chamber 1670. Once within chamber 1670, the water 1660 may flow between immersible elements 1610*a*, 1610*b* and then be output from supply line 1690*b* at the top of the chamber 1670. The configurations depicted in FIGS. 2B-D permit a sufficient amount of water to flow through the chamber 1670 in order to treat a sufficient amount of unwanted material (e.g., scale), such as calcium carbonate.

In one exemplary operation for treating unwanted materials (e.g., scale) from the liquid (e.g., water), an electrical current having a first polarity may be applied by means 1630*a* to the first element 1610*a* and an electrical current having a second, opposite polarity may be applied by means 1630*b* to the second element 1610*b*. Means 1630*a*, 1630*b* may, for example, comprise a power unit (e.g., generator), associated electrical wiring and other components well known in the art. Upon application of the electrical currents a resulting electromagnetic field is created within the chamber 1670. In an embodiment of the invention, the field lines of the electromagnetic field traverse the water 1660 within the chamber 1670 between the elements 1610*a*, 1610*b*. As described herein, the application of the electromagnetic field to the water 1660 reduces the amount of unwanted material (e.g., scale) 1650 in the water 1660. Upon application of the electrical current the elements 1610*a*, 1610*b* may function as a capacitor whose capacitance is dependent on the distance $d_1$ between the elements and the dielectric constant of the mineralized water or other liquid 1660 within chamber 1670. In more detail, the distance, d1, between the plates determines a certain capacitance that is a function of the sum product of the liquid's permittivity and the plate area divided by d1. As a result, varying the size of d1 will change the resulting capacitance. The inductance of the plates and the resultant capacitance from varying the size of d1 (i.e., tuning) creates a series resonant circuit, in which the resonant frequency is proportional to the reciprocal of the sum of 2 times π times the sum of the square root of the resultant capacitance and the inductance of elements 1610*a*, 1610*b*.

In sum, changing the effective distance d1 between elements 1610*a*, 1610*b* changes the resonance frequency of the parallel plate capacitor formed by the elements 1610*a*, 1610*b* while the electrical currents are applied, as well as changing the flow rate of a liquid passing between the elements 1610*a*, 1610*b* and resulting impedance.

It should be understood that the distance d1 may be selected based on a number of factors. For example, given the fact the distance d1 between elements 1610*a*, 1610*b* traverses a volume of liquid flowing in the chamber 1670, d1 should be selected such that an intended or flow rate of a water transport system is met. That is to say, a given water system typically requires water (or another liquid) to flow at a particular rate. In accordance with an embodiment of the invention, when an inventive device, such as device 160, is connected to such a system the particular flow rate should be maintained.

In an alternative embodiment of the invention, the device 160 may be operable to generate and apply fields to a liquid using modulation frequencies, supplied by a generator described elsewhere herein, that correspond to the ionic cyclotron frequency (e.g., including fundamental frequencies and their harmonics) of a given unwanted material (e.g., ion of a mineral or element) in order to treat a liquid that contains such unwanted material. For example, a frequency set to the ionic cyclotron frequency of a mineral such as (e.g., calcium) may cause the mineral to remain in a dissolved form, and thus prevent the mineral (e.g., calcium) from forming scale in the form of a solid or particulate (e.g., calcium carbonate) in a liquid. Accordingly, in embodiments of the invention the modulation frequency applied to the carrier frequency output by a generator described herein may be varied to match a particular mineral's ionic cyclotron frequency. The resulting variably modulated signal from the generator may be applied to the device 160 (as well as other devices described herein) via means 1630*a, b* for example, to produce an electromagnetic field that is similarly modulated to target a particular mineral by applying a field component (i.e., modulated frequency) that corresponds to the particular mineral's ionic cyclotron frequency.

Figure 10D:
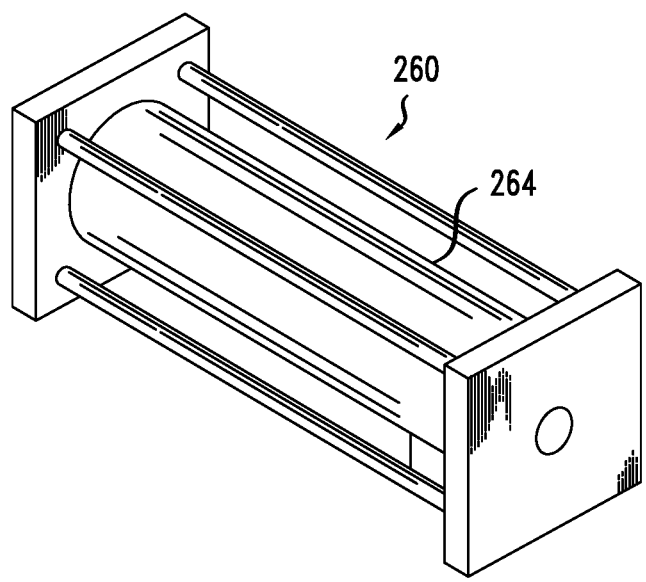
FIG. 10D depicts one view of an alternative device for treating liquids according to another embodiment.
Figure 10E:
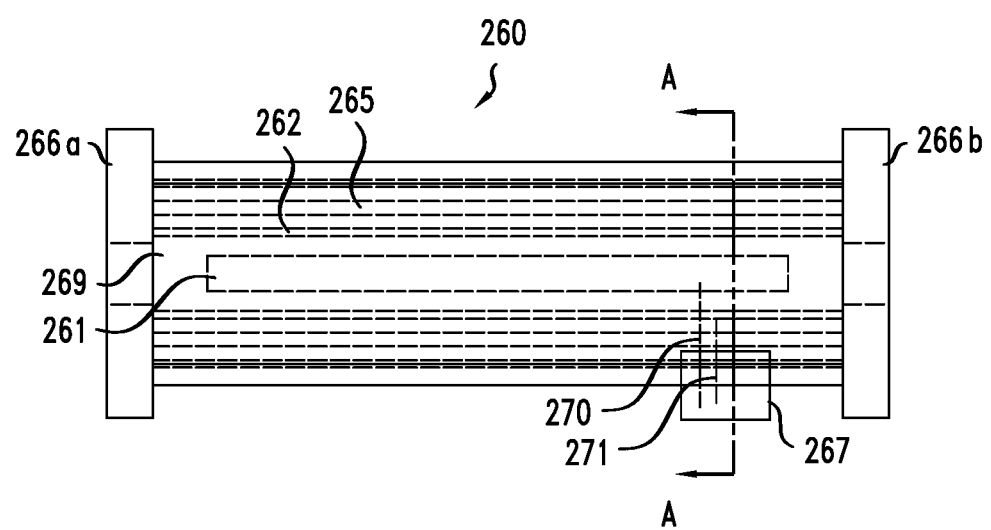
FIG. 10E depicts a second view of the device shown in FIG. 10D.
Figure 10F:
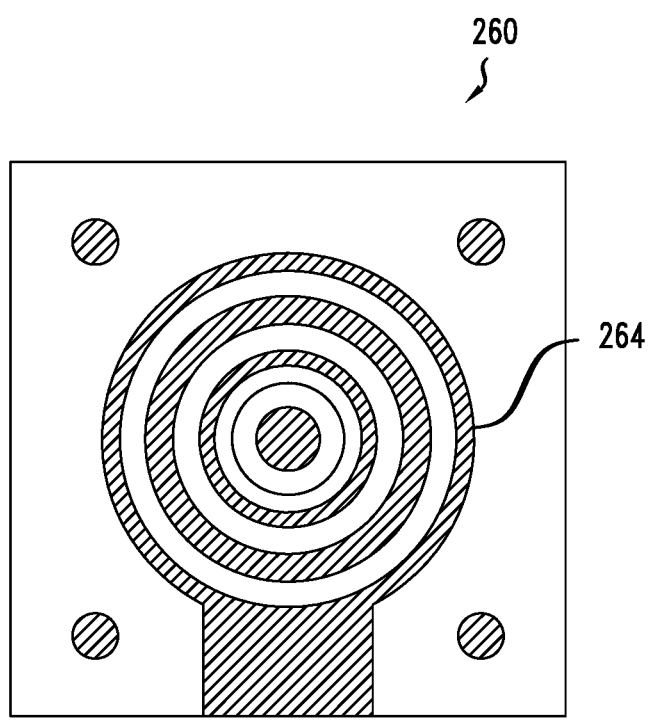
FIG. 10F depicts a third view of the device shown in FIG. 10D.

FIGS. 10D through 10F depict views of an alternative device 260 that utilizes immersible and coaxially aligned, cylindrical structures as elements instead of plates according to an embodiment of the invention.

Referring to FIGS. 10D through 10F, device 260 may comprise an EM device or EM field section. Similar to device 160 discussed previously, it should be understood that although the EM field section 260 is depicted as being a standalone device (i.e., a separate device or separate from another type of device), it may be combined with a plasma discharge section, such as section 102, described herein, to form device 202 for example. Alternatively, field section or device 260 may be a standalone or separate EM device.

Accordingly, in one embodiment device 260 may comprise a cylindrical housing 264 made of 303-stainless steel material, for example. Shown inside the housing 264 is: a horizontally aligned non-conducting cylindrical tube 265 made of Delrin material, for example; an immersible, horizontally aligned stainless steel cylindrical tube 262 made of 303-stainless steel material, for example, hereafter referred to as the positive element; an immersible, horizontally aligned stainless steel cylindrical rod 261 made of 303-stainless steel material, for example, referred to hereafter as the negative element; and two threaded end-caps 266*a,b* made of 303-stainless steel material, for example, for connecting the housing 264 to two pipes made of 0.750 inch stainless steel (not shown) for inputting and outputting a liquid, such as mineralized water into, and out of, the housing 264. As shown immersible elements 261, 262 are coaxially aligned with one another. Elements 261, 262 may be configured with respect to one another to reduce fringing effects.

In exemplary embodiments, some typical dimensions of the components described above are:

housing 264: 3.25 inches in diameter, 12 inches in length, having a wall or thickness of 0.125 inches;

cylindrical tube 265: 2.0 inches in diameter, 0.25 inch wall thickness and 12 inches in length;

cylindrical tube 262: 1.5 inches in diameter, 0.125 inch wall thickness, and 10 inches in length;

cylindrical rod 261: 0.5 inch in diameter, and 8 inches in length; and threaded end-caps 266: each 5.0 inches by 5.0 inches by 0.750 inches with threads for 0.750-inch-thick stainless steel pipes.

Two compression fittings 270, 271 may be electrically connected to the positive and negative elements 261,262. The other ends of the compression fittings 270, 271 function as electrical terminals for connecting the device 260 to a terminal block 267. The annulus spacing between the elements 261,262 forms a treatment chamber 269.

In an embodiment, the elements 261,262 may form a cylindrically shaped, coaxial capacitor whose capacitance depends on the annulus spacing between the elements 261, 262 and the dielectric constant of the liquid (e.g., mineralized water) flowing in the device 260. Changing the effective annulus spacing of the elements changes the resonance frequency of the device when electrically stimulated. In an exemplary embodiment, this annulus spacing may be 2 inches, for example.

As described before, tuning the device 260 to a cavity resonant frequency or applying a modulation frequency to the device 260 that corresponds to an ionic cyclotron frequency of a given ion of a mineral or element (i.e., unwanted material) present in a liquid, such as water, may also aid in the treatment of a liquid that contains such unwanted material. Accordingly, in an embodiment of the invention, the device 260 may be operable to generate and apply fields to a liquid using modulation frequencies, supplied by a generator described elsewhere herein, that correspond to the ionic cyclotron frequency (e.g., including fundamental frequencies and their harmonics) of a given unwanted material (e.g., ion of a mineral or element) in order to treat a liquid that contains such unwanted material.

In accordance with one embodiment, to reduce the effects of fringing the elements 261,262 may be configured with respect to one another to reduce such effects. Said another way, two different sized elements 261, 262 are used. The different sized elements affect the shape of the resulting electromagnetic field such that more of the field is located in the area between the two elements 261, 262 than outside the area.

For example, the ratio of the length of the positive element 261 to the length of the negative element 262 may be in the range 0.75 to 0.90, for example. That is to say the length of the positive element 261 may be only 75% to 90% of the length of the negative element 262 (i.e., the positive element is shorter than the negative element). In an embodiment of the invention, the different lengths of the elements 261,262 reduces the effects of fringing.

In an embodiment of the invention, device 260 may have an impedance of 50 Ohms that is impedance matched to a generator, such as generator 600 depicted in FIGS. 11C through 11F or other generators described herein. Impedance matching may be completed through the use of an impedance matching control system, such as the smart control system 111 in FIG. 7 or system 400 depicted in FIG. 12A.

When either device 160 or 260 is connected to a generator (such as generator 600 in FIG. 11C or other generators described elsewhere herein), the device 160 or 260 may be configured to receive output signals from such a generator and then generate the electromagnetic fields that are applied to treat a liquid that contains unwanted material. In these embodiments, the electromagnetic fields generated by the devices 160, 260 will comprise a dominant electric field. In additional embodiments described herein, the present inventors provide devices that generate an electromagnetic field comprising a dominant magnetic field, and devices that combine both dominant electric and magnetic fields.

Regardless of the type of device, in embodiments of the invention, the signal provided by a generator and supplied to the device 160 or 260 (or other devices described herein) may include a variable modulation frequency that corresponds to the ionic cyclotron frequency of a mineral (or element or ion of such a mineral or element), such as calcium. Thereafter, the electric field created by a device, such as 160 or 260, and applied to the liquid passing through device 160 or 260 may be similarly modulated.

In general, it is believed that electromagnetic fields generated by devices 160, 260 will prevent the buildup of unwanted material, such as scale deposits directly on inventive devices described herein. It is also believed that electromagnetic fields break up unwanted materials (e.g., scale) that have accumulated within a conduit or container, and such fields will eventually treat such unwanted materials so that the unwanted material may be silted out or otherwise filtered out in the form of a fine powder.

It is further believed that the application of electromagnetic fields to a liquid (with, and without the application of plasma discharges) also contribute to sterilizing and decontaminating liquids (e.g., water) containing microbial contaminants (e.g., bacteria, amoeba, protozoa, algae, fungus, etc.). It is believed that a fast rising spike (i.e., quickly rising high amplitude waves) in the electromagnetic signal (as opposed to merely the implementation of low amplitude radio frequency waves) may be critical to biological contaminant purification. This spike appears to act as a shock to the bacteria, amoeba, protozoa, etc., within the water and breaks down their protective mechanisms.

In embodiments of the invention, when a plasma or EM devices or device section is used to control bacteria, ameba, protozoa, algae, fungus, etc., pulse rate frequencies of the electromagnetic field(s) provided by a generator (such as generator 101 or 600) can be set to coincide with generally accepted frequencies that control particular types of organisms. For example, the control frequency for $E.$ $Coli$ bacteria is generally known to be 802 Hz. The voltage output on such frequencies can preferably be between 2,000 and 5,000 volts.

Figure 10G:
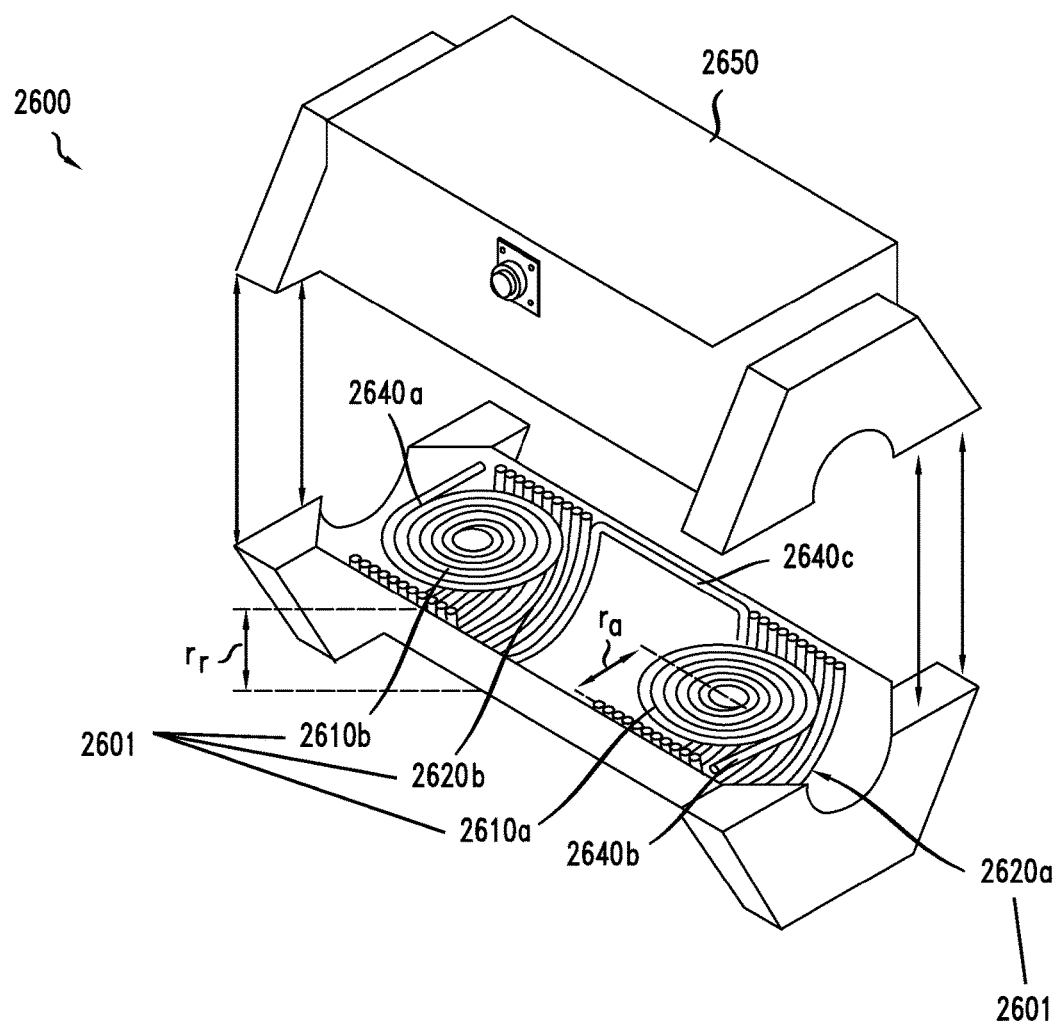
FIG. 10G depicts yet another device for treating liquids according to an additional embodiment.

Referring now to FIG. 10G there is depicted yet another embodiment of a device 2600 for treating unwanted material in a liquid using electromagnetic fields. In particular, the device depicted in FIG. 10G may include water-immersible members, and an integrated broadband electromagnetic generator and smart control system 2650. The device 2600 may include a magnetic field device comprising one or more immersible elements, such as axial coils 2610a, 2610b and one or more radial coils 2620a, 2620b that are operable to create an electromagnetic field having a dominant magnetic field component to treat the liquid (e.g., water) that passes through the device 2600 when the device 2600 is installed in a water transport system, for example. Together the immersible coils 2610a, 2610b and 2620a, 2620b form a device 2601. In an embodiment each one of the radial coils 2620a, 2620b is paired with a different one of the axial coils 2610a, 2610b to form a pair of electrodes. As depicted in FIG. 10G the electrodes may be connected using compression fitting electrode connectors 2640a, 2640b and 2640c.

In an embodiment the device 2601 may comprise an inner hollow structure (e.g., copper pipe with inner wall 2602) that forms a pathway and an outer stainless steel covering (e.g., shell) that surrounds the hollow structure in order to shield the inner pathway from corrosive materials in the liquid, for example.

As indicated, the device 2600 is shown including an integrated generator and smart control section 2650 (e.g., impedance matching circuitry) that is described elsewhere herein, it being understood that the device 2600 may also be used with a separate generator and smart control system.

Device 2601 is depicted as a so-called Helmholtz "coil" or coil configuration. That is, in accordance with embodiments of the invention the axial coils 2610a, b and radial coils 2620a, b may be configured in a Helmholtz coil configuration. As may be known to those skilled in the art, the total magnetic field from the radial coils 2620a, b is the sum of the magnetic fields from both radial coils 2620a, b. Correspondingly, the total magnetic field from the axial coils 2610a, and 2610b is the sum of the magnetic fields from both axial coils 2610a and 2610b.

In embodiments of the invention, the device's 2601 total magnetic field, $B_{Tot}$, is the sum of the magnetic field of the radial and axial coils, namely, $B_{Tot}=B_{Radial}+B_{Axial}$ at a point (x), where (x) is measured from the midpoint of the separation distance between the device's 2601 radial coils 2620a,b and axial coils 2610a,b coils. More particularly, the total magnetic field $B_{Tot}$ may be derived from the following relationships:

$$B_{Tot}=B_{Radial}+B_{Axial}=(\mu_o NIr^2)/([d/2-x]^2+r^2)^{3/2}+(\mu_o NIr^2)/([d/2+x]^2+r^2)^{3/2}$$

In embodiments of the invention, device 2601 magnetic field (B) is uniform where (x)=0. If the electrical current is (I), the number of coil turns is (N) and ($\mu_o$) is the permeability of the stainless steel coils, then the magnetic field of the device 2601 (and any dominant magnetic field section of a device, discussed further below) can be determined from the relationship:

$$B=(8\mu_o NI)/\sqrt{125}r$$

With continued reference to FIG. 10G, in embodiments of the invention the radius, $r_a$, of each of the axial coils 2610a, and 2610b are equal, and the distance between each axial coil is equal to the radius, $r_a$, of an axial coil. In addition, the radius, $r_r$, of each of the radial coils 2620a and 2620b are equal, and the distance between each radial coil is equal to the radius of a radial coil.

In embodiments of the invention, the radial and axial coils may be spaced away from an inner wall 2602 of the device 2600 to minimize attenuation of the magnetic field created by the coils.

Figure 10H:
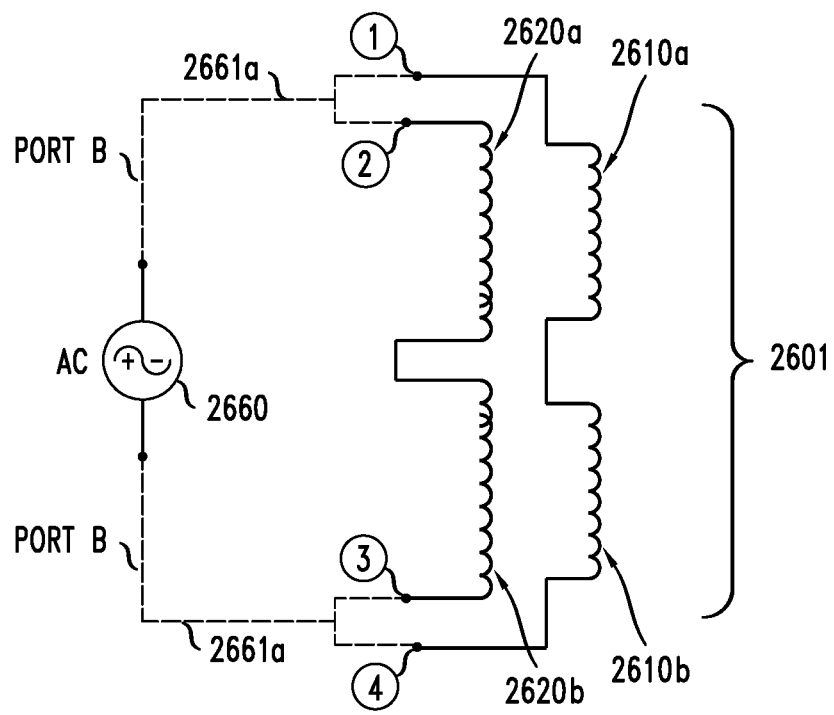
Figure 101:
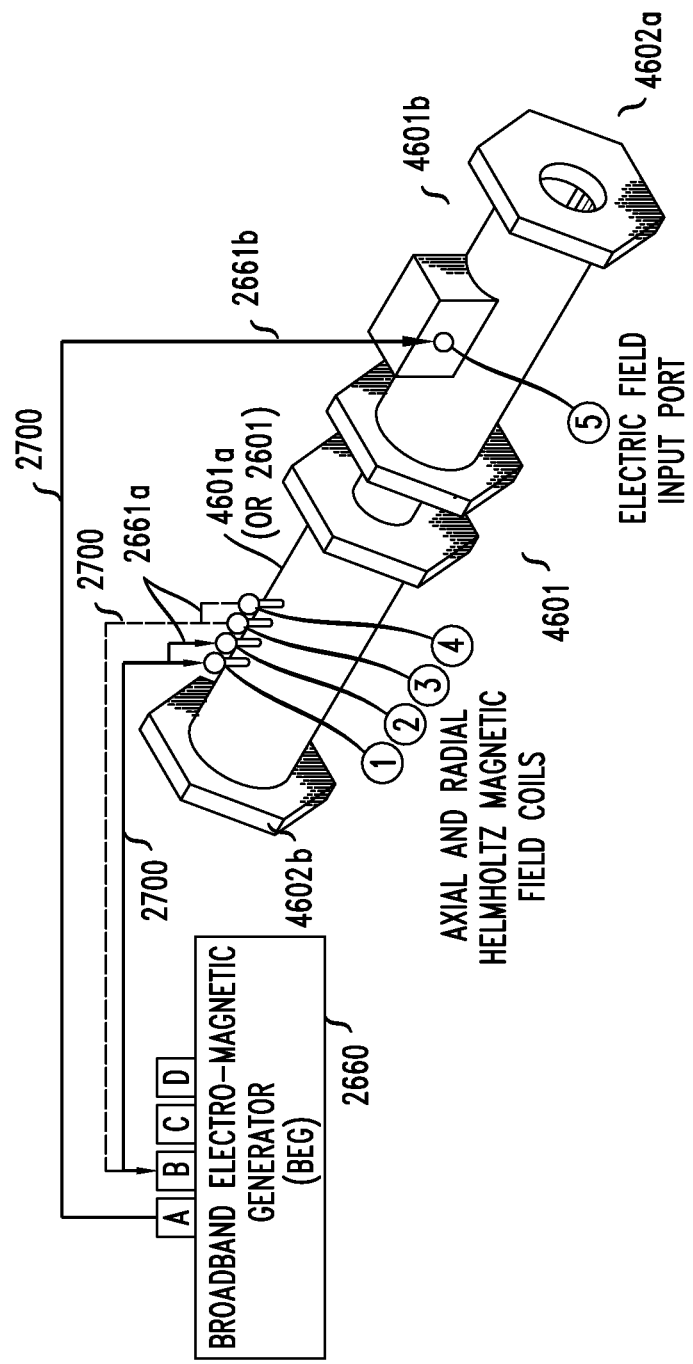

FIG. 10H depicts an exemplary, simplified electrical diagram of device 2600. In the embodiment depicted in FIG. 10H, the immersible coils 2610a, and 2610b and 2620a, and 2620b are connected to a broadband electromagnetic generator 2660. The generator 2660 may be operable to generate signals at frequencies between 10 kHz and 100 MHz, for example.

In more detail, the coils may be connected to a particular port of the generator 2660 which we will refer to as "port B", it being understood that this designation is arbitrary and the inventors could use any number of different designations. As connected in FIG. 10H the generator 2660 may be operable to output and supply a uniform, time-varying signal 2661a to the axial and radial coils 2610a, and 2610b and 2620a, and 2620b, respectively, to enable the coils 2610a, and 2610b and 2620a, and 2620b making up device 2601 to produce a uniform, time-varying-magnetic field that, when applied to a liquid by the coils 2610a, and 2610b and 2620a, and 2620b treats unwanted material in the liquid (e.g., prevents and or mitigates scale (CaC0$_3$)). As indicated elsewhere herein, and reiterated here, the signal 2661a output by the generator 2660 and supplied to the coils 2610a, and 2610b and 2620a, and 2620b via electrical conductors, for example, may include a variable modulation frequency that corresponds to the ionic cyclotron frequency of calcium, for example, or another mineral, element or ion of calcium or another mineral or element. Thereafter, the magnetic field created by coils 2610a, and 2610b and applied to the liquid passing through device 2601 may be similarly modulated.

FIG. 10I depicts a simplified, exemplary diagram depicting the connection of another exemplary device 4601 to the signal generator 2660 in accordance with the electrical circuit diagram of FIG. 2I. Though the device 4601 depicted in FIG. 10I is a dual-field device (discussed further below) that comprises both a magnetic field dominant section 4601a and an electric field dominant section 4601b, the magnetic field section 4601a includes immersible elements similar to device 2601. Accordingly, we shall refer to FIG. 10I to illustrate how the device 2601 (or any magnetic field device or section described herein) may be connected to, and operate in conjunction with, the signal generator 2660.

Continuing, the generator 2660 may be connected to the magnetic field dominant section 4601a or device 2601 (as described with reference to FIG. 10H) via electrical conductors 2700, for example.

As connected, the generator 2660 is operable to provide a uniform time-varying signal 2661a to section 4601a or device 2601 and its immersible elements (e.g., Helmholtz coils). When so connected and provided, the section 4601a or device 2601 may be operable to produce a uniform, time-varying-magnetic field that, when applied to a liquid, such as water, passing through the device 4601 or 2601 treats unwanted material in the water. As indicated elsewhere herein, and reiterated here, the signal 2661a provided by the generator 2660 may include a variable modulation frequency that corresponds to the ionic cyclotron frequency of calcium, for example. Accordingly, the magnetic field created by section 4601a or device 2601 and applied to the liquid passing through device 4601 or 2601 may be similarly modulated.

FIG. 10I also includes a depiction of the connection of the generator 2660 to the electric field dominant section 4601b via electrical conductors 2700, for example, in order to provide signal 2661b to section 4601b and its associated immersible elements. Section 4601b may be similar in structure and operation to device 260 or another electric field device described elsewhere herein in that it is operable to create and apply a dominant electric field to a liquid passing through device 4601.

Figure 10J:
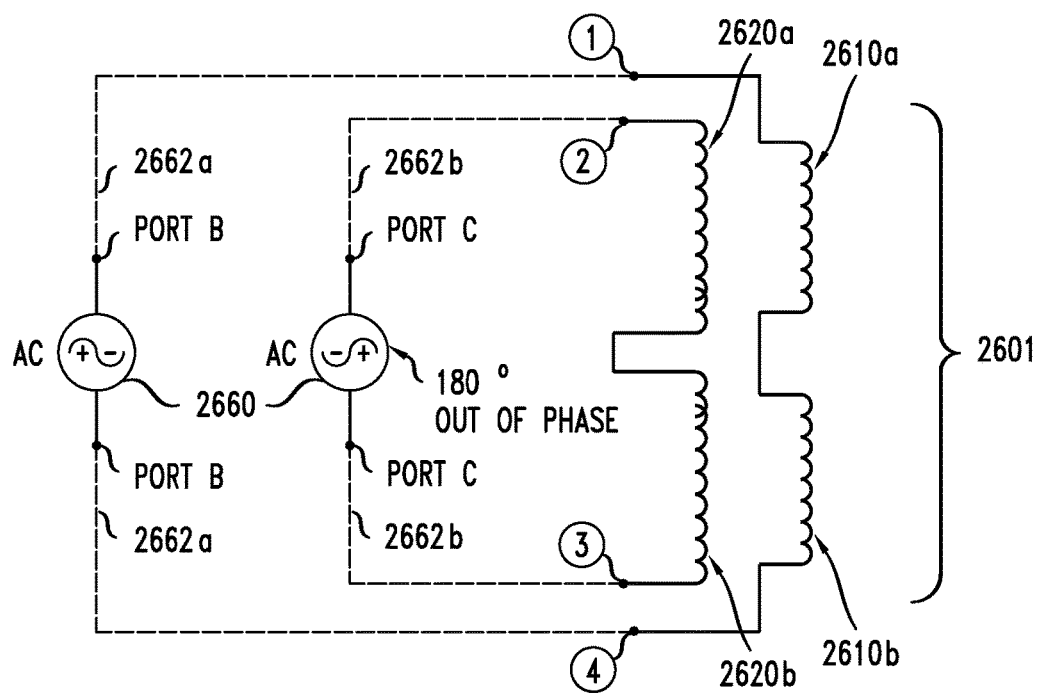

Referring now to FIG. 10J there is depicted another exemplary, simplified electrical diagram of device 2600 (or a magnetic field dominant section). In accordance with embodiments of the invention the immersible axial coils 2610a, and 2610b and radial coils 2620a, and 2620b may again be configured in a Helmholtz coil configuration, and connected to the broadband electromagnetic generator 2660. However, the coils 2610a, and 2610b and 2620a, and 2620b in FIG. 2K are connected to the generator 2660 differently than the coils in FIG. 10H.

In more detail, the axial coils 2610a and 2610b may be connected to port B of the generator 2660 while coils 2620a, and 2620b may be connected to a different port, designated as port C, of the generator 2660. As connected in FIG. 10J the generator 2660 may be operable to output time-varying signals 2662a, and 2662b that are out of phase with one another, where signal 2662a is output via port B and signal 2662b is output via port C. In one embodiment, signals 2662a and 2662b may be 180 degrees out of phase with one another. Such out-of-phase signals, when applied to the coils 2610a, and 2610b and 2620a, and 2620b of device 2601 (or a magnetic field dominant section) may enable the coils 2610a, and 2610b and 2620a, and 2620b making up device 2601 to produce an oscillating, time-varying-magnetic field that, when applied to a liquid such as water, treats unwanted material in the water. The signals 2662a, and 2662b provided by the generator 2660 and supplied to the coils 2610a, and 2610b and 2620a, and 2620b may include a variable modulation frequency that corresponds to the ionic cyclotron frequency of calcium, for example (or another mineral, element or ion of calcium or another mineral or element). Accordingly, the magnetic field created by coils 2610a, and 2610b and 2620a, and 2620b and applied to the liquid passing through device 2601 may be similarly modulated.

FIG. 10K depicts a simplified, exemplary diagram depicting the connection of an exemplary dual-field device 4601 to the signal generator 2660. Again, though the device 4601 depicted in FIG. 10K is a dual-field device (discussed further below) that comprises both a magnetic field dominant section 4601a and an electric field dominant section 4601b, the magnetic field section 4601a includes immersible elements similar to device 2601. Accordingly, we shall refer to FIG. 10K to illustrate how the device 2601 (or any magnetic field device or section) may be alternatively connected to the signal generator 2660.

Continuing, the generator 2660 may be connected to the magnetic field dominant section 4601a or device 2601 in accordance with the electrical circuit diagram of FIG. 10J via electrical conductors 2700, for example. As shown, the generator 2660 may be connected to the magnetic field dominant section 4601a or device 2601 in order to supply oscillating, time-varying signals 2662a, and 2662b to section 4601a or device 2601 and their associated, respective, immersible coils. When so connected and provided, the section 4601a or device 2601 may be operable to produce an oscillating, time-varying-magnetic field that, when applied to a liquid such as water, treats unwanted material in the water. As indicated elsewhere herein, and reiterated here, the signals 2662a, and 2662b provided by the generator 2660 may include a variable modulation frequency that corresponds to the ionic cyclotron frequency of calcium, for example. Accordingly, the magnetic field created by the device 4601 or 2601 (i.e., by their immersible coils) and applied to the liquid passing through device 4601 or 2601 may be similarly modulated.

Figure 10L:
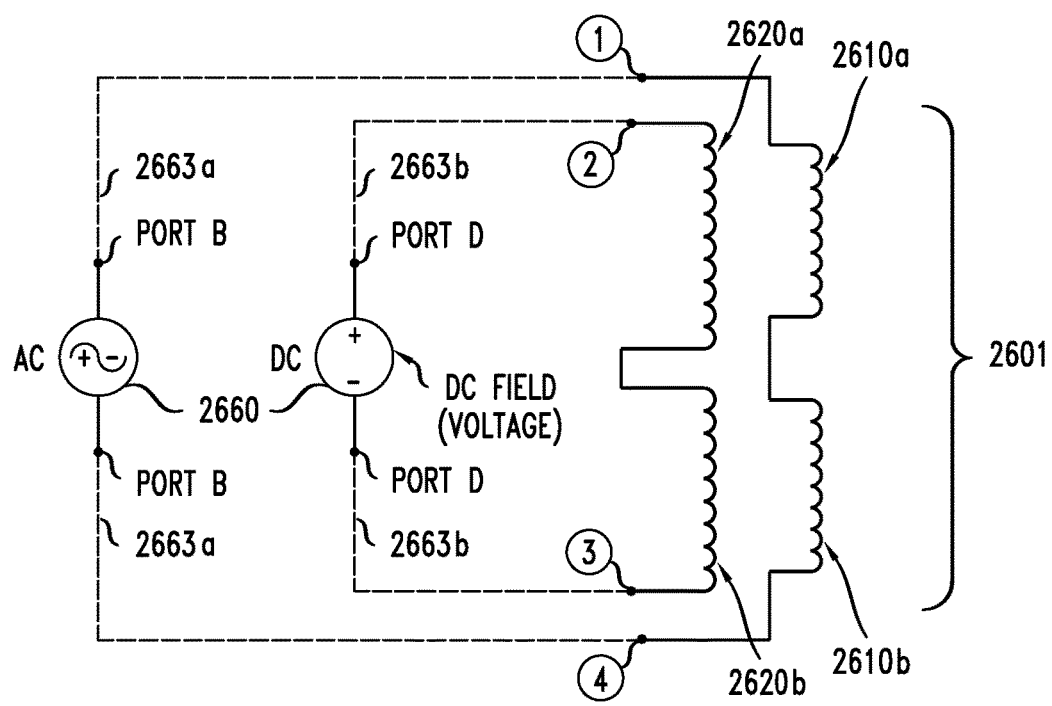

Referring now to FIG. 10L there is depicted yet another exemplary, simplified electrical diagram of device 2600 (or a magnetic field dominant section 4601a). In accordance with embodiments of the invention the immersible axial coils 2610a, and 2610b and radial coils 2620a, and 2620b may again be configured in a Helmholtz coil configuration, and connected to the broadband electromagnetic generator 2660. However, the coils 2610a, and 2610b and 2620a, and 2620b in FIG. 10L are connected to the generator 2660 differently than the coils in FIGS. 10H and 10J.

In more detail, the axial coils 2610a, and 2610b may be connected to port B of the generator (or port C) while coils 2620a, b may be connected to a different port, designated as port D, of the generator 2660. As connected in FIG. 10L the generator 2660 may be operable to output signal 2663a via port B and signal 2663b via port D, for example. In one embodiment, signal 2663a is a time-varying signal while signal 2663b may be a steady-state signal (non-time varying, e.g., direct current), for example.

Such signals, when supplied to the immersible coils 2610a, and 2610b and 2620a, and 2620b of device 2601 (or a magnetic field dominant section 4601a) may enable the coils 2610a, and 2610b and 2620a, and 2620b making up device 2601 to produce both a time-varying-magnetic field and steady-state magnetic field that, when applied to a liquid such as water, treats unwanted material in the water. The signal 2663a provided by the generator 2660 and supplied to the coils may include a variable modulation frequency that corresponds to the ionic cyclotron frequency of calcium, for example. Accordingly, a magnetic field created by coils and applied to the liquid passing through device 2601 may be similarly modulated.

Figure 10M:
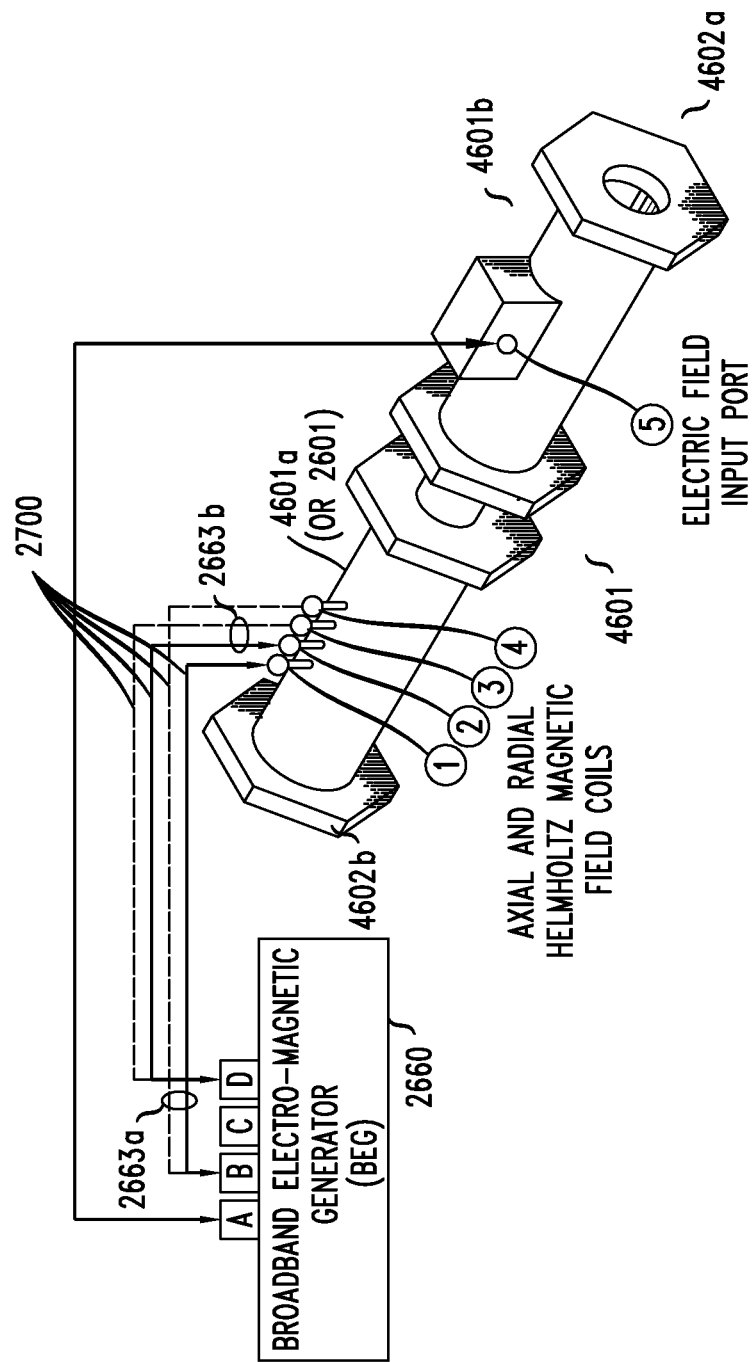

FIG. 10M depicts a simplified, exemplary diagram depicting the connection of an exemplary dual-field device 4601 to the signal generator 2660. Once again, though the device 4601 depicted in FIG. 10M is a dual-field device that comprises both a magnetic field dominant section 4601a and electric field dominant section 4601b, the magnetic field section 4601a includes immersible elements similar to device 2601. Accordingly, we shall refer to FIG. 10M to illustrate how the device 2601 (or any magnetic field device or section) may be alternatively connected to the signal generator 2660.

As shown, the generator 2660 may be connected to the magnetic field dominant section 4601a or device 2601 in accordance with the electrical circuit diagram of FIG. 10L via electrical conductors 2700, for example, in order to supply both time-varying and steady-state signals 2663a, and 2663b to section 4601a or device 2601 and their associated, respective immersible coils. When so connected and provided, the section 4601a or device 2601 may be operable to produce both time-varying and steady-state magnetic fields that, when applied to a liquid such as water, treats unwanted material in the water. As indicated elsewhere herein, and reiterated again here, the signals 2663a, and 2663b provided by the generator 2660 may include a variable modulation frequency that corresponds to the ionic cyclotron frequency of calcium, for example. Thereafter, the magnetic field created by coils of the magnetic field section 4601a or device 2601 and applied to the liquid passing through device 4601 or 2601 may be similarly modulated.

Figure 10N:
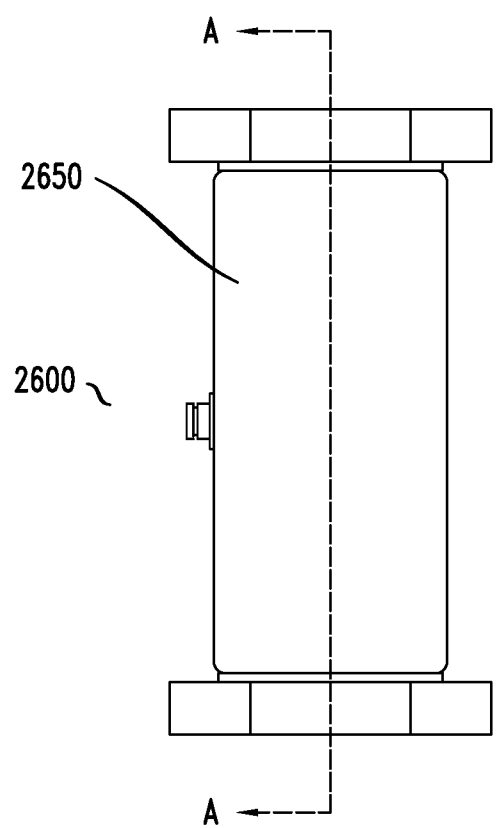
Figure 100:
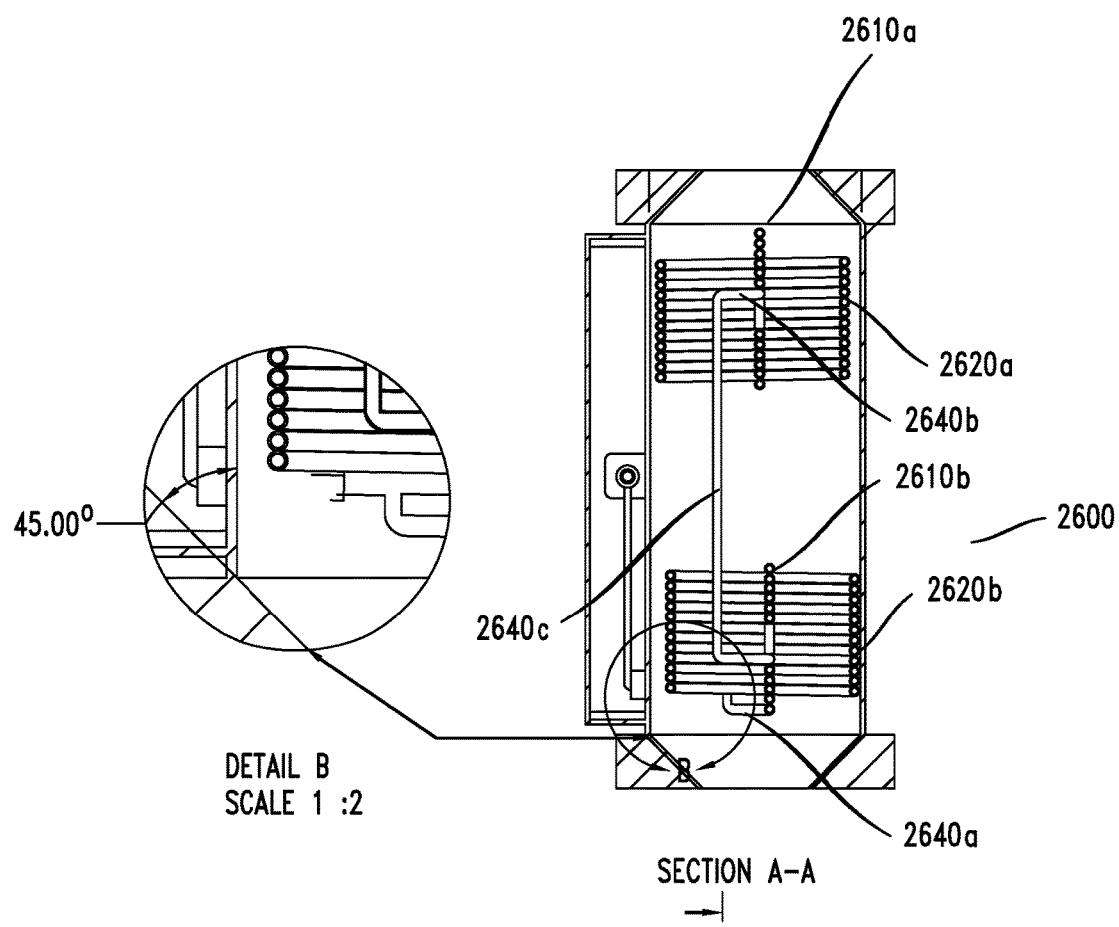

FIGS. 10N and 10O depict additional views of the device 2600. In particular, FIG. 10O depicts a view taken along axis A-A of FIG. 10N. In FIG. 10O connectors 2640a, 2640b and 2640c can be seen connecting coils 2620a, 2620b and 2610a, 2610b, respectively.

It should be understood that devices 2601 and 4601 may be substituted for devices 160, 260 described elsewhere herein. Accordingly, for the sake of brevity the inventors will not repeat the description of those figures that depict devices 160 and 260, it being understood that such a description applies to devices 2601 and 4601.

It should be understood that the devices and their associated immersible elements or coils described herein, including but not limited to devices 2601 and 4601, may be tuned to operate at a cavity resonant frequency, and be operable to receive modulated signals in order to generate electromagnetic fields that are similarly modulated using modulation frequencies that correspond to an ionic cyclotron frequency (e.g., fundamental frequencies and their harmonics) of a given mineral or element (e.g., calcium carbonate) present in a liquid, such as water. Accordingly, in an embodiment of the invention, the devices 2601, 4601 may be operable to generate and apply fields to a liquid using modulation frequencies, supplied by a generator, such as generator 2660, that correspond to the ionic cyclotron frequency (e.g., including fundamental frequencies and their harmonics) of a given unwanted material (e.g., ion of a mineral or element) in order to treat a liquid that contains such unwanted material.

Figure 10P:
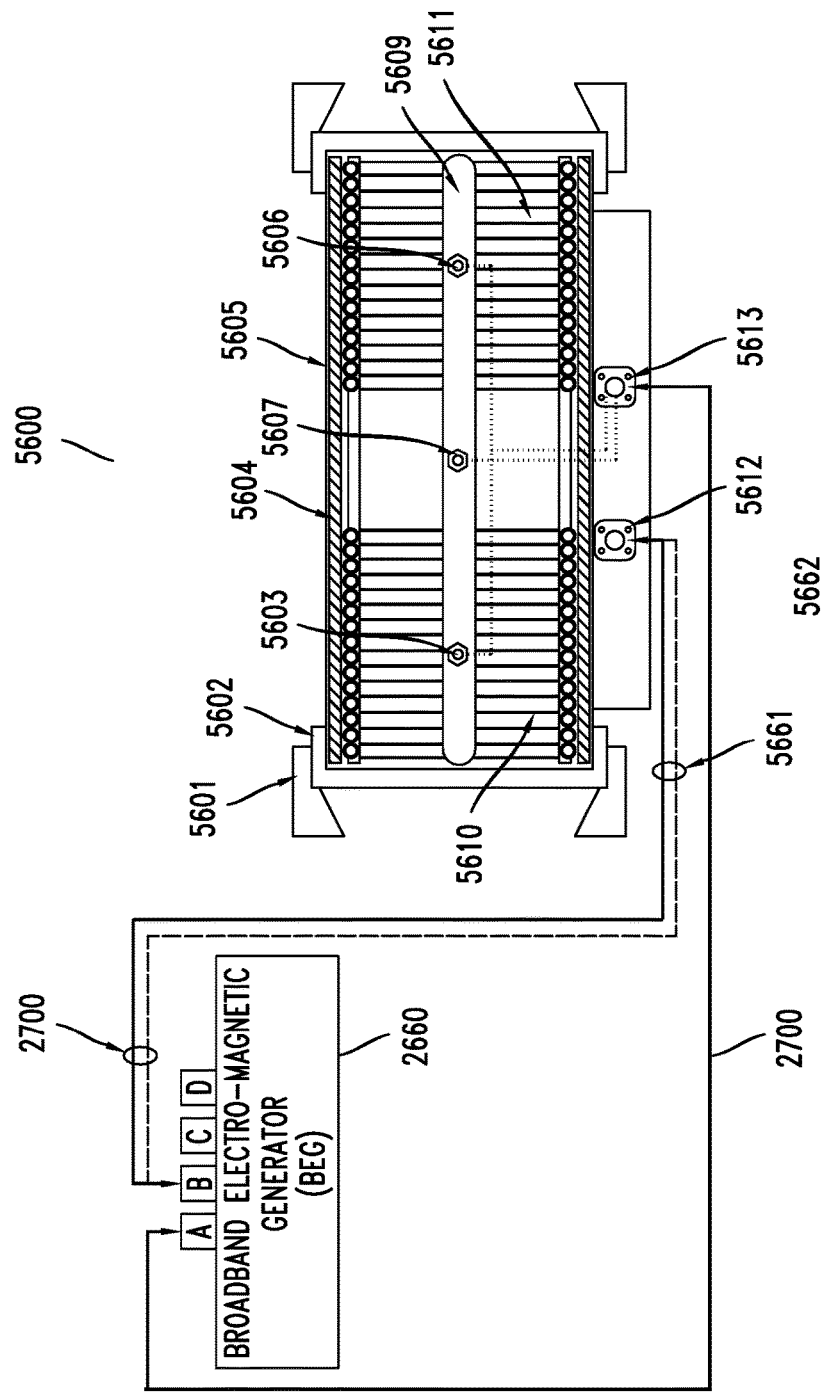
FIG. 10P depicts still another device for treating liquids according to an additional embodiment.
Figure 10Q:
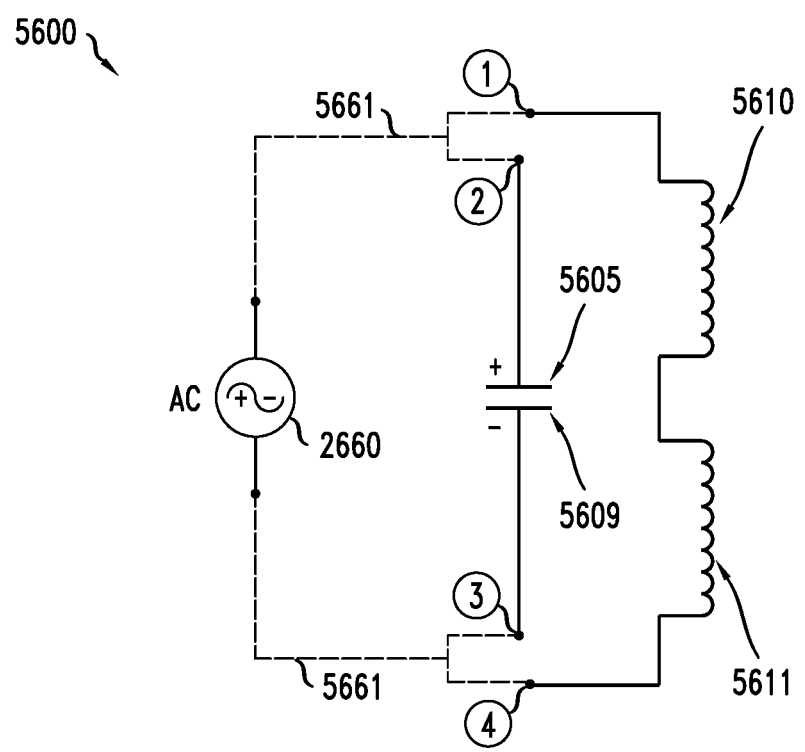
FIGS. 10Q and 10R depict simplified electrical circuit diagrams for the device shown in FIG. 10P.
Figure 10R:
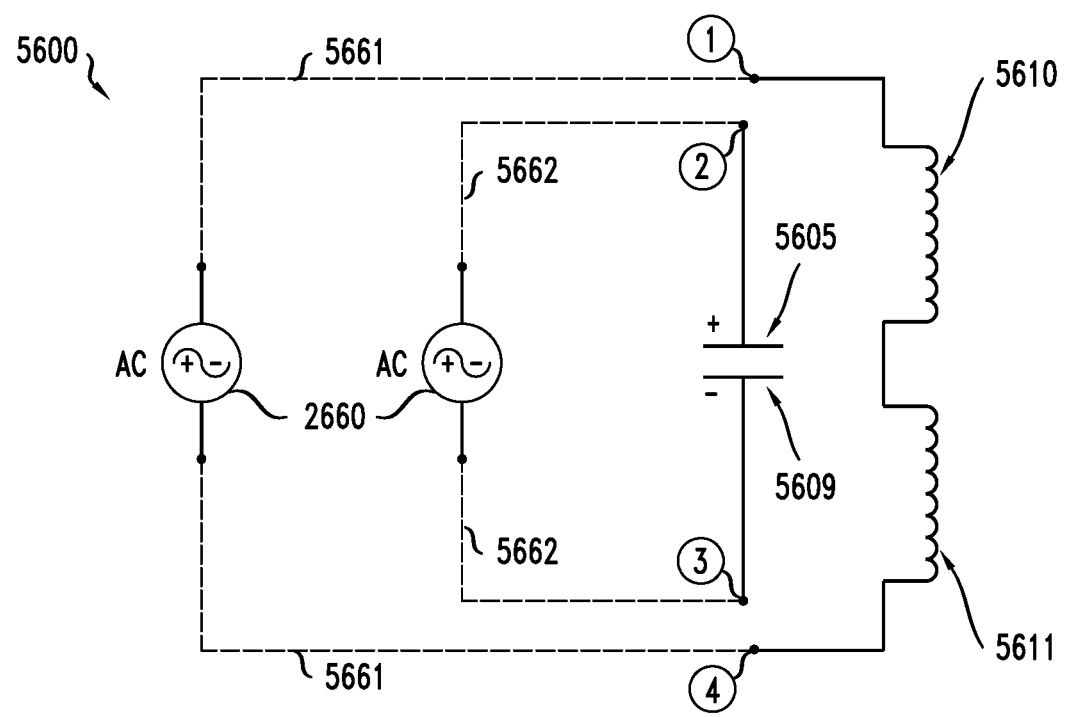
Figure 10S:
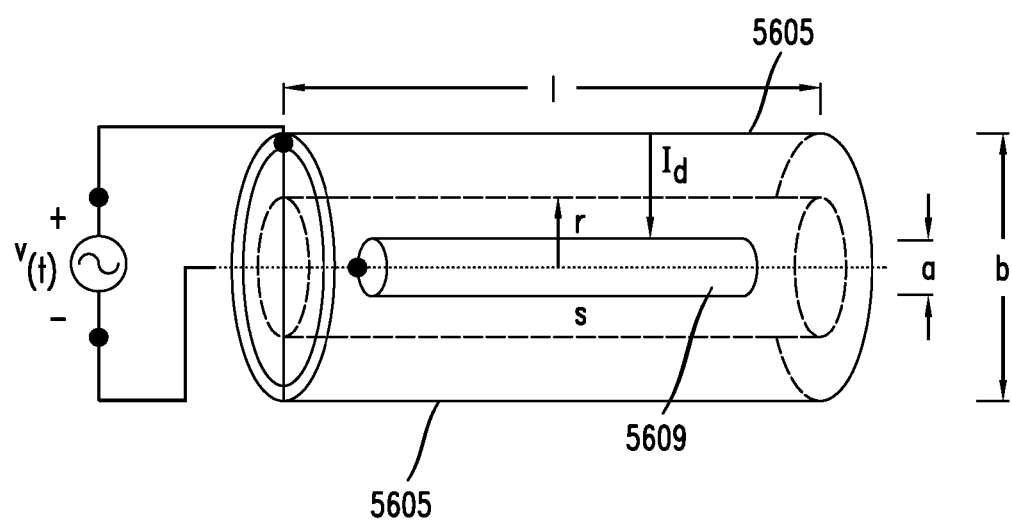
FIG. 10S depicts a representation of how forces created by the application of electromagnetic fields may be computed.
Figure 10T:
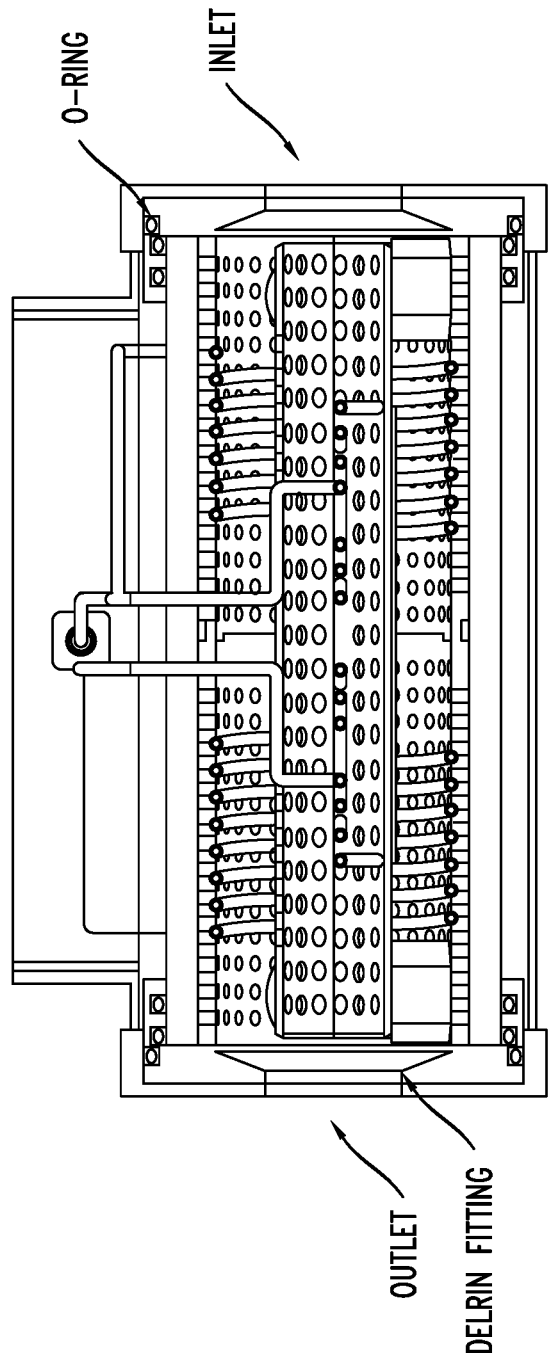
FIGS. 10T and 10U depict views of the internal structure of a magnetic field device or magnetic field section according to embodiments of the invention.
Figure 10U:
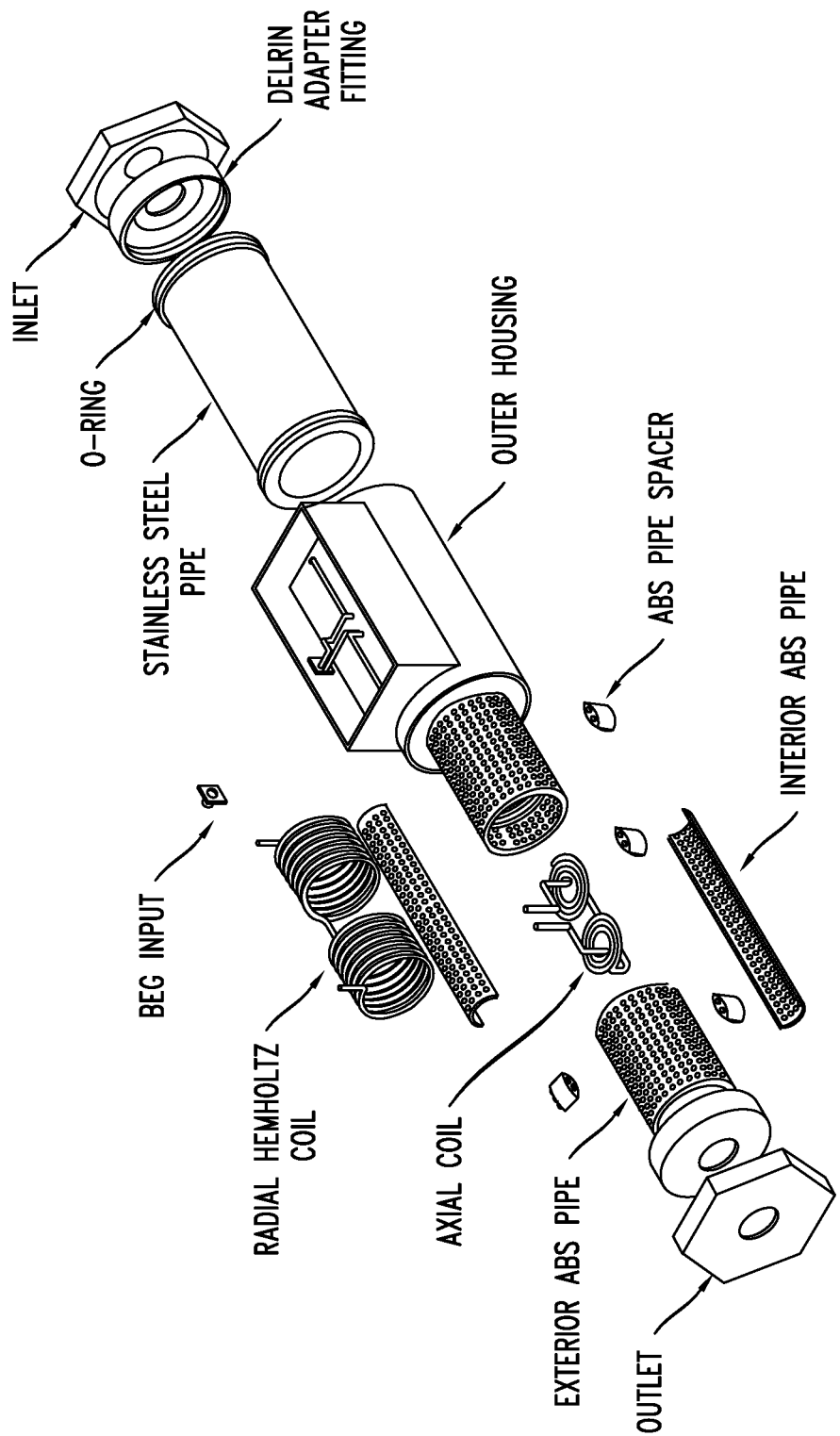

FIGS. 10T and 10U depict an exemplary internal structure of a magnetic field device or section according to embodiments of the invention. As depicted in FIG. 10T, radial and axial coils may be secured to a housing by three components: exterior ABS pipes (two pieces, left and right), interior ABS pipes (two pieces, top and bottom), and a plurality of ABS pipe spacers (e.g., six).

In accordance with one embodiment an exterior ABS pipe may be threaded on the inside, where the radial coil sits in the device housing. It acts as a fitting that restricts movement as well as electrically isolating the coil from a stainless steel pipe. The exterior ABS pipe may be perforated to limit the effect on the flow rate of a liquid. Two Delrin fittings, secured around the stainless steel pipe with two O-rings each on the inlet and the outlet, keep the exterior ABS pipe from moving inside the stainless steel pipe.

The interior ABS pipe holds the axial coils in the center of the pipe as well as isolating the axial coils from the radial coils. The interior ABS pipe may be formed as a clamshell that fits around the axial coil(s). Six ABS pipe spacers, three near the inlet, and three near the outlet may be operable to keep the axial coils, and interior ABS pipe hoisted in the center of the pipe. Three pegs lock into the exterior ABS pipe and two pegs lock into the interior ABS pipe, allowing the spacers to restrict horizontal movement of the interior pipe as a result of flowing liquid. The interior ABS pipe may also be perforated to limit the effect on the flow rate of the liquid (e.g., makeup water) through the device.

FIG. 10U depicts an exploded view of the internal structure of the magnetic device or section in FIG. 10T.

Figure 11A:
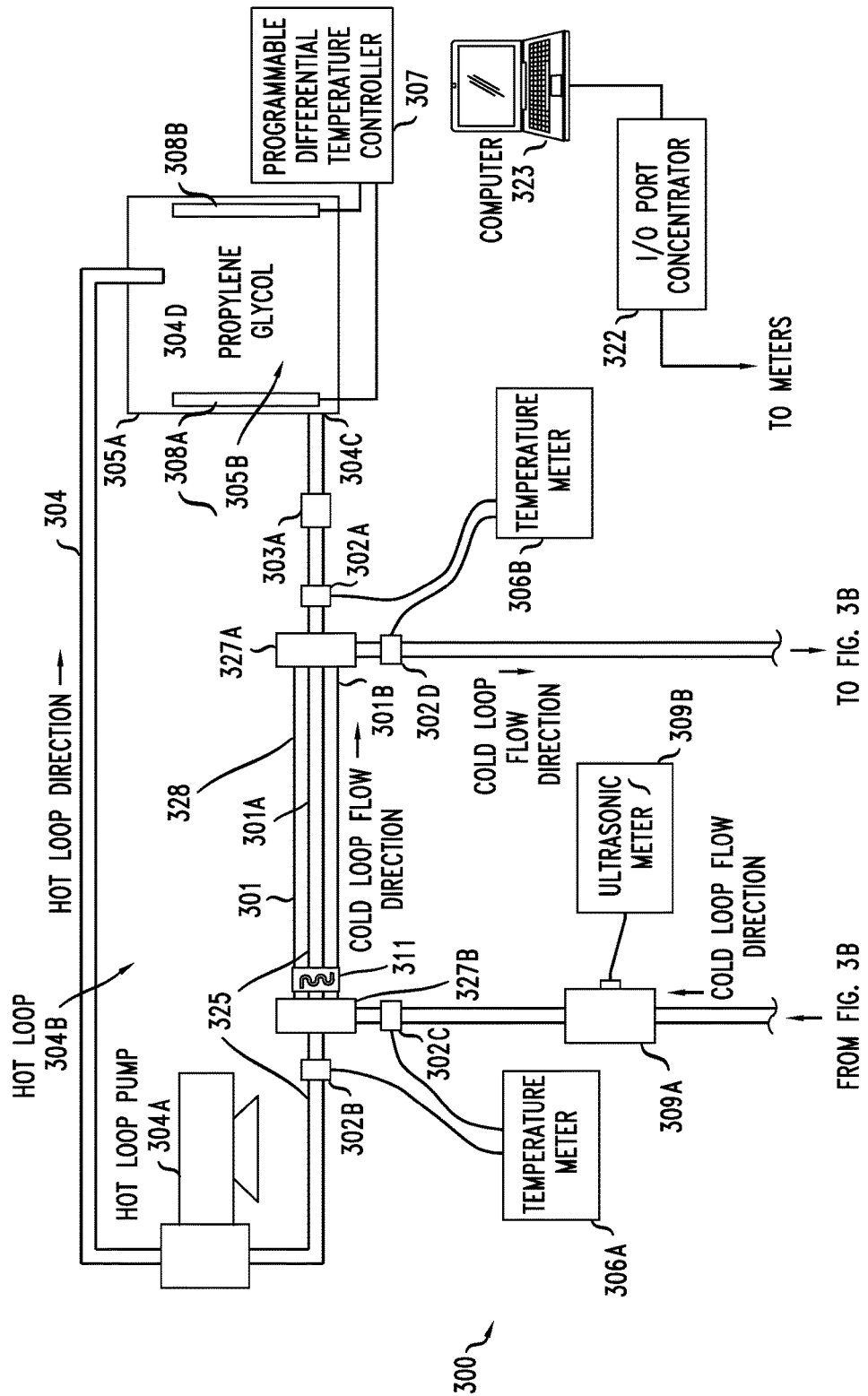
FIGS. 11A and 11B depict an exemplary, experimental water transport system according to embodiments of the invention.
Figure 11B:
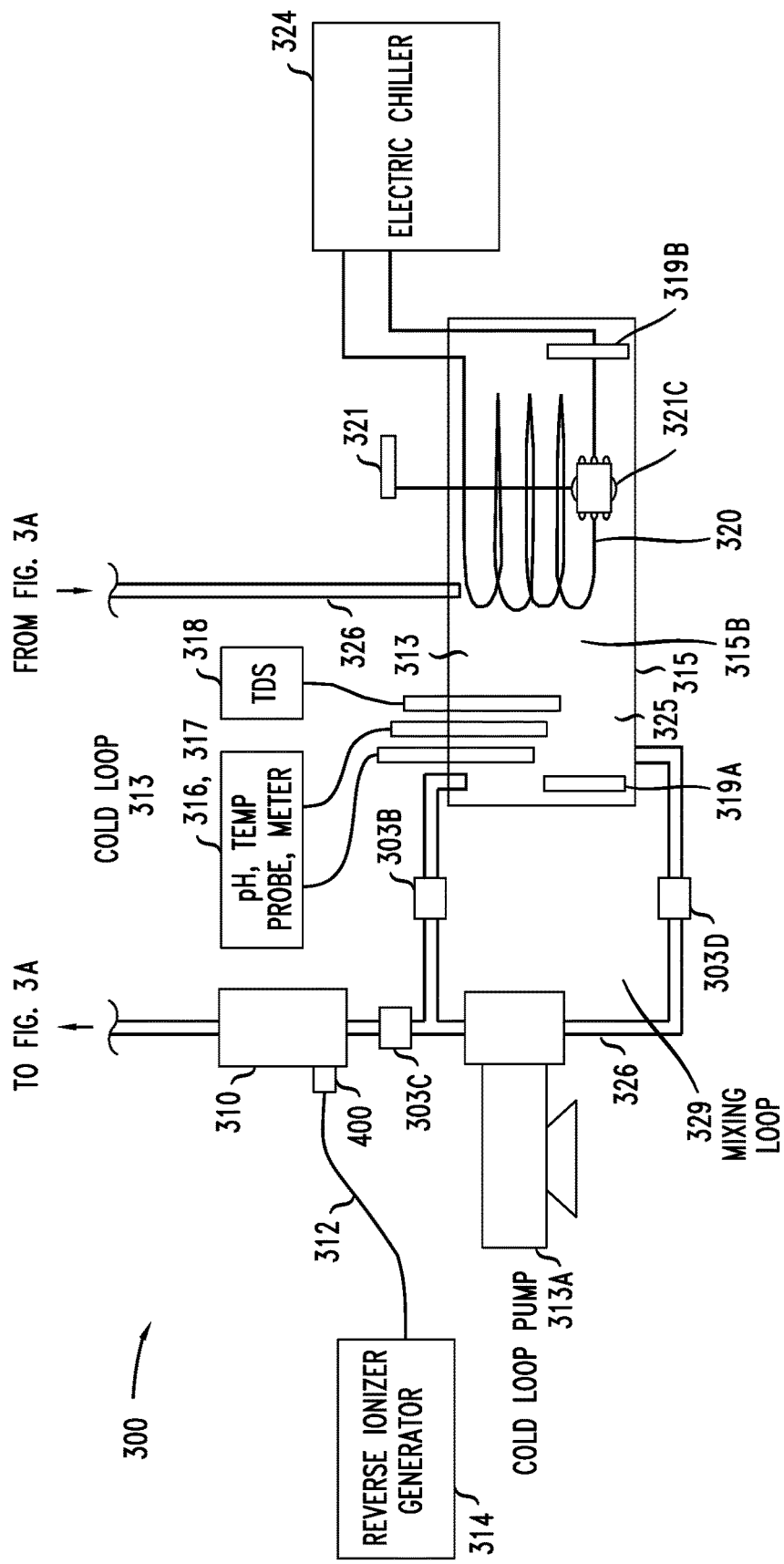

Experimental Setup—FIGS. 11A & 11B

The inventors understand that every liquid supply system is potentially different and may, therefore, require variations in system settings and treatment methods to optimize the treatment of a liquid that contains different types of unwanted material. In particular, the present inventors understand that the physical and chemical properties of a liquid, such as water, will likely vary from one supply system to the next, and such properties can impact the effectiveness of various types of electromagnetic fields in treating the liquid. For example, the mineral content, flow rate, temperature and pH of a liquid (e.g., water) in a system may affect the types and amount of scale and microbes that are likely to form in the liquid. Accordingly, the mineral content, flow rate, temperature and pH of water may at least partially dictate the characteristics of electromagnetic fields that will be effective in treating the water. Furthermore, as the mineral content of water varies, the conductivity and capacitance of the water may vary. Yet further, the conductivity and device size (i.e., larger device diameter or smaller device diameter) affects the impedance of the overall system.

Yet further, the conductivity of the mineral content of the water in conjunction with the dimension of the device's cavity (i.e., volume of water that flows between elements, coils and dimensions of the device, feeding pipe system) causes the impedance to change, and, in turn cause changes to the modulation frequency required to effectively treat the water as described in more detail herein.

In order to develop an understanding of the optimum electromagnetic fields that may be useful in a variety of different applications, the inventors have developed experimental liquid (e.g., water) transport systems, such as system 300 shown in FIGS. 11A and 11B. The experimental system 300 simulates a typical real world, water transport system that may be used to grow or foster the formation of unwanted material, such as scale and accumulated microbial agents. It is believed that by measuring the characteristics (e.g., mineral content, flow rate, temperature and pH) of water in the system 300 over time, testing various types of electromagnetic fields applied to the water and testing various methods of supplying and applying electromagnetic output fields to the water, optimum electromagnetic fields for a given water transport system may be identified. Water treatment data, among other data, obtained through testing of the experimental system 300 can be used to prescribe user input settings for a liquid transport system under a variety of conditions, as well as develop adaptive (automatic) and specialized treatment protocols and related instructions that may be integrated into (e.g., programmed into) microcontrollers and computers described herein, such as computer 104 (FIG. 1A and FIG. 7), microcontroller 836 (FIG. 8A), microcontroller 621 (FIG. 11C), microcontroller 422 (FIG. 12A), and controllers used as a part of apparatus 4000 (FIG. 12A), for example.

As shown in FIG. 11A, the exemplary, experimental liquid (water) supply system 300 includes two loops, namely a hot loop 304B and a cold loop 313. A hot liquid tank 305A contains a volume of propylene glycol (anti-freeze) 305B that is circulated throughout the hot loop 304B. The hot loop 304B includes a copper pipe 304 beginning at an inlet end 304C in contact with the propylene glycol 305B in the hot liquid tank 305A, and terminating at outlet end 304D in contact with the propylene glycol 305B in the hot liquid tank 305A. The propylene glycol 305B is circulated through the copper piping 325 by a pump 304A such that the propylene glycol 305B flows through the removable copper pipe 301A of heat exchanger 301, exits the hot liquid tank 305A into the inlet end 304C and returns to the hot liquid tank 305A from the outlet end 304D. Hot liquid tank 305A contains two heating elements 308A and 308B controlled by a programmable, differential temperature controller 307 to raise and control the temperature of propylene glycol between 70 degrees centigrade and 120 degrees centigrade. The hot loop piping 304B contains one thermocouple 302A installed before ABS plastic end-cap 327A, and a second thermocouple 302B installed after ABS end-cap 327B. The thermocouples 302A, 302B may be used to measure the temperature of the propylene glycol 305B entering and exiting the heat exchanger 301. Additionally, an electronic shut-on/off valve 303A may be installed after the inlet 304C of hot liquid tank 305A to turn on or off the propylene glycol.

The heat exchanger 301 comprising a quartz tube 328, removable copper pipe 301A, and ABS plastic end-caps 327A and 327B may be configured such that an annulus spacing 301B exists between the removable copper pipe 301A and the quartz tube 328. The ABS end-caps 327A and 327B may be designed to maintain the annulus spacing 301B and to form a path for make-up water 315B to flow through the heat exchanger 301 while propylene glycol 305B flows through the removable copper pipe 301A that is an integral part of the hot loop 304B. The heat exchanger 301 contains a flow correction baffle 311, whose purpose is to reduce turbulence in the annulus spacing 301B as make-up water 315B transverses the annulus spacing 301B of the heat exchanger 301.

An independent cold loop 313 may comprise PVC piping, a cold loop pump 313A to circulate the make-up water through the cold loop piping, an ultrasonic sensor 309A to monitor the make-up water flow-rate, and a cooling tower device 310, where the make-up water can be treated to reduce unwanted material, such as calcium carbonate deposits, on the removable copper pipe. The device 310 may be a device described herein that includes immersible elements or coils, such as devices or device sections 160, 201, 260, 2601, 4601 for example and may be part of a "smart" control system or part of an integrated device described elsewhere herein. The cold loop piping carries make-up water from the outlet of the make-up water tank 315 through the annulus spacing of the heat exchanger 301 such that the make-up water flow direction is counter to the flow direction of the propylene glycol flowing in the removable copper pipe 301A within the heat exchanger 301. The cold loop piping also contains two thermocouples 302C and 302D installed immediately before the cold piping connects to the heat exchanger 301 and immediately after the heat exchanger 301 to measure make-up water temperature entering and exiting the annulus spacing of the heat exchanger 301, respectively.

A small secondary mixing loop 329 exists within the cold loop piping with electronic shut-on/off valves to facilitate mixing of the make-up water prior to the start of testing. At the start of any test, the electronic shut-on/off valve 303C is closed and electronic shut-on/off valve 303B is opened to facilitate the mixing of calcium chloride and sodium bicarbonate, necessary to produce calcium carbonate (scale) which precipitates out of mineralized water in cooling tower systems.

The make-up water tank 315 may be located between pump 313A, mixing loop 329 and the electric chiller 324. All three sub-systems, namely the make-up water tank 315, mixing loop 329, and pump 313A may be connected via PVC piping 326 to the heat exchanger 301. An electric chiller coil 320 connected to the electric chiller 324 may be provided within the make-up water tank 315 to maintain and control temperatures between 15 degrees centigrade and 35 degrees centigrade.

Figure 12A:
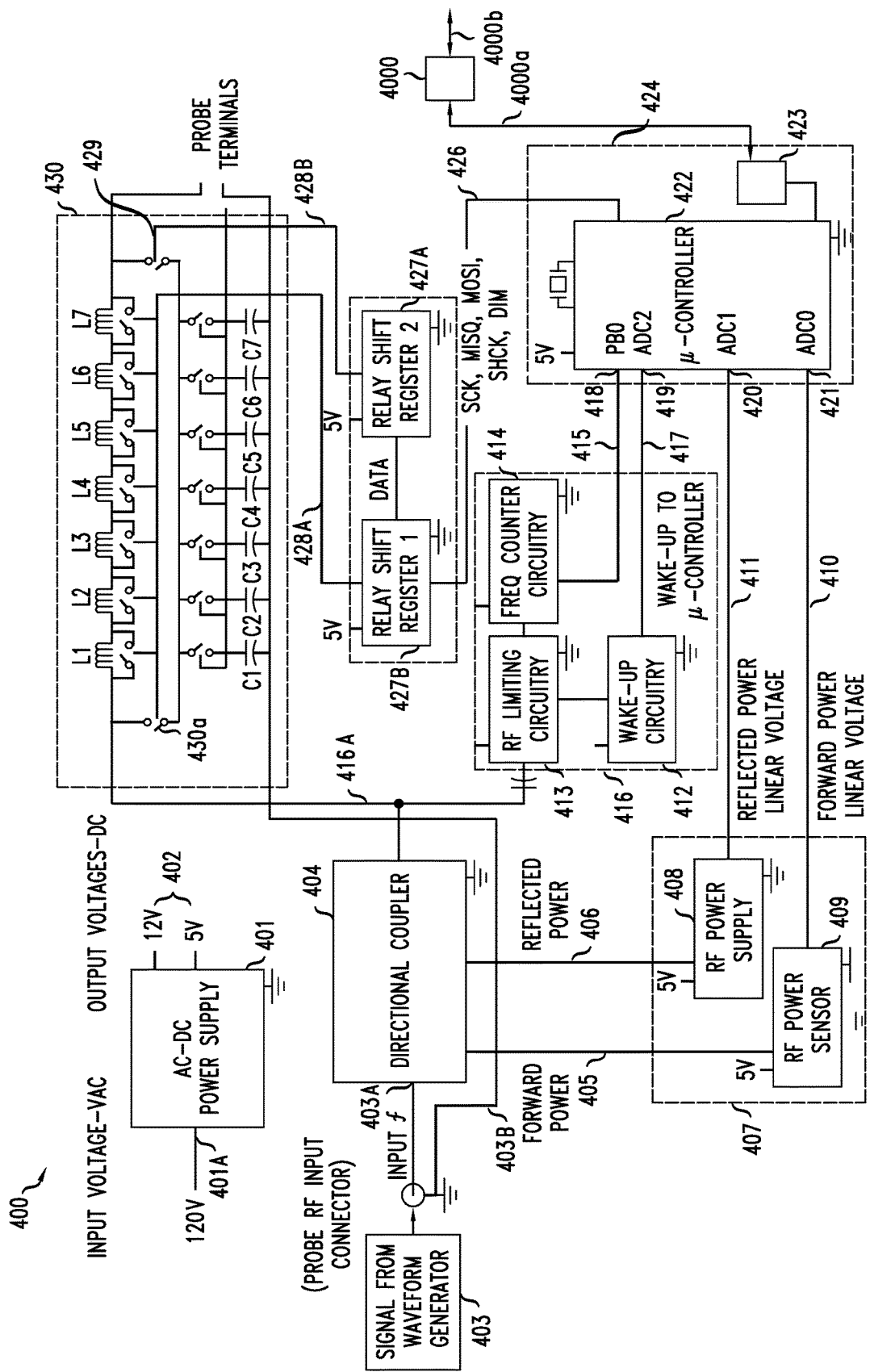
FIG. 12A depicts a block diagram of a smart control system according to one embodiment.

A liquid treatment system comprising, for example, an inventive waveform generator 314 and an inventive device 310 (i.e., one of the generators and devices described elsewhere herein) connected by a 50 Ohm coaxial transmission cable 312 and impedance matched by an impedance matching control system, such as system 400 in FIG. 12A, may be used to treat liquid in the system 300 that contains unwanted material, such as calcium carbonate (scale).

A computer or other computing device 323 may be connected through a universal serial bus port, for example, to a port concentrator 322 to collect data related to pH, conductivity, hot temperature in, hot temperature out, cold temperature in, cold temperature out, and flow-rate, for example. This data may be used to compute a fouling resistance (delta-T measurement) of calcium carbonate, for example, that precipitates out of the make-up water 315B and adheres to the removable copper pipe 301A within the heat exchanger 30 (see FIGS. 12B and 12C, and related discussion).

A flow meter 309B and its ultrasonic sensor 309A may be located between the device 310 and thermocouple 302C. A TDS/conductivity meter 318 may be positioned in make-up water tank 315 to measure the TDS levels/conductivity of the make-up water 315B. A temperature-compensated pH sensor or meter 316 may be positioned in the make-up water tank 315 to measure the pH levels of the make-up water 315B.

An electric mixer 321 may be used to mix make-up water 315B prior to the start of testing in order to stabilize the pH and conductivity of the make-up water. The electric mixer 321 may be switched off after stabilization of pH and conductivity has been achieved.

Two heating elements 319A, 319B within the make-up water tank 315 may be used to raise the temperature of the make-up water during the mixing phase of calcium chloride and sodium bicarbonate to aid in achieving faster pH stability necessary to start a test.

It should be noted that the design of the heat exchanger, type of heat exchanger material, the amount of fouling resistance (e.g., scale) on the removable copper pipe of the heat exchanger, and the characteristics of the make-up water (conductivity, pH, temperature, etc.) may determine the total overall heat exchanger coefficient. The fouling resistance may be determined by measuring and calculating the heat transfer coefficient between the hot propylene glycol solution and the removable copper pipe 301A (heat surface) of the heat exchanger 301, measuring and calculating the heat transfer coefficient between the heat exchanger 301 and the make-up water 315B, the thickness of the removable copper pipe 301A, and the thermal conductivity of the removable copper pipe 301A.

In order to test the operation of devices 314 and 310 to treat liquids in system 300 that contain unwanted materials, it is first necessary to establish conditions that create such unwanted materials in the liquids, and then apply the inventive devices (e.g., devices 310 and 314), systems and methods described herein to such liquids. For example, as a starting test parameter, it is desirable to include or otherwise form about 2000 parts per million (ppm) of calcium carbonate precipitate in the make-up water 315B. Such an amount of calcium carbonate is typically found in cooling tower make-up water and is thought to be conducive to the growth of scale over time.

Once the amount of calcium carbonate (and associated, desired pH level) is obtained, it is believed that the make-up water 315B can be circulated through the system 300 for about 7 to 14 days with inventive devices (device and generator), such as devices 310 and 314, turned off in order to grow scale (calcium deposits). As the make-up water 315B is circulated through the system 300 over the 7 to 14-day period, the pH level, flow rate and TDS level/conductivity of the make-up water can be monitored. If unwanted material (e.g., scale) is growing in the system 300, it is expected that the measured TDS levels and flow rates should decline over time. To determine whether scale, for example, is accumulating on the removable pipe 301A, the removable copper pipe 301A can be visually inspected through the quartz tube 328, or it can also be removed and visually inspected.

Further, once the growth of unwanted material, such as scale, has been confirmed the device 310 may be operated to produce and apply various types of electromagnetic fields described elsewhere herein in conjunction with generator 314 (and control system 400 in FIG. 12A) to determine the optimum electromagnetic fields and application methods for removing unwanted materials in the system 300. For example, similar to the initial conditions described above, if the device 310 is removing scale, the measured TDS levels and water flow rates should rise over time. As before, the removable copper pipe 301A can also be removed and/or visually inspected through the quartz tubing 328 to confirm that any existing scale build-up is being reduced.

Once test conditions for growing unwanted materials (e.g., scale) have been established, the system 300 can be initialized under similar conditions with the device 310 and generator 314 activated and no unwanted material present. The system 300 may be run for 7 to 14 days, for example. If the system 300 is successfully treating unwanted material (e.g., preventing the growth of unwanted material, such as scale) then the water TDS levels and flow rates measured over the 7 to 14-day period should remain essentially constant, or should decline at a slower rate than they did in the initial 7 to 14-day period described above.

The experiments described above and herein may be repeated at various water pH levels, temperature, conductivity, flow rates and/or mineral content in combination with various types of electromagnetic fields and electromagnetic field application methods in order to determine the optimum protocols to treat a liquid that contains unwanted materials, in particular scale, under various water conditions. In addition, various device designs, materials and placements (i.e., the position in a water system where a device is connected) can be tested to determine optimum device designs, materials and placements for the treatment of a liquid that contains unwanted materials, in particular, scale. By way of further example, the inventive systems described herein (including the exemplary experimental set-up) may be used to test the viability of treating a liquid that contains unwanted material under various conditions using various combinations and types of electromagnetic fields, electromagnetic field application methods, device designs, materials and/or device positions.

Referring now to FIGS. 11C through 11F, there is depicted an electromagnetic waveform generator 600 ("generator" for short) according to an embodiment of the invention. By way of example, the generator 600 may have three RF outputs ports 625-1, 625-2, and 625-3 (A, B, and C), each having a power rating of 500-1000 watts, and a DC output port 625-4 (port D). Output ports A, B and C may output signals having a frequency that falls within a frequency band of 1.8 MHz to 54 MHz (including a preferred frequency of 40.68 MHz), include multiple types of modulated waveforms of 1 Hz to 5000 Hz, and may be configured as a fixed output impedance (e.g., 50-ohm). The generator 600 may be impedance matched to an inventive device 310 described herein utilizing a control system, such as system 400 in FIG. 12A. Because the generator 600 may be impedance matched (i.e., its ports may be so matched) with an inventive device it may provide optimum results as well as operate in a more energy (power) efficient manner than an unmatched generator and probe device due to a reduction in so-called "reflected energy" (power) described in more detail below with respect to FIG. 12A. The generator 600, as well as the other components depicted in FIGS. 11A through 11F may be separated from other inventive EM devices, or, alternatively, may be combined with several EM devices to form an integrated device such as those devices depicted in FIGS. 6, 7 (EM section 201), 10G and 11G through 11L.

In one embodiment, to treat a liquid that contains unwanted material the generator 600 may output an AM or FM modulated carrier frequency of 40.68 MHz on output ports 625-1, 625-2 (ports A and B, in which Port A and B may output signals that are in phase for example, to an inventive device 310 and associated immersible elements or coils described herein (e.g., devices 160, 201, 260, 2601, 4601, and 5600) via a 50-ohm coaxial transmission cable. The generator 600 may include an AC to DC power supply module 616, two RF power and preamplifier modules 622-1 and 622-2 and 623-1, 623-2, respectively, two detector directional couplers 624A-1 and 624A-2 two low pass filters 624B-1 and 624B-2, an RF current sampler module, a microcontroller 621 and a signal or waveform generating module (the words "module", "circuitry", "circuit" and "components" may be used interchangeably herein).

It should be noted that the number of ports may be increased to more than two. In such an event, the number of associated RF power and preamplifier modules, directional couplers, low pass filters and other circuitry associated with an individual port described herein should be increased to match the number of ports (e.g., 2 ports are associated with two directional couplers, 3 ports are associated with three directional couplers, etc.,)

In an embodiment, the generator 600 may further comprise voltage/current generation circuitry, thermal management circuitry, RF protection circuitry, a microcontroller, signal or waveform generation circuitry, and thermal protective components to name just a few of the major components.

The generator 600 may include additional circuitry or components but the additional circuitry and components are known to those skilled in the art.

The AC to DC power supply module 616 may be operable to accept AC power at an input 620. A metal oxide varistor (MOV) 619 may be connected in parallel between the phase and the neutral conductors to protect the generator 600 from electrical surges, voltage dips, variations, and brownout conditions. To reduce conducted emissions produced by the generator 600 from AC power sources, electromagnetic interference (EMI) filter 618 may be operable to attenuate the conducted emissions to comply with the Federal Communications Commission commercial regulated Class A limits. The phase and neutral conductors from the EMI filter 618 may be connected to the AC power supply 616. The AC power supply 616 may be configured to accept 120-240 Volts ("V") AC power and convert it to 48V/45 Amps ("A") DC power. The power supply 616 may be connected to an On/Off switch in order to interrupt the supply of 48V DC power to the DC-to-DC circuitry 602 as needed.

The DC-to-DC circuitry 602 may be operable to generate 15V/1.5 A, 12 V/5 A, 5V/1.5 A, −5V/1.5 A, 3.3V/0.5 A and 1.8V/0.5 A and supply such voltages and currents to power subsystem circuitry. The DC-to-DC circuitry 602 may include a limiter operable to limit an "in rush" current from the power supply 616 at start-up to 6.7 A, and limit an operating current to 45.A during normal operating conditions. Under and over-voltage circuitry may be operable to protect sensitive subsystem components such as the RF pre-amplifiers 623-1 and 623-2 and RF amplifiers 622-1 and 622-2 modules. The 48V and 15V power source may supply power to the RF power amplifiers 622-1,622-2 and RF pre-amplifiers 623-1, 623-2 modules, respectively. The modules 622-1, 622-2, 623-1, 623-2 may be switched on and off with an opto-isolated switch 610 controlled by the DC-to-DC circuitry 602.

The DC-to-DC circuitry 602 may also be connected to fan circuitry 628A-1, 628A-2, 628B-1, 628B-2 where each circuitry includes an amplifier and fan. The amplifiers receive signals from circuitry 609, for example, to control corresponding fans. The amplifiers making up the fan circuitry 628A-1, 628A-2, 628B-1, 628B-2 may be mounted, for example, on a heat sinks 627-1, 627-2, respectively. The fans making up the fan circuitry may be operable to exhaust or otherwise remove heat emanating from the heat sinks 627-1, 627-2 and provide a high-temperature lockout condition signal to the microcontroller 621. The microcontroller 621 may be operable to control the removal of, or disconnection of, electrical power to the generator 600 in order to protect the generator 600 from overheating (thermal damage) upon receiving a high-temperature lockout condition signal. Thermal sensing may be provided by a 5 kΩ negative coefficient thermistor (temperature sensor) that may be mounted on the heat sinks 627-1, 627-2. Comparators (not shown in the figures) may be used as a part of monitoring circuitry to monitor the temperature sensors 612-1, 612-2. The first comparator may be operable to turn the fans a part of fan circuitry 628A-1, 628A-2, 628B-1, 628B-2 "ON" whenever, for example, the temperature of a sensor rises to approximately 110° F., and turn the fans a part of fan circuitry 628A-1, 628A-2, 628B-1, 628B-2 "OFF" when the temperature of a sensor drops by approximately 5 degrees. A resistor may be used to introduce a small difference in temperature in order to allow enough heat to be drawn away from the heat sinks 627-1, 627-2 so that the fans a part of fan circuitry 628A-1,628A-2, 628B-1, 628B-2 will not stutter "ON" and "OFF" as heat stored in the core of the heat sinks 627-1, 627-2 travels to the sensor mounted on the surface of the heat sinks 627-1, 627-2. The microcontroller 621 may be operable to store, or control the storage of, such temperatures.

The generator 600 may comprise three detector directional couplers 624A-1, 624A-2, low pass filters 624B-1, 624B-2, and RF current sampler modules 624C-1, 624C-2 where one of each is installed on a respective heat sink 627-1, 627-2. Three outputs, namely forward power, reflected power and RF current may be conditioned or filtered by low pass filter circuitry 611 and digitized upon input into an analog to digital converter input of the microcontroller 621. As explained in more detail elsewhere herein, the microcontroller 621 may be operable to compute a voltage standing wave ratio (VSWR) and provide a VSWR lockout signal to (i) enable the amplifiers 623-1, 623-2 during startup, (ii) disable the amplifiers 623-1, 623-2 based on detection of a high VSWR, or (iii) disable the amplifiers 623-1, 623-2 during shut-down. The microcontroller 621 may be operable to provide a VSWR lockout signal upon detection of a 3 to 1 VSWR condition. The lockout signal may be used to prevent damage to the amplifiers 623-1, 623-2 due to the buildup of excessive heat caused by higher VSWR values. Higher VSWR values equate to higher reflected power values, which will ultimately damage the amplifiers 623-1, 623-2. Conversely, lower VSWR values will not damage the amplifiers 623-1, 623-2, and will lead to better energy efficiencies because substantially all or most of the energy (power) will be transferred to the liquid and will improve the treatment.

The microcontroller 621 may be an Atmel microprocessor, for example, that includes digital input and output ports, analog to digital converter input ports, onboard memory 601, a serial peripheral interface (SPI) bus 629 and a universal serial bus (USB) port 630.

The generator 600 may further include a high frequency (HF) synthesizer 604 operable to generate sinusoidal carrier signal(s) from 10 Hz to 50 MHz, for example. Each signal may be input into a frequency multiplier 605 to produce a 20 Hz to 100 MHz carrier signal (i.e., an increase in frequency). A programmable signal generator 603 may be operable to generate pulse, sinusoidal, square and triangular waveforms, for example, in order to modulate the carrier from 1 Hz to 5000 Hz. The multiplied output of the high-frequency synthesizer and the output of the programmable signal generator 603 may be combined by the operational amplifier 606 functioning as a modulator. The operational amplifier's modulated output may be fed into variable gain amplifier 607. The amplifier 607 may be operable to generate and output a 50-ohm, modulated frequency carrier signal with a 0 dBm power level, and a −0.25/+0.25 Vpp adjustable offset level with a modulation adjustment depth up to 100%. The output of the variable gain amplifier 607 may be connected to an input port of the pre-amplifiers 622-1, 622-2.

The microcontroller 621 may be further operable to control the operation of the signal generator 603 and synthesizer 604 in order to set and adjust the carrier frequency, the percentage of modulation, modulation frequency, modulation waveform, output gain and offset levels, for example.

Each of the pre-amplifiers 622-1, 622-2 may comprise a low noise amplifier with a 50-ohm input impedance port and 50-ohm output impedance port operating at 15V/1 A. Each of the pre-amplifiers 622-1, 622-2 may be operable to receive a maximum RF input power level of 0 dBm and output a maximum output power of 5 watts. An output port of a pre-amplifier 622-1, 622-2 may be connected directly to an input port of an amplifier 623-1, 623-2, respectively, enabling an amplifier 623-1, 623-2 to produce 1000 watts of RF power. Each of the amplifiers 623-1, 623-2 may be a 500-1000 watt broadband pallet amplifier operating at 48V/ 45 A, with a 50-ohm input impedance port and a 50-ohm output impedance port. In one embodiment, each of the amplifiers 623-1, 623-2 may comprise a RF power MOS-FET transistor providing high gain RF output power in a small footprint. Each of the amplifiers 623-1, 623-2 may include advanced thermal tracking bias circuitry allowing an amplifier 623-1, 623-2 to operate with a stable gain over wide temperatures for sustained periods of time. The output of each of the amplifiers 623-1, 623-2 may be connected to the input port of a respective detector directional coupler 624A-1, 624A-2.

In one embodiment each of the detector directional couplers 624A-1, 624A-2 may comprise a combination of RF detectors and a directional coupler. Each of the directional couplers 624A-1, 624A-2 may be a four-port, quarter-wavelength, coaxial coupler. The four ports may comprise input, output, forward power and reflected power ports. The forward and reflected power output ports of each of the directional couplers 624A-1, 624A-2 may be connected to two, true power RMS RF power detector sensors. The RF power detector sensors may be operable to provide both forward and reverse power linear voltages to the conditioning circuitry 611, and then to analog-to-digital converter inputs of the microcontroller 621, where such inputs may be used to compute a VSWR (and, if necessary a VSWR signal).

Each of the low pass filters 624B-1, 624B-2 may comprise a 5 pole Chebyshev filter, for example. Each of the low pass filters 624B-1, 624B-2 may be operable to attenuate substantially all harmonics of a carrier frequency above 41 MHz in order to comply with the Class A radiated limit of the Federal Communications Commission's rules and regulations.

Each of the RF current sampler circuits 624C-1, 624C-2 may be operable to sample the RF current on a transmission line and transform the sampled current to a desired current. Each of the RF transmission lines 622A-1, 622A-2 from a respective amplifier 622-1, 622-2 is the primary side fed through a wire wound ferrite toroidal coil, while the wound coil is the secondary side of the current transformer. An output signal from a wound toroidal coil may be conditioned by circuitry 611 and then sent to the analog-to-digital converter input port of the microcontroller 621, where the analog signal is digitized, and its value stored. The microcontroller 621 may be operable to monitor RF current values to protect against electrolysis of the cooling tower piping. For example, a current of more than 2 A may cause pinholes (leaks) on cooling tower piping. Accordingly, if the microcontroller 621 makes a determination that an RF current is greater than 2 A, the microcontroller 621 may be operable to reduce an amplifier's 622-1, 622-2 RF power (reduce the current) in an effort to protect against electrolysis.

As indicated above, thermal protective components, comprising heat sinks 627-1, 627-2 copper heat sink spreader 628, and fans 628A and 628B-1, 628B-2 may be used to remove heat generated by the pre-amplifier and amplifiers 622-1, 622-2, 623-1, 623-2, respectively.

While generator 600 and one or more of the other components in FIGS. 11A through 11F (as well as FIG. 12A discussed below) may be implemented as separate devices that may be connected to an inventive device described herein (a probe device) via a length of cable or conductor. Such a generator, smart control system and components may also be combined with an inventive probe device to form an integrated device. Referring now to FIGS. 11G to 11L there are depicted additional integrated devices according to embodiments of the invention.

Figure 11G:
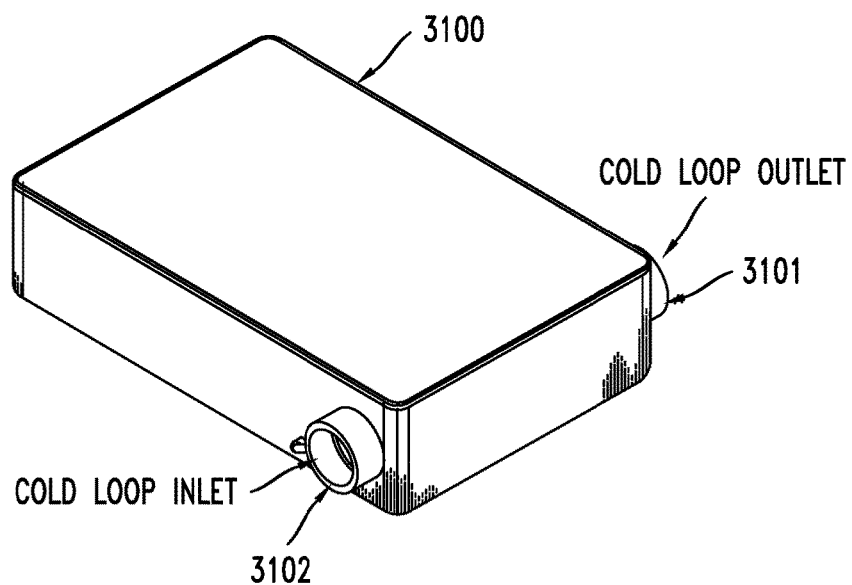

In FIG. 11G an integrated device 3100 comprising a combination of a probe device, generator and smart control system (the later described in more detail below with respect to FIG. 12A) is shown. The integrated device 3100 may be operable to receive a fluid, such as water, via an inlet or opening 3101 and discharge or otherwise output the same fluid via outlet or opening 3102. It should be understood that the depicted location of the openings 3101, 3102 is merely exemplary and that other locations may be selected. Further, the function of each opening 3101, 3102 (i.e., inlet versus outlet) may be reversed. Yet further, though only a single inlet and outlet are show, it should be understood that more than one inlet and/or outlet may be used. In one embodiment, the fluid entering the device 3100 may be used to control the temperature of the components that are a part of the device 3100 (e.g., cool the components), such as low pass filters and amplifiers.

Figure 11H:
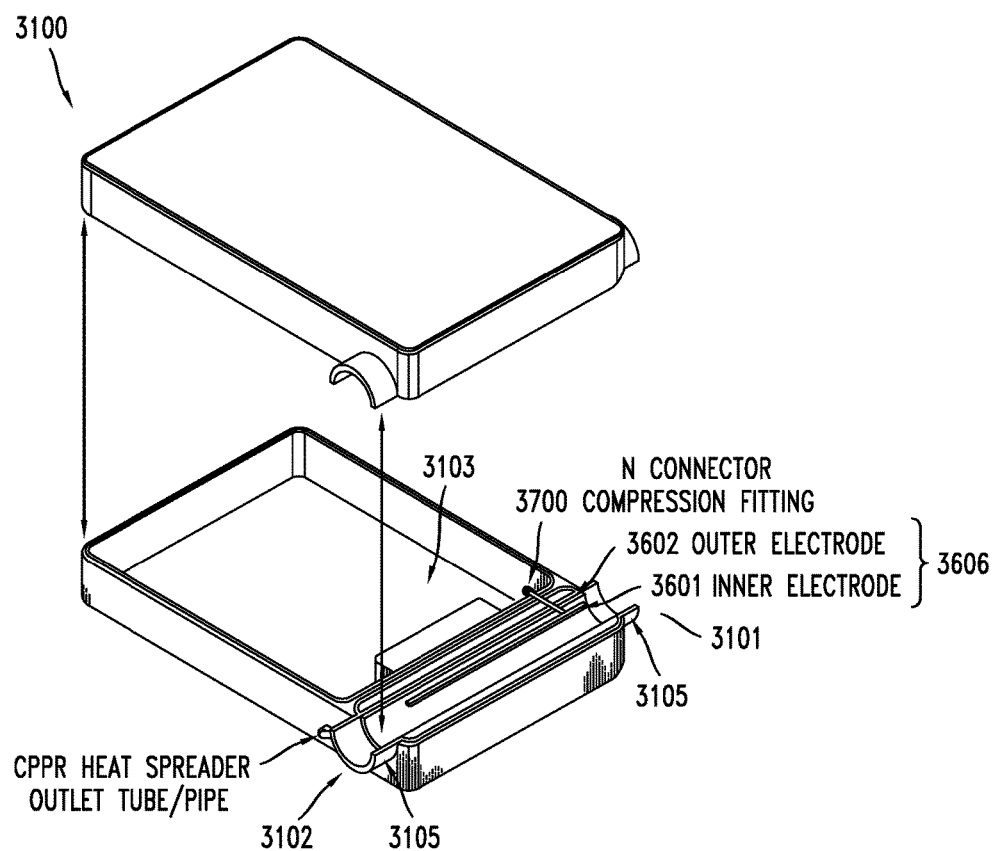
Figure 111:
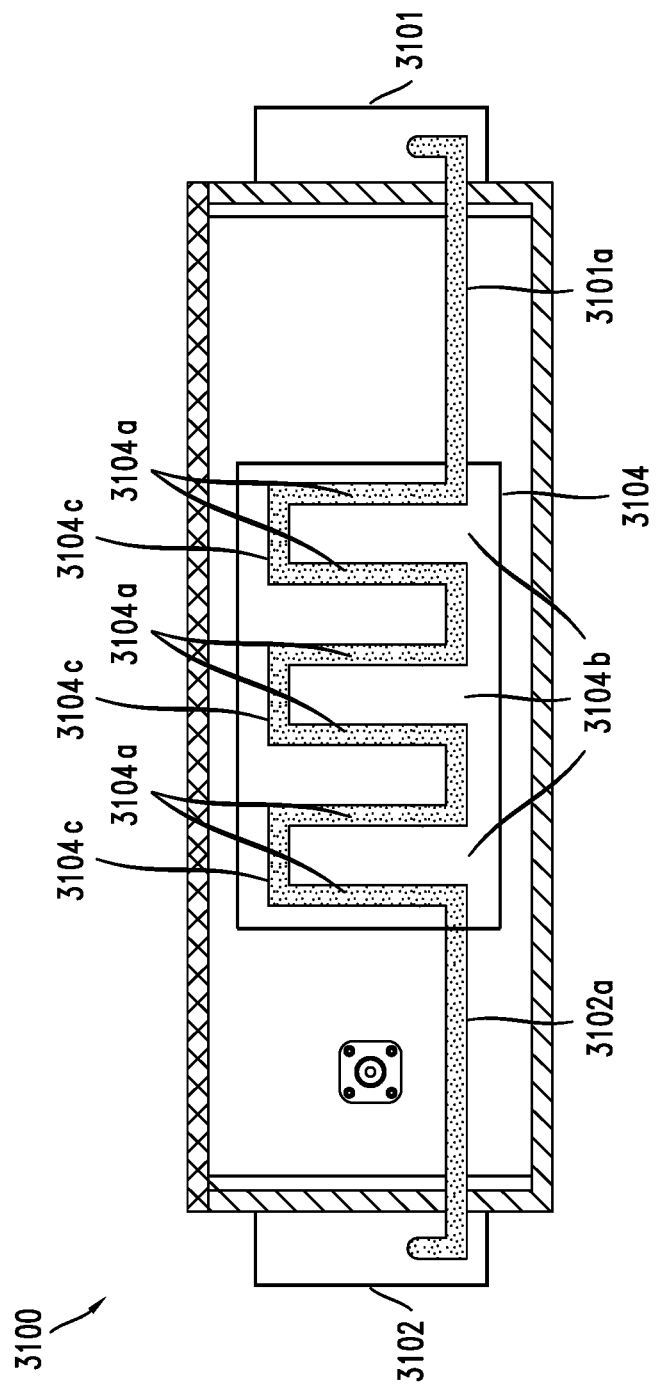
Figure 11J:
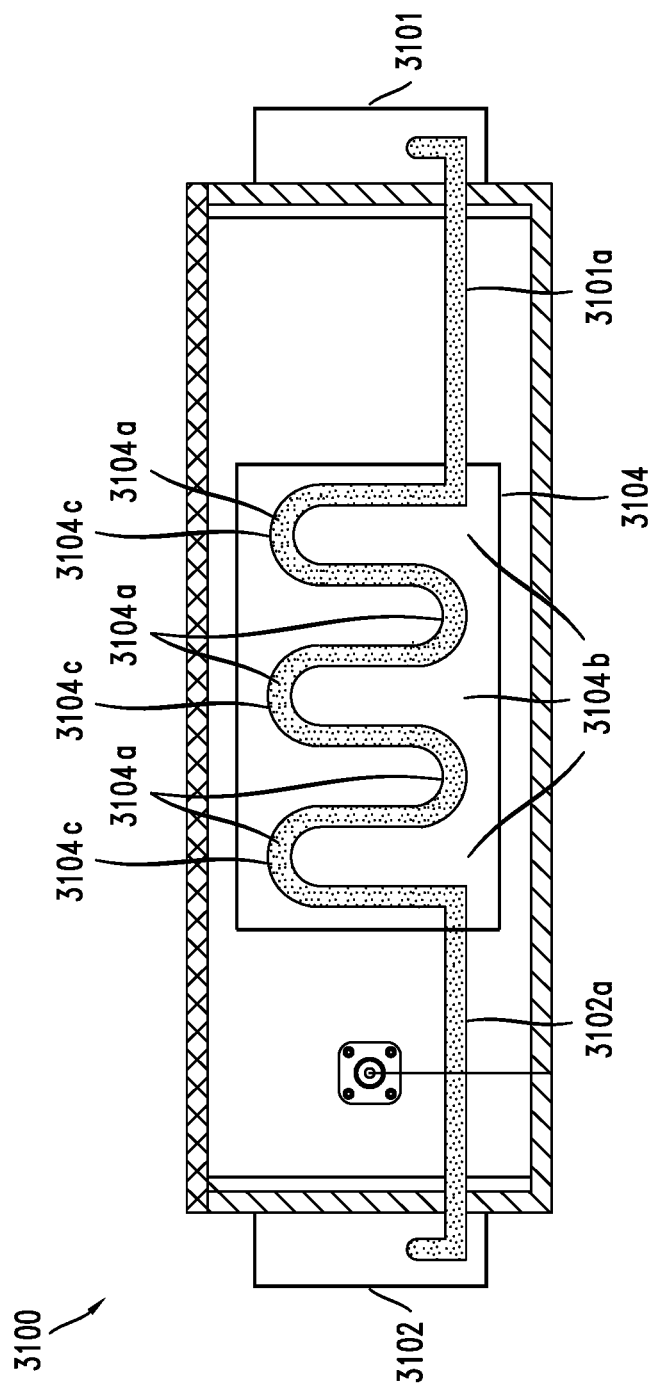
Figure 11K:
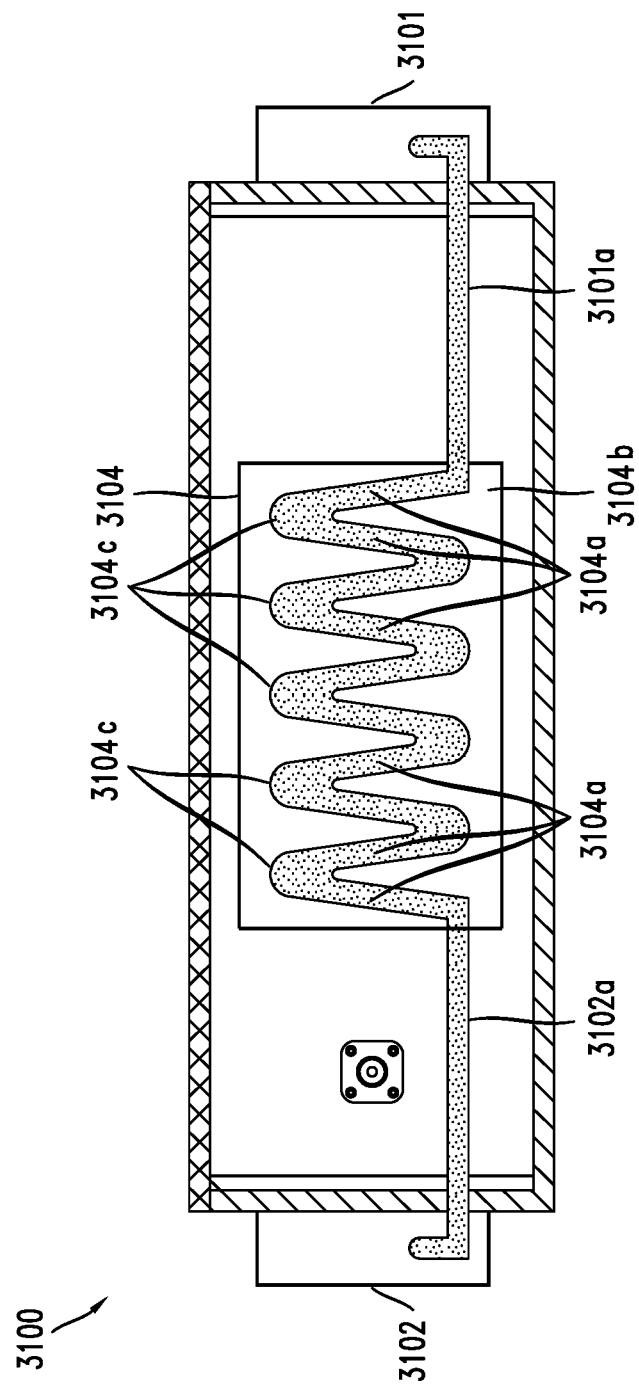
Figure 11L:
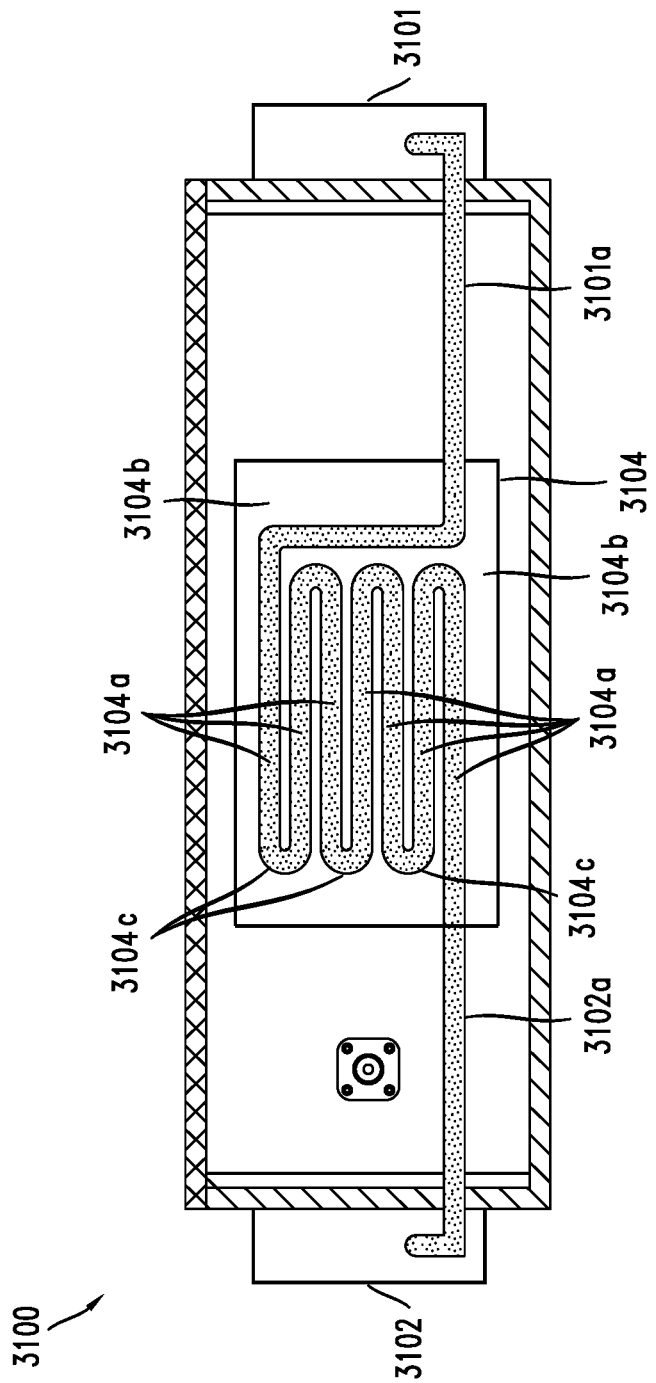

Referring now to FIG. 11H there is depicted another view of the device 3100 shown in FIG. 11G. As shown the device 3100 includes a section 3103 for positioning a (i) generator, such as generator 600 and (ii) other components described in FIGS. 11A through 11F, such as a power supply, couplers, low pass filters, amplifiers and fans and (iii) a smart control system described in FIG. 12A, for example, to name just a few of the components that may be positioned within section 3103. For the ease of understanding, the generator, additional components and smart control system are not shown in FIG. 11H though it should be understood that they all may be positioned within section 3103.

In the embodiment depicted in FIG. 11H the integrated device 3100 may comprise a device 3600 such as device 260 shown in FIGS. 10D through 10F though it should be understood that alternative device designs may also be used.

Similar to device 260 shown in FIGS. 10D through 10F, device 3600 may comprise immersible coaxially aligned, cylindrical structures 3601, 3602 enclosed within a housing 3105. The housing 3105 may comprise a 303-stainless steel material, for example. As depicted the device 3600 comprises an inner cylindrical structure 3601 and an outer cylindrical structure 3602.

In more detail, the outer structure 3602 may comprise an immersible, horizontally aligned stainless steel cylindrical tube made of 303-stainless steel material, for example, hereafter referred to as the positive element while the inner structure 3601 may comprise an immersible, horizontally aligned stainless steel cylindrical rod made of 303-stainless steel material, for example, referred to as hereafter as the negative element. As shown structures 3601, 3602 may be coaxially aligned with one another.

A combination connector/compression fitting 3700 is shown connecting the inner structure 3601 to the outer structure 3602 and secured to the housing 3105. To insure that no liquid leaks into the section 3103 the fitting may be a compression type fitting. In one embodiment the fitting 3700 may comprise a 50 Ohm, N-type connector and compression fitting, for example.

The device 3600 may operate similar to the operation of device 260 or other EM devices described elsewhere herein to treat unwanted materials in a liquid, such as water.

In the embodiment depicted in FIG. 11H the device 3100 may further comprise a heat sink 3104. As described in more detail below, the heat sink 3104 may be operable to remove heat from an integrated generator, components associated with the generator and a smart control system positioned within section 3103. For example, when one surface of the heat sink 3104 is adjacent to an RF amplifier positioned within section 3013 (e.g. amplifier 623 described earlier; not shown in FIG. 3H), the heat sink 3104 may be operable to conductively remove heat from the RF amplifier.

FIGS. 11I through 11L depict additional views of the device 3100 along with the heat sink 3104. In FIG. 11I the heat sink 3104 is shown as comprising a hollow passageway 3104a formed within a body 3014b of the heat sink 3104. The passageway 3104a is connected to inlet 3101 via inlet piping 3101a on one end and outlet 3102 via outlet piping 3102a on the other end to allow a liquid, such as water, to flow into and through the heat sink 3104 via the passageway 3104a. In accordance with embodiments of the invention, heat from components positioned within section 3103 (again, not shown in FIG. 11I) may be conducted away from such components to one surface of the heat sink 3104. The heat flows conductively through the heat sink body 3104b until it reaches a second, inner surface of the body 3104b that forms the surface of hollow passageway 3104a. The liquid flowing through the passageway 3104a comes in contact with the heated surface and functions to remove the heat away from the surface as it flows through the passageway 3104a.

In the embodiment shown in FIG. 11I the passageway 3104a may be formed as a plurality of rectangular shaped cavities 3104c though this is merely exemplary. Other shapes, such as oval cavities (see FIG. 11J), and triangular cavities (see FIG. 11K) may be used to name just a few of the many additional types of cavities provided by the present invention. In addition, the cavities may be oriented such that liquid flows through the heat sink 3104 in a direction that is substantially perpendicular to openings 3101,3102 (FIGS. 11I through 11K) or in a direction that is substantially parallel to the openings 3101, 3102 (see FIG. 11L). It should be understood that the passageway 3104 may comprise one or more connected passageways, and that the overall shape and orientation of the passageway 3104a may vary and may take many different forms in accordance with desired heat transfer parameters of a particular device. The heat sink 3104 may be formed from many different materials. For example, in one embodiment the heat sink 3104 may be formed from copper or a copper alloy.

As indicated above, the heat sink 3104 acts to remove heat from components within section 3103 thereby extending the life of such components that may be damaged if the temperature exceeds certain thresholds. Further, the heat sink 3104 extends the life of other components within section 3103 that may not necessarily be damaged by such temperatures, but may be unnecessarily overworked in the absence of heat sink 3104. For example, in embodiments of the invention fans (e.g. fans that are a part of circuitry 628A-1, 628A-2, and 628A-3, 628B-1, 628B-2 and 628B-3 described earlier) may be included with section 3103 to direct air over and around components within section 3103 to aid in controlling the temperature of such components. In embodiments of the invention, such fans may be operable to force air over and around such components upon receiving appropriate signals from a controller (not shown in FIG. 11I) and/or from thermocouples attached to the heat sink 3104 (also not shown in FIG. 11I).

In more detail, one or more thermocouples attached to heat sink 3104 may be operable to detect a change in the surface temperature of the heat sink 3104 due to a change in temperature of components positioned within section 3103. Upon detecting a certain threshold temperature or range of temperatures the thermocouple(s) may be operable to output a signal to the fans or to a controller that controls the fans. Upon receiving the signal, the fans may be operable to turn ON or OFF as the case may be depending on the signal received. In one embodiment, upon detecting a first, high temperature threshold of the heat sink 3104 the thermocouple(s) and/or controller may be operable to output one signal instructing the fans to turn ON. Alternatively, or in addition to such operation, in yet another embodiment, upon detecting a second, low temperature threshold of the heat sink 3104 the thermocouple and/or controller may be operable to output one signal instructing the fans to turn OFF (e.g., when the components within section 3103 cool down). In this manner the fans will only operate in an ON mode upon detection, and maintenance, of a certain, unacceptable temperature by the combination of thermocouples, heat sink and/or controller. Otherwise the fans will remain in an OFF mode and/or be placed into such a mode when a detected temperature drops below a threshold. In this manner, the fans need not operate all the time during periods when they are not needed, thus extending the operational lifetime of the fans.

Due to the ability to remove heat from components inside the device 3100 it can be said that the device 3100 comprises a temperature controlled, integrated probe device and generator.

Figure 11M:
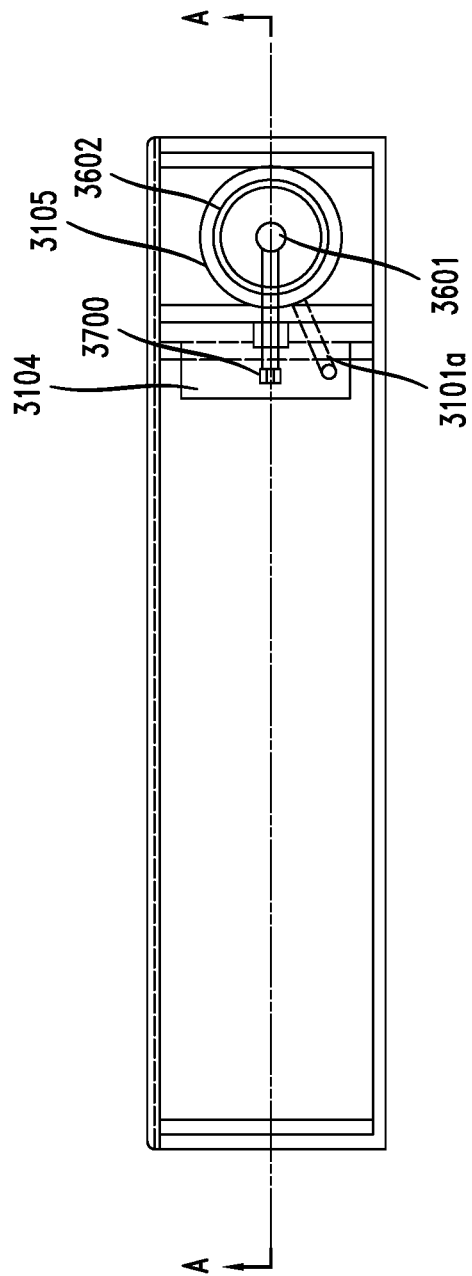

Turning now to FIGS. 11M and N there is depicted additional views of the device 3100. FIG. 11M depicts a side view of the inner and outer electrodes 3601, 3602, fitting 3700, heat sink 3104 and associated piping 3101a to name just a few of the components shown in FIG. 11M. FIG. 11N depicts a view A-A taken from FIG. 11M.

The discussion above has focused on describing devices where either the electric field is dominant or the magnetic field is dominant. However, as mentioned briefly before in describing device 4601, the present inventors also provide devices using both dominant electric and magnetic fields. We now turn to a more detailed description of such "multi-field" or dual-field devices.

Referring back to FIGS. 10I, 10K and 10M, there is depicted a dual-field device 4601 according to an embodiment of the invention. The following description of the dual field device 4601 may also apply to embodiments of the EM device 201 section shown in FIGS. 6 and 7.

As depicted the device 4601 comprises a section 4601a that is operable to generate a dominant magnetic field (sometimes referred to as a "magnetic field dominant section") and a section 4601b that is operable to generate a dominant electric field (sometimes referred to as an "electric field dominant section"). As explained in more detail herein, the combination of an applied electric field generated and applied by section 4601b and a magnetic field generated and applied by section 4601a is believed to create Lorentz type forces. It should be understood that Lorentz type forces are believed by the inventors to be created and applied by all of the devices described herein, whether electric field devices, magnetic field devices or dual-field devices. However, the inventors believe that dual-field devices create and apply the most effective Lorentz type forces that can be used to treat unwanted material in a liquid. When such forces are applied to ions, such as $CaCO_3$, within a liquid (water) passing through device 4601 such forces are believed responsible for keeping the ions soluble in the liquid.

In one embodiment, the magnetic field dominant section 4601a may be similar in structure and operation to device 2601 while the electrical field dominant section 4601b may be similar in structure and operation to device 260, for example.

Section 4601*a* may be configured to receive output signals 2661*a*, 2662*a*, and 2662*b* and 2663*a*, and 2663*b* (See FIGS. 10I, 10K and 10M) from generator 2660 while section 4601*b* (and its associated, immersible coils) may be configured to receive signals 2661*b* from generator 2660. Upon receiving such signals the magnetic field dominant section 4601*a* (and its associated, immersible coils) may be operable to generate an electromagnetic field having a dominant magnetic field and apply such a field to a liquid passing through the associated, immersible coils of device 4601 to treat unwanted material in the liquid while, in addition, the electric field dominant section 4601*b* (and its associated, immersible, cylindrical elements, for example) may be operable to generate an electromagnetic field having a dominant electric field and apply such a field to a liquid passing through the associated, immersible elements of device 4601 to further treat the unwanted material.

Regardless of the type of section in embodiments of the invention, each of the signals 2661*a*, 2661*b*, 2662*a*, and 2662*b* and 2663*a*, and 2663*b* supplied by the generator 2660 (or another type of generator described herein) to the sections 4601*a*, and 4601*b* and their associated, immersible elements or coils may include a variable modulation frequency that corresponds to the ionic cyclotron frequency of a mineral, such as calcium. Accordingly, the electric or magnetic fields created and applied by sections 4601*a*, and 4601*b* to the liquid passing through device 4601 may be similarly modulated.

The generator 2660 may provide the magnetic field dominant section 4601*a* with a uniform or steady-state signal depending on how the generator 2660 is connected to the section 4601*a*. In particular, which ports 1, 2, 3 or 4 of section 4601*a* are connected to which port B, C or D of the generator 2660 and what type of signal is provided by a port B, C or D to each so-connected port 1, 2, 3 or 4 of section 4601*a*.

In one embodiment, the signals output by the generator 2660 via ports B and C are in-phase. Accordingly, in one embodiment the generator 2660 may be operable to output or otherwise provide a uniform time-varying signal via ports B and C having an output power up to 500 watts.

As depicted the generator 2660 may also be connected to the dominant electric field section 4601*b* via port A. In an embodiment, the generator 2660 may output or provide a time-varying signal via port A to section 4601*b*, where the signal has a power of up to 500 watts.

Yet further, the generator 2660 may output or otherwise provide a steady-state signal (e.g., a DC signal) via port D. When the generator 2660 is connected to dominant electric field section 4601*b* via port A (and port 5 on section 4601*b*) a steady state electric field is produced by the elements of section 4601*b*. When the generator 2660 is connected to dominant magnetic field section 4601*a* via port D (and ports 2,3 on section 4601*a*) a steady state magnetic field is produced by the coils of section 4601*a*.

In embodiments of the invention, ports A through D of the generator 2660 may be connected to ports 1 through 5 of device 4601 using 50-ohm impedance, coaxial transmission line cables 2700, for example.

In embodiments of the invention, ions of an unwanted material, such as $CaCO_3$, in a liquid (e.g., water) pass through the device 4601 (or another device described herein). When the liquid and its ions first enter the device 4601 at opening 4602*a* the ions are subjected to the applied electric field created by the dominant electric field section 4601*b*. In embodiments of the invention that utilize a dominant electric field, such as section 4601*b*, the so applied electric field is believed to cause the ions to accelerate (i.e., speed up). Further, in those embodiments where a time-varying electric field is applied the ions are accelerated towards one of the immersible elements or coils (the exact path taken by a given type of ion is dependent upon the charge on the ion and the charge on a given element or coil, i.e., the ion is repulsed by a similar charge but attracted by an opposite charge). In embodiments of the invention, the charge applied to the immersible elements or coils may be alternated between positive and negative at a rate that is substantially equal to the frequency of the time-varying signal (e.g., 40.68 MHz or 40.68 million times per second). Accordingly, this rapidly changing charge on the elements or coils is believed to cause the ions in the liquid to be alternatively repulsed by, or attracted to, the elements or coils. Because the frequency applied to the elements or coils may be very high (again, 40.68 million times per second), the ions are caused to repeatedly and rapidly change direction (i.e., 40.68 million times per second). The net effect is believed to "confuse" the ions; that is, an ion is only able to move towards, or away from, a given element or coil for a very short period of time before its direction is changed when the charge (i.e., polarity) on an element or coil is changed. Because the ion is so confused it cannot move towards an element or coil it cannot adhere to the inner surface of the element or coil or to the inner surface of a pipe, conduit or other passageway that is connected to the device 4601 as the ion accelerates out of the device 4601.

In an embodiment of the invention, as an ion that is accelerated by the dominant electric field section 4601*b* traverses the device 4601 it may pass through to the magnetic field dominant section 4601*a*. Accordingly, the ion begins to feel the effect of the applied magnetic field from section 4601*a*. In accordance with embodiments of the invention the applied magnetic field from section 4601*a* (and other magnetic field dominant sections described herein) is believed to cause the ion to vibrate or otherwise move in a spiral, helical or cycloid motion.

The resulting forces applied by the electric field and magnetic field in series as an ion passes through device 4601 is believed to act on the ion so that it remains soluble in a liquid. Such soluble ions, such as $CaCO_3$ ions (scale), are less likely to attach to the surface of pipes or heat exchangers in a water system.

Referring now to FIG. 10P, there is depicted another dual-field device 5600 according to an embodiment of the invention. As depicted the device 5600 comprises a magnetic field section and an electrical field section. In contrast to the dual-field device 4601 in FIGS. 10I through 10M, device 5600 applies an electric field and a magnetic field in parallel (i.e., at the same time), while device 4601 applies an electric field and magnetic field in "series" (one after the other). Accordingly, device 5600 will be referred to as a parallel, dual-field device while device 4601 may be referred as a series, dual-field device. The following description of the dual field device 5600 may also apply to embodiments of the EM device section 201 shown in FIGS. 6 and 7.

The combination of electric and magnetic fields is believed to create Lorentz type forces by coils 5605, 5609 and elements 5610, 5611. When such forces are applied to ions, such as $CaCO_3$, by coils 5605,5609 and elements 5610,5611 within a liquid (water) passing through device 5600 such forces are believed responsible for keeping the ions soluble in the liquid.

In one embodiment, the magnetic field section may be somewhat similar in structure and operation to device 2601. However, unlike device 2601, device 5600 comprises just immersible, radial coils 5610 and 5611, not axial coils. The electrical field section may be similar in structure and operation to device 260, for example, in that the immersible elements 5605 and 5609 are cylindrically shaped.

The immersible, radial coils 5610 and 5611 may be configured as Helmholtz coils as described previously herein with respect to device 2601 in FIG. 10G. The coils 5610, 5611 may be connected to generator 2660 via 50 Ohm impedance, electrical conductors 2700, for example. The generator may output or otherwise provide signals 5661 via port B (for example) to the coils 5610, 5611. Upon receiving such signals, the coils 5610, 5611 may be operable to generate an electromagnetic field having a dominant magnetic field and apply such a field to a liquid passing through the device 5600 to treat unwanted material in the liquid.

The electric field section may comprise: a non-conducting cylindrical tube 5602 made of Delrin material, for example; an immersible, stainless steel cylindrical tube 5605 (e.g., a pipe) made of stainless steel material (e.g., 303c-stainless steel), for example, hereafter referred to as the negative element; an immersible, cylindrical rod 5609 made of stainless steel material (e.g., 303c-stainless steel), for example, referred to hereafter as the positive element. As shown immersible elements 5605, 5609 are coaxially aligned with one another. Elements 5605, 5609 may also be configured with respect to one another to reduce fringing effects.

The elements 5605, 5609 may be connected to generator 2660 via 50 Ohm impedance, electrical conductors 2700, for example. The generator 2660 may output or otherwise provide signals 5662 via port A (for example) to the elements 5605, 5609. Upon receiving such signals, the elements 5605, 5609 may be operable to generate an electromagnetic field having a dominant electric field and apply such a field to a liquid passing through the device 5600 at substantially the same time that the coils 5610, 5611 are applying a dominant magnetic field in order to treat unwanted material in the liquid with both electric and magnetic fields. The resultant forces applied to material (e.g., mineral ions) in the liquid are Lorentz type forces described in more detail elsewhere herein.

The device 5600 may further include a PVC spacer 5604 (e.g., 1-inch spacer) that is operable to insulate the magnetic field generated by coils 5610, 5611 from the negative electrode (e.g., metal pipe) 5605 used to generate the electric field. The spacer 5604 is further operable to minimize the coupling of the electric field generated using the electrode 5605 to the coils 5610, 5611 to reduce attenuation of the magnetic field.

As depicted, the positive electrode 5609 may be configured to be positioned in the middle or center of the device 5600 as well as traversing the length of the negative electrode 5605. Two 50-ohm input ports 5612, 5613 are included in the device 5600. Ports 5612, 5613 may be connected to the ports A and B of the generator 2660. In embodiments of the invention the generator may be operable to output signals having a power of up to 500 watts, for example, via ports A and B, for example, that are input into ports 5612,5613 of the device 5600.

In embodiments, the generator 2660 may output via ports A and B, and the device may receive and input via ports 5612,5613 time-varying signals in order to create time-varying electric and magnetic fields that are applied to the liquid passing through device 5600. Yet further, as described in more detail below, the time-varying signals applied to the liquid create induced signals as well. For example, the time-varying magnetic field created by coils 5610, 5611 creates an induced electric field, and, conversely, the applied electric field created by elements 5605, 5609 creates an induced magnetic field.

The signals 5661, 5662 provided by the generator 2660 may further include a variable modulation frequency that corresponds to the ionic cyclotron frequency of calcium, for example, or another mineral/element or an ion of calcium or an ion of the other mineral/element. Thereafter, the time-varying electric or magnetic fields created by coils 5610, 5611 or elements 5605, 5609 and applied to the liquid passing through device 5600 may be similarly modulated.

Also shown in FIG. 10P are structural compression fittings 5603, 5606, O-rings 5601, and compression fitting 5607 for element 5609.

FIGS. 10Q and 10R depict simplified electrical circuit diagrams for the device 5600 shown in FIG. 10P.

In FIG. 10Q, an exemplary, simplified electrical diagram of device 5600 is depicted. In accordance with embodiments of the invention the radial coils 5610, 5611 may be configured in a Helmholtz coil configuration. In the embodiment depicted in FIG. 10Q, the immersible coils 5610, 5611 and elements 5605, 5609 may be connected to the broadband electromagnetic generator 2660. In more detail, the coils 5610, 5611 and elements 5605, 5609 may be connected to a particular port of the generator 2660 which we will refer to as "port B", it being understood that this designation is arbitrary and the inventors could use any number of different designations. As connected in FIG. 10Q the generator 2660 may be operable to output a uniform, time-varying signal 5661 to the coils 5610,5611 and elements 5605,5609 respectively, to enable the coils 5610,5611 and elements 5605,5609 making up device 5600 to produce a uniform, time-varying-magnetic field and a uniform time-varying electric field, respectively, at substantially the same time.

The so-generated and applied fields when applied to a liquid such as water, treats unwanted material in the water (e.g., prevents and or mitigates scale ($CaCO_3$)). The signal 5661 provided by the generator 2660 and applied to the coils 5610, 5611 and elements 5605, 5609 may include a variable modulation frequency that corresponds to the ionic cyclotron frequency of calcium. Thereafter, the magnetic field created by coils 5610,5611 and the electric field created by elements 5605,5609 that are applied to the liquid passing through device 5600 may be similarly modulated.

Referring now to FIG. 10R there is depicted another exemplary, simplified electrical diagram of device 5600. In accordance with embodiments of the invention the immersible radial coils 5610, 5611 may again be configured in a Helmholtz coil configuration. In the embodiment depicted in FIG. 10R, the coils 5610, 5611 and elements 5605, 5609 are again connected to the broadband electromagnetic generator 2660. However, the coils 5610, 5611 and elements 5605, 5609 in FIG. 10R are connected to the generator 2660 differently than the coils and elements in FIG. 10Q.

In more detail, the immersible radial coils 5610, 5611 may be connected to port B of the generator while elements 5605, 5609 may be connected to a different port, designated as port A, of the generator 2660. As connected in FIG. 10R the generator 2660 may be operable to output time-varying signals 5661, 5662 that are in phase with one another Such in-phase signals, when applied to the coils 5610, 5611 and elements 5605, 5609 of device 5600 may enable the coils 5610, 5611 and elements 5605, 5609 making up device 5600 to produce time-varying fields that, when applied to a liquid such as water, treats unwanted material in the water. The signals 5661, 5662 provided by the generator 2660 and applied to the coils 5610, 5611 and elements 5605, 5609 may include a variable modulation frequency that corresponds to the ionic cyclotron frequency of calcium, for example. Accordingly, the magnetic field created by coils 5610,5611 and electric field created by elements 5605,5609 and applied to the liquid passing through device 5600 may be similarly modulated.

It should be noted that any given port of the generator 2660 may be in-phase, or out-of-phase with another port of the generator, though for dual-field devices the signals output by the generator 2660 will be in-phase, for example.

In embodiments of the invention, ions of an unwanted material, such as $CaCO_3$, in a liquid (e.g., water) pass through the device 5600. When the liquid and its ions enter the device 5600 the ions are subjected to both the electric field created by the elements 5605, 5609 and magnetic field created by coils 5610, 5611. In embodiments of the invention, the substantially, simultaneously applied electric and magnetic fields are believed to cause the ions to simultaneously accelerate (i.e., speed up) and vibrate or otherwise move in a spiral, helical or cycloid motion. The net result is that the ions remain soluble in the liquid.

A time-varying, constant electric field (e.g., constant amplitude) applied to the ions is believed to accelerate the ions towards one of the immersible elements or coils (the exact path taken by a given type of ion is dependent upon the charge on the ion and the charge on a given element or coil, i.e., the ion is repulsed by a similar charge but attracted by an opposite charge). In embodiments of the invention, the charge applied to the immersible elements or coils may be alternated between positive and negative at a rate that is substantially equal to the frequency of the time-varying signal (e.g., 40.68 MHz or 40.68 million times per second). Accordingly, this rapidly changing charge on the elements or coils in conjunction with its spiral-like movement is believed to cause the ions in the liquid to be alternatively repulsed from, or attracted to, the elements or coils. Because the frequency applied to the elements or coils may be very high (again, 40.68 million times per second), the ions are caused to repeatedly and rapidly change direction (i.e., 40.68 million times per second) as well as spiral haphazardly. The net effect is believed to "confuse" the ions; that is, an ion is only able to move towards, or away from, a given element or coil for a very short period of time before its direction is changed when the charge (i.e., polarity) on an element or coil is changed, and is caused to spiral. Because the ion cannot move towards an element or coil and is spiraling haphazardly, it cannot adhere to the inner surface of the element or coil or to the inner surface of a pipe, conduit or other passageway that is connected to the device 5600 as the ion accelerates out of the device.

In embodiments of the invention, the combined forces resulting from the electric and magnetic field applied to an ion by coils 5610,5611 and elements 5605,5609 are believed to create Lorentz type forces (F) given by the following relationship:

$F=q[E+(v \times B)]$, where (q), is the charge of a particular ion travelling with velocity (v), in the presence of an electric field (E) and a magnetic field (B).

The spiral or helical (cycloid) motion of ions (e.g., $CaCO_3$) is believed to be the result of an applied magnetic field that is modulating the ions at their ionic cyclotron frequency ($f_{ICF}$), which may be computed using the following relationship:

$f_{ICF}=(z \cdot e \cdot B)/(2 \cdot \pi \cdot m)$

Where (z) is the number of positive or negative charges of the ions, (e) is the elementary charge, and (m) is the mass of the ions.

As seen from the above relationship, the ionic cyclotron frequency, $f_{ICF}$, is proportional to the magnitude of the generated magnetic field (B). As a result, the ionic cyclotron frequency $f_{ICR}$ will change if the magnetic field (i.e., amplitude) created and applied by coils 5605, 5609 (or any set of coils described herein) is not held constant. Further, it is believed that in order to accelerate and helically spin ions, such as $CaCO_3$, at a desired frequency, the generated electric field (E) and magnetic field (B) must remain constant at all times. Yet further, because each of the electric field and magnetic field sections of a dual-field device may be connected to their own impedance matching circuitry, the electric and magnetic fields are held constant despite the fact that the conductivity of a liquid, such as water, changes.

The resulting Lorentz type force, when applied to an ion passing through device 5600, is believed to prevent the ion from becoming attracted to a surface of a pipe or heat transfer surface as well as prevent the ion from being attracted to another ion and, therefore, prevents ions from forming an aggregated mass of ions. Said another way, the ions remain dissolved or soluble in a liquid. If the ions are $CaCO_3$ ions (scale), such dissolved ions are less likely to form an aggregated mass and less likely to attach to the surface of pipes or heat exchangers in a water system.

In the discussion above it was indicated that the device 5600 creates induced electrical and magnetic fields. In more detail, the total magnetic field, $B_{Tot}$, from Helmholtz coils 5610,5611 having a radius (r) produces an induced electric field ($E_{induce}$) given by the following relationship:

$E_{induce}=\frac{1}{2} \cdot B_{Tot} \cdot r$

Conversely, the electric field produced by the elements 5605,5609 creates an induced magnetic field. The induced magnetic field, $B_{induce}$, is governed by Ampere-Maxwell's Law and is derived from the relationship:

$B_{Induce}=\mu_o I_d/2\pi r$

Where ($I_d$) is the so-called displacement current which flows through an imaginary cylindrical surface (S), with length (l) and radius (r), as shown in FIG. 10S. In an embodiment, the displacement current flowing from element 5605 to element 5609 in device 5600 crosses surface (S), where $S=2 \cdot \pi \cdot l \cdot r$.

Gauss's Law is responsible for the Electric flux density (D)=$\in_o \cdot \in_r \cdot E$, hence, the displacement current $I_d$ may be derived by the following relationship:

$$I_d = \frac{\partial D}{\partial t} \cdot S = \frac{\partial}{\partial t} \cdot (D) \cdot (2\pi \cdot r \cdot l)$$

Once the displacement current $I_d$ is known, in embodiments of the invention, the induced magnetic field (B) created by elements 5610, 5611 can be calculated from the displacement current $I_d$.

Both the applied and induced electric and magnetic fields contribute to the Lorentz forces applied to unwanted material in a liquid passing through a dual-field device provided by the present invention.

As mentioned previously herein, maintaining a constant, magnetic field (e.g. amplitude) and a constant electric field (i.e., amplitude) is believed to be important in the effective treatment of unwanted material in a liquid. As discussed in more detail below, the inventors have discovered that by controlling the effective impedance of the combination of a generator and a connected inventive device so that the impedance is constant, it is possible to maintain the amplitude of both the electric and magnetic fields at a constant value.

In more detail, referring now to FIG. 12A, there is depicted a smart control system 400 according to one embodiment of the invention. The system 400 may be operable to maintain the overall impedance of an electrical circuit that contains a generator, such as generator 202, 600 or 2600, a probe device or section (e.g., devices/sections 160, 201, 260,310, 2601, 4601, and 5600) described herein and a signal transmission medium (e.g., cable) as well as minimize impedance mismatches that may damage the generator. The smart control system 400 may be separated from an inventive device, or, alternatively, may be combined with an inventive device to form an integrated device such as those devices depicted in FIGS. 7, 10G and 11G through 11N.

As a result of changes in conductivity and temperature, the dielectric permittivity and impedance of inventive devices provided by the present invention may be constantly changing. Realizing this, and realizing such changes would adversely affect the ability to maintain a constant electric field amplitude and a constant magnetic field amplitude, the present inventors provide for an impedance matching circuit.

Generally, an EM device provided by the present invention may form a capacitor that can be considered an equivalent electrical circuit comprised of a capacitance (C), in parallel with a resistance (R). The capacitance, resistance and dielectric permittivity (c) of the liquid, for example water, flowing through such a device forms a complex impedance represented by the following relationship:

$$Z^* = R + j\omega 1/c.$$

In the case where the inventive device utilizes cylindrical elements, such as device 260, a part of dual-field device 4601 or 5600 or device section 201 the impedance (Z) of such a device may be calculated using the relationship set forth below, where the impedance (Z) is proportional to the product of the inverse square root of dielectric permittivity of the water flowing through the device, and the logarithmic ratio of the outer concentric and inner concentric electrodes (D) and (d) (e.g., positive and negative conductive elements) respectively:

$$Z = 138/(\sqrt{\Sigma}) \times \mathrm{Log}(D/d)$$

The dielectric permittivity may be expressed as a complex number:

$$\in = \in' - j\in''$$

Where $\in'$ is the dielectric constant and $\in''$ is the dielectric loss factor. The dielectric loss factor is a function of conductivity and frequency, where $c'' = \sigma 2\pi f$, and $\omega = 2\pi f$.

The dielectric permittivity may be further expressed as a function of the dielectric constant and the conductivity a as follows:

$$\in = \in' - j\sigma/\omega$$

When the impedance of an inventive device is different from that of a connected electromagnetic waveform generator and transmission medium (e.g., conductive cable) a "mismatch" is said to exist. When this occurs, some of the RF energy sent from the generator to the device may be reflected by the device, back down the transmission line, and into the generator. If the so reflected energy is strong enough, it can prevent the generator from operating correctly, and possibly ruin the generator. Further, mismatched impedances adversely affect the ability of the inventive devices to effectively treat unwanted material in a liquid because such mismatched impedances are believed to cause the amplitude of the electric field applied to the liquid to vary as well as cause the magnetic field applied to the liquid to vary. Such variations in the amplitude of the electric and magnetic fields result in a decrease in the forces that are applied to unwanted material, as explained further herein.

In contrast, when an electromagnetic generator, transmission medium and inventive device are connected and each has the same impedance, the three components are said to be impedance "matched". When so matched, the amount of reflected RF energy may be minimized thus allowing a maximum amount of RF energy to be transferred from the generator to the device. Yet further, matched components insure a constant amplitude of the electric and magnetic fields that result in optimum forces being applied to unwanted material, as explained further herein.

To eliminate the issue of mismatched impedances (i.e., to match impedances), the present inventors provide a smart control system, such as exemplary system 400 depicted in FIG. 12A that insures elements are impedance matched (e.g., generator, connecting cables, and inventive device, etc.). System 400 or one or more of the elements of system 400 may be referred to as impedance matching circuitry. Regarding FIG. 12A and the description that follows, it should be understood that each device or device section may be controlled by a separate smart control section that includes impedance matching circuitry, as explained in more detail below. For the sake of efficiency, the description that follows will be directed at a control section and impedance matching circuitry that can be applied to each type of device or device section.

Generally speaking, impedance matching circuitry according to embodiments of the invention may be operable to maintain an impedance of an inventive device, signal generator and a transmission medium connecting the device and generator at a matched impedance, and maintain a constant amplitude of an electric field created by an electric field dominant device (or electric field section) and a constant amplitude of a magnetic field created by a magnetic field dominant device (or device section).

In more detail, the ratio of forward RF energy (power) to reflected RF energy (power) is known as VSWR. VSWR is an important parameter used to calculate the amount of RF energy that may be transferred to a probe device and the amount of reflected energy that the device does not receive. VSWR is typically the most important parameter for matching the impedance of a generator, transmission medium and device. For example, a VSWR of 1.0:1 indicates a perfect match. As more energy is reflected, the VSWR may (undesirably) increase to 2.0:1, 3.0:1, or higher.

In one embodiment, a VSWR of 1.5:1 or less is most effective in the treatment of liquids that contain scale. Furthermore, a VSWR of 1.5:1 or less may prolong a generator's mean time between failures (MTBF) and make it more energy efficient.

The smart control system 400 may include a control device 422 (e.g., microcontroller, microprocessor, or controller collectively "microcontroller" for short). The microcontroller 422 may be connected to the positive and negative conductive elements of a probe device or section, such as devices 160, 260, 310, 2601 or dual-field devices 4601 and 5600 or section 201 that may have a fixed impedance of 50 Ohms, for example (not shown in FIG. 12A). To achieve and maintain a VSWR of 1.5:1 or less, the microcontroller 422 may be operable to automatically measure both the forward RF energy/power (F) and reflected RF energy/power (R) of the positive and negative conductive elements, respectively. From such measurements the microcontroller 422 may be operable to compute a VSWR based on the following relationship:

$$VSWR=(1+\sqrt{(R/F)})/(1-\sqrt{(R/F)})$$

The microcontroller 422 may be operable to store the computed VSWR values as so-called "look up tables" in onboard memory or in associated memory (not shown in FIG. 12A). Upon computing a VSWR value, the microcontroller 422 may be further operable to account for the effects of a given probe device's reactance by controlling an impedance tuning section 425 to 430a to select (e.g., adding, subtracting) an appropriate capacitance to cancel out an inductive reactance, and/or select an appropriate inductance to cancel out capacitive reactance.

System 400 may also include a directional coupling section 404 that is operable to receive an RF signal from an electromagnetic waveform generator 403 and provide forward and reflected power to two RF power sensors 408, 409. RF power sensors 408, 409 may be operable to provide both forward and reverse power linear voltages to the microcontroller 422 via analog-to-digital converter inputs of the microcontroller 422 in order to allow the microcontroller 422 to compute a VSWR based on the forward and reflected voltages.

System 400 may further comprise an impedance tuning section 425 to 430a that includes banks of fixed capacitors $C_1$ to $C_n$ and inductors $L_1$ to $L_n$ (where "n" denotes the last capacitor or inductor in a bank), MOSFET shift registers 427A, 428A and relays 429, 430a. The microcontroller 422 may be operable to configure the tuning section 425 to 430a by, for example, selecting a combination of capacitors and inductors and selecting either the low impedance or the high impedance relay 429, 430a, respectively, to achieve an appropriate VSWR (e.g., low or lowest VSWR).

A signal output from the directional coupling section 404 may be sent to a power limiting section 416 that is operable to reduce the power of the signal, convert the signal to a square wave and feed the so converted signal to a divide by 256-frequency counter 414. The signal output from counter 414 may be sent to a digital input port 418 of the microcontroller 422.

As mentioned before the impedance matching circuitry may be designed to cancel the inductive and/or capacitive reactance components of a probe device or section 160, 201, 260, 310, 2601, 4601 and 5600 so that the only remaining portion of the device's impedance, (Z), is the 50-ohm resistive component. For example, upon determination of the VSWR values, the microcontroller 422 may be operable to instruct the tuning section 425 to 430a to select a combination of capacitors and inductors to achieve an appropriate VSWR (e.g., low or lowest VSWR) to cancel the appropriate inductive and/or capacitive reactance of the probe device or section 160, 201, 260, 310, 2601, 4601 and 5600 so that only a 50-ohm resistive load is applied to the generator 403.

A "wake-up" signal generating section 412 may also be included. Section 412 may be operable to place the microcontroller 422 in a "sleep" mode when the microcontroller 422 is not required to compute a VSWR (e.g., when a previously computed VSWR stored in a look-up table is used), and to "awaken" the microcontroller 422 from a sleep mode in order to prompt the microcontroller 422 to compute a VSWR, for example.

In one embodiment of the invention, the microcontroller 422 may be operable to store specialized instructions (e.g., firmware) in a memory, where the specialized instructions may be used to configure the tuning section 425 to 430a. One such configuration may be used to, for example, minimize the number of tuning adjustments. For example, in one embodiment, the microcontroller 422 may access stored, specialized instructions to complete coarse tuning. In such a case the microcontroller 422 may be operable to send a signal to deactivate the high impedance relay 429 if necessary, and then control the operation of MOSFET shift registers 427A, 428A to select an individual inductor $L_1$ to $L_n$ to determine a matching impedance. Upon selection of a set of inductors $L_1$ to $L_n$, the microcontroller 422 may then be operable to select capacitors $C_1$ to $C_n$ that are associated with a matching impedance, and compute VSWRs. If, upon making such computations, an appropriate VSWR is not computed, the microcontroller 422 may be operable to activate the low impedance relay 430a, and then repeat the selection of inductors $L_1$ to $L_n$, capacitors $C_1$ to $C_n$ and computations.

In one embodiment, upon completion of coarse tuning, the microcontroller 422 may be further operable to complete "fine" tuning of the previously selected inductor and capacitor combinations by further selecting (or de-selecting) such inductors/capacitors, and computing VSWRs to determine whether a desired VSWR or a VSWR of 1.5:1 or lower can be obtained.

In a further embodiment of the invention, system 400 (e.g., microcontroller 422) may be operable to continuously compute VSWR values and compare such computed values to a stored reference VSWR (e.g., 1.5:1). When a comparison indicates a computed VSWR is greater than the stored reference, the microcontroller 422 may initiate or repeat further coarse and fine tuning sequences. Otherwise, the microcontroller 422 may not initiate or repeat such tuning.

In this manner the overall impedance of an electrical circuit comprising a generator, transmission medium (e.g., cable) and device can be matched. Further, the amplitude of the electric and magnetic fields can be maintained at a substantially constant level. Because the amplitudes of the electric and magnetic fields are held constant, the applied electric and magnetic fields will be able to apply optimum Lorentz type forces to unwanted material in a liquid at a corresponding ionic cyclotron frequency of the unwanted material.

The present invention also provides the ability to service or otherwise maintain a liquid transport and treatment system. In one embodiment, the microcontroller 422 may be operable to communicate with a testing apparatus 4000 via connection or channel (collectively "channel") 4000a to allow information about the operation of the system 400 and/or of a plasma device, a generator used with a plasma device, an electromagnetic waveform generator and EM device described elsewhere herein to be communicated to service or maintenance personnel. The following description of the apparatus 4000 may also apply to embodiments of the devices or device sections described in FIGS. 1A through 8A.

In response, testing apparatus 4000 may be operable to exchange specialized instructions with the microcontroller 422 in order to control the operation of system 400, a generator and/or probe device, and/or otherwise obtain the status of system 400, generator or probe device via channel 4000a. The microcontroller 422 may do so via a communications port 423 of the microcontroller 422 to name just one of many ways in which system 400 may communicate with testing apparatus 4000 via channel 4000a. When testing apparatus 4000 comprises a portable or handheld test set, the communications port 423 may comprise a serial port operable to allow for connection of the handheld or otherwise portable test to microcontroller 422 via channel 4000a by service or maintenance personnel. Alternatively, when testing apparatus 4000 comprises a remote station, the communications port 423 may comprise a modem or other necessary electronics necessary to transmit and receive information to/from such a remote station via channel 4000a. Such a remote station may include an interface (e.g., GUI) to permit information exchanged between the system 400, generator and probe device to be viewed or otherwise accessed by service or maintenance personnel.

Figure 12B:
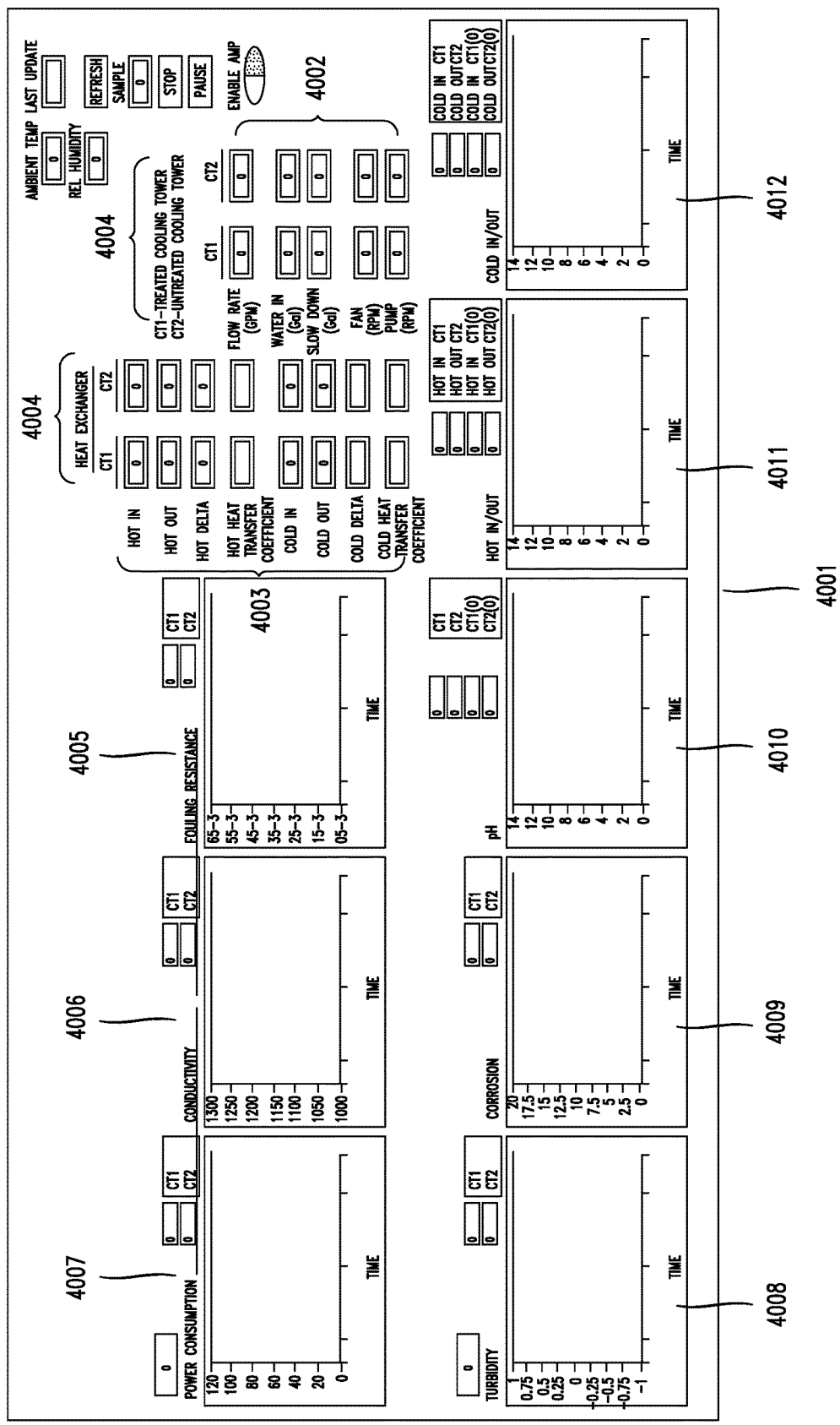
FIGS. 12B and 12C depict exemplary displays that may be generated and displayed in accordance with embodiments of the invention.
Figure 12C:
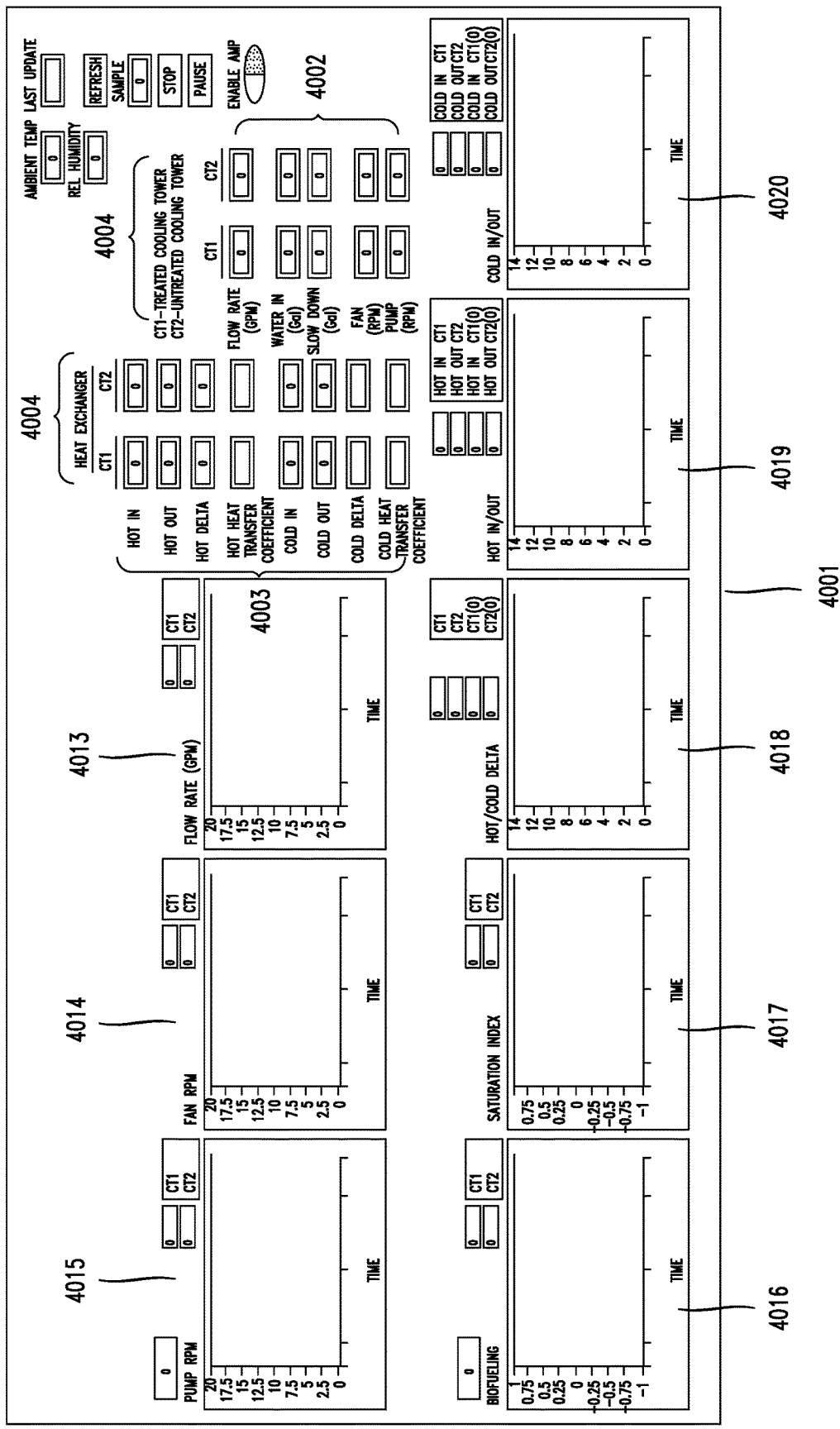

Referring now to FIGS. 12B and 12C, there is depicted exemplary displays of data that may be generated by apparatus 4000. In embodiments of the invention apparatus 4000 may comprise a controller or computer (collectively "controller") operable to generate displays to be displayed by a GUI 4001. Referring first to FIG. 12B, there is depicted exemplary displays that may be generated by the GUI 4001 or one or more similar components capable of displaying data that are a part of apparatus 4000. It should be understood that apparatus 4000 may receive and send (i.e., communicate with) signals and data from, and to, other components of a liquid transport and treatment system (e.g., system 400) other than the microcontroller 422 via channel 4000b. For example, signals and data may be received and/or sent from, and to, a probe device, generator, valve, controllers, thermocouples, sensors and meters (e.g., see the description herein that refers to FIGS. 11A through 11F) appropriately configured to communicate with the apparatus 4000 to name just a few components that may send and and/or receive signals from/to apparatus 4000 via channel 4000b.

In such embodiments apparatus 4000 and GUI 4001 may be located at, or near, a transport or treatment system that is equipped with an inventive device described herein, or their equivalents, or a system that is equipped with other devices for treating unwanted material in a liquid. Alternatively, apparatus 4000 and GUI 4001 may be located remote from such a system. In such a case, the apparatus is operable to communicate remotely with the transport system and inventive devices described herein such as immersible devices and integrated generators and the components associated with such devices via channels 4000a, 4000b.

As illustrated by the data depicted in FIGS. 12B and 12C, apparatus 4000 may be capable of receiving signals from components of a water transport and treatment system in order to collect data and monitor a plurality of parameters associated with characteristics of water and/or associated with the operation of components of such a system.

In FIG. 12B the collected data may be associated with parameters 4002 from cold loops of one or more cooling towers 4004 and data that is associated with parameters 4003 from hot loops from the same cooling towers 4004. In the example depicted in FIGS. 12B and 12C the cooling towers 4004 are a treated cooling tower designated "CT 1" (i.e., a cooling tower that uses an inventive device) and an untreated cooling tower designated "CT 2" (a cooling tower that does not use an inventive device) though this is merely exemplary. Said another way, apparatus 4000 and GUI 4001 may be used with (i.e., connected to) any number of different water treatment systems other than the ones illustrated in FIGS. 12B and 12C.

Continuing, the GUI 4001 may be operable to display data and parameters associated with characteristics of a liquid in a transport system or operation of components of the transport system. For example, in an embodiment the apparatus 4000 may be operable to compute, and the GUI may be operable to display, a fouling resistance and the data and parameters related to such resistance on a chart or graph 4005 that is a part of GUI 4001 as shown in FIG. 12B. The fouling resistance (and its related data and parameters) may be visually displayed in a chart or graph 4005 to name just a few of the many ways such data and parameters may be displayed by GUI 4001 (e.g., tabular or text may be alternative methods). The displayed fouling resistance may be computed, for example, from parameters 4002 and 4003. The data associated with parameters 4002 and 4003 may be detected or otherwise collected by components described elsewhere herein, such as the thermocouples 302a through 302D, valves 303A through 303C, sensors 309A and 309B, meters 316, 318, controllers 307 and 323 and described with reference to FIGS. 11A through 11F to name just a few of the many types of components that may be used to collect the data associated with parameters desired to be computed.

In addition to fouling resistance, apparatus 4000 may be operable to compute, and GUI 4001 may be operable to display, a combination of data parameters as charts or graphs representative of a number of additional measurements, such as conductivity 4006, power consumption 4007, turbidity 4008, corrosion 4009, pH 4010 and temperature 4011,4012 (Hot In/Out, Cold In/Out) of a liquid transport and treatment system to name just a few of the many computations that may be computed by apparatus 4000 and displayed by GUI 4001.

Referring now to FIG. 12C there is depicted additional data and parameters that may be computed by apparatus 4000 and then displayed by GUI 4001 on charts or graphs, for example. As can be seen in FIG. 12C, the parameters may be based on data that is collected from components of a transport system, such as pumps and fans, in addition to data related to a characteristic of water. For example, the exemplary GUI 4001 in FIG. 12C may be operable to display a chart or graph of data and parameters related to pump(s) speed (RPMs) 4015 and, fan speed(s) (RPMs) 4014. In addition, the apparatus 4000 and GUI 4001 may be operable to compute and then display on charts or graphs, for example, a combination of additional data and parameters such as flow rates 4013, biofouling 4016, saturation index 4017, and hot/cold temperature differentials (deltas) 4018 shown in FIG. 12C.

Because apparatus 4000 and GUI 4001 are capable of computing and displaying a wide array of parameters and data related to a transport system it can also be used to improve the overall efficiency of components of such a system. Yet further, the apparatus 4000 and GUI 4001 may be operable to compute and display data and parameters associated with a plasma discharge application device or section.

In additional embodiments of the invention, the data received, and computations generated, by apparatus 4000 may be stored in an associated memory (not shown in FIGS. 12A through 12C) and used as real-time or historical information by apparatus 4000 to further: (a) compute and generate maintenance schedules for components of a transport system, (b) compute and estimate times when failures may occur in the future in such components, and to (c) identify and isolate failures of components in such systems in real-time to name just a few of the many ways in which such collected data and computations may be used. Upon making such computations, a user of apparatus 4000 may be able to more efficiently schedule preventive and/or regularly scheduled maintenance visits by maintenance or service personnel to such a system. That is, instead of scheduling too many or too few maintenance or service visits that result in unnecessary costs or worse, component failures, systems and devices provided by the present invention allow a user to schedule visits in a smarter, more effective manner that may reduce the cost of operating a transport system and reduce the number of unexpected failures of components making up such a system.

In addition to receiving data related to the characteristics of a liquid and/or the operation of components of a water transport system the present inventors provide for means and ways to control such characteristics and components. In embodiments of the invention, upon receiving data, computing parameters and displaying such data and parameters, such as those depicted in FIGS. 12B and 12C, apparatus 4000 may be operable to transmit or otherwise send signals to components of a water transport system via channels 4000a, 4000b in order to control the operation of such components, which, in turn, may control the characteristics of a liquid. In one embodiment, apparatus 4000 may include a central controller that is operable to generate electrical signals based on the data collected and parameters computed and then send such signals to components within the system or to other controllers, such as motor controllers or temperature controllers via channels 4000a, 4000b in order to control the operation of such components and control the characteristics of a liquid in the system. For example, in one embodiment a central controller that is a part of apparatus 4000 may be operable to execute stored instructions in its memory to generate signals associated with data it has received concerning the speed of a pump or fan. Such signals may be sent to a pump or fan directly, or to a motor controller connected to the pump or fan. In either case, such signals, once received by the motor controller, pump or fan may cause a motor that is a part of such a pump or fan to either increase or decrease its speed (RPMs). By changing the speed of a pump or fan the characteristics of a liquid, such as water, may also be affected. For example, the flow rate of water in a system may be effected, which in, turn, may affect other characteristics.

In a similar fashion, the central controller may be operable to send signals to other components of the system via channels 4000a, 4000b in order to effect changes to other characteristics of water and/or to affect the efficiency and overall operation of the system.

Figure 13:
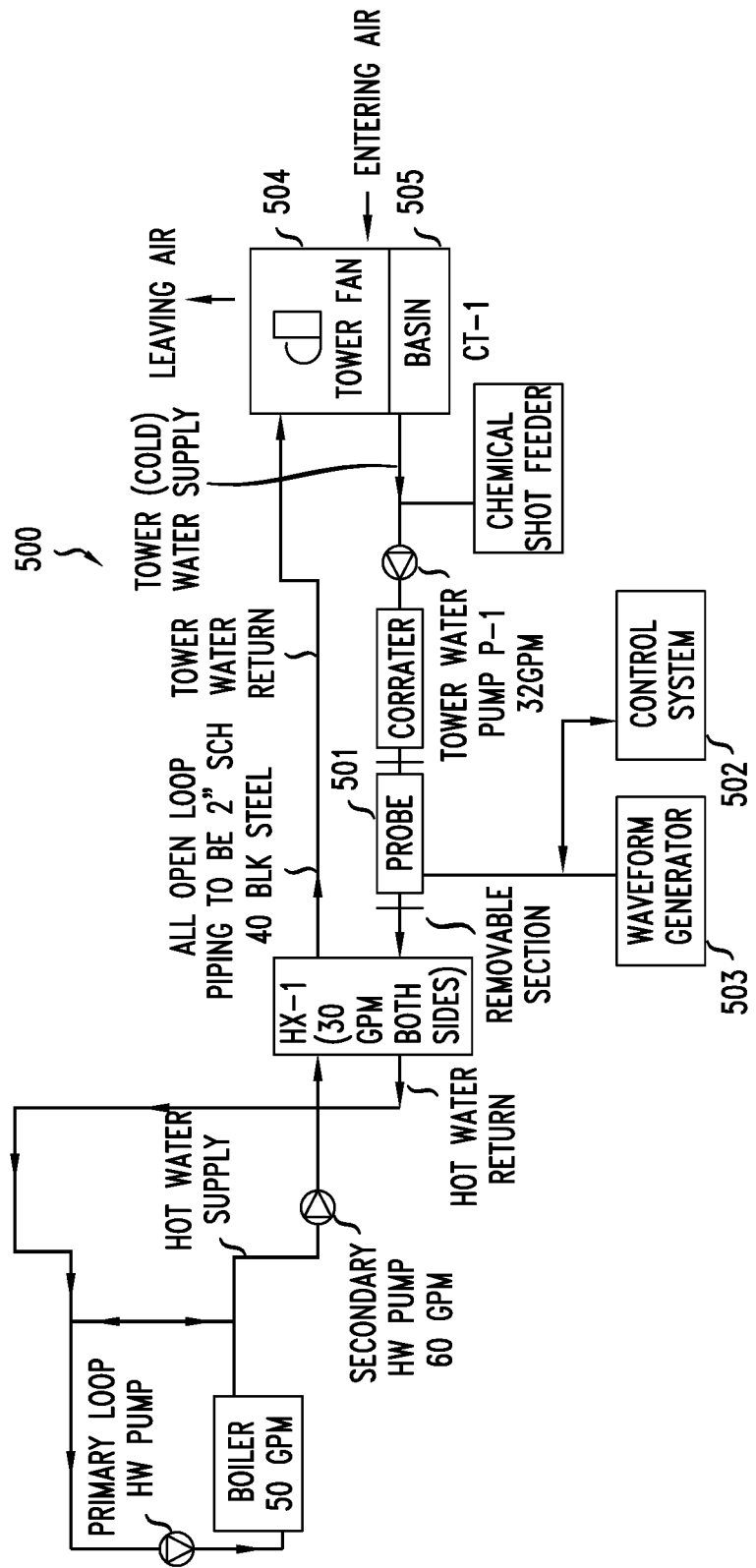
FIG. 13 depicts a block diagram of a cooling tower system in accordance with one embodiment.

FIG. 13 depicts a block diagram of a cooling tower system 500 used, for example, in a data center, industrial and commercial building or complex, and large residential building or complex.

Cooling towers use large amounts of water and other liquids for evaporative cooling. The evaporation process causes some portion of the liquids (e.g., water) to be evaporated, and other portions to remain in a basin 505 of a cooling tower 504. The portions that remain (i.e., are not evaporated) become highly concentrated with solids, such as calcium carbonate (scale), corrosive materials and other unwanted material. To reduce these unwanted materials, the unwanted materials must be periodically removed from the cooling tower 504 by a method referred to as "blow-down". Once some or all of the cooling tower liquid is drained, the original liquid level must be replenished; this includes the liquid lost through evaporation, blow-down, drift, and system leaks. As a result, the total dissolved solids, pH, temperature, and conductivity may be constantly changing, creating a dynamic liquid environment within the cooling tower 504.

In accordance with an embodiment of the invention, system 500 may include an exemplary, integrated inventive probe device 501 or section (e.g., devices/sections 102, 160, 201, 202, 260, 310, 2601, 4601, 5600), smart control system 502 (with impedance matching circuitry) and an integrated exemplary electromagnetic generator 503 in accordance with one embodiment of the invention in order to treat a liquid in cooling tower 504 that contains unwanted material. Though not shown the system 500 may also be connected to a testing apparatus, such as testing apparatus 4000 depicted in FIG. 12A, and may include thermocouples, valves, sensors, meters and controllers (such as those shown in FIGS. 11A through 11F), for example, to allow information about the operation of the system 500 and of its integrated electromagnetic waveform generator, device and smart control system to be communicated to service or maintenance personnel.

In the embodiments described above reference has been made to many different types of devices that are used to detect and collect current data related to the treatment of unwanted material in a liquid in a transport system, such as generators, valves, controllers, thermocouples, sensors and meters, for example (see FIGS. 8A, 11A through 11F and 12A through 12C). In additional embodiments, such collected data may be used by a system to measure an amount of a resource, or resources. Some non-limiting examples of a resource are energy, power, amount of chemicals (e.g., de-scaling chemicals) and device lifetime (e.g., operational lifetime, mean-time-before failure times). These resources may be measured by one of the controllers or computer systems described previously herein, or by a separate controller, computer system or measurement system (collectively "measurement system"). In either case, such a measurement system may be operable to receive data representative of one or more resources that are, or may be, affected by the treatment of unwanted material in a liquid using an inventive system or device described herein, such as a plasma device, immersible, dual-field device or some combination of the two, for example. For the sake of efficiency, the features of such a device/section will not be repeated, it being understood that the features previously described may be incorporated into such a probe device.

The measurement system is typically operated by a user, or an agent of the user (e.g., service or maintenance company, consultant).

Upon receiving such current data, the measurement system may be operable to compare the received, current data to stored, reference data and/or to a threshold level. The stored data may comprise historical data related to the resources associated with the transport system, for example. Yet further, the measurement system may operable to compute: (1) an indication of the difference between an amount of resources currently being used by the transport system based on the current data and the amount of resources previously used by the transport system (or a reference system) based on the historical data; (2); an indication of the difference between device lifetimes of components that are a part of the transport system based on the current data and previous lifetimes of components used in the transport system (or a reference system) based on the historical data; and (3) an indication of the difference between an amount of resources currently being used by the system based on the current data and a threshold amount of resources (e.g., a target or budgeted amount of resources).

Once a computed difference is completed a user may be able to determine a savings in resources, return on investment and/or extended component lifetimes, for example. Such computed differences may also be stored in a database or another memory for future use by the measurement system or other systems.

In addition to users and their agents, it may be desirable to grant additional entities access to the collected data or computed differences. For example, the construction and/or installation of a new transport system that incorporates an inventive device or system described herein, or the retrofit/modification of an existing transport system to include an inventive device or system described herein can be extremely expensive. Accordingly, an investment entity or individual may assist a user in financing the construction or installation of a new transport system that incorporates an inventive device or system described herein, or the retrofit/modification of an existing transport system to include an inventive device or system described herein.

One method of financing such a construction, installation, retrofit or modification includes a re-payment process that is based on the collected data or computed differences. More particularly, in additional embodiments a repayment system may be operable to receive collected data or computed differences representative of one or more resources that are, or may be, affected by the treatment of unwanted material in a liquid using an inventive system or device described herein, such as an immersible plasma device, dual-field device or some combination of the two. Again, for the sake of efficiency the features of such a probe device will not be repeated, it being understood that the features previously described may be incorporated into such a dual-field device.

The repayment system may include a controller or computer system that is operable to receive data and computed differences related to the operation of the transport system. The repayment system may be operated by the entity that financed the construction, installation, retrofit or modification of the water transport system or an agent of such an entity.

Upon receiving collected data or computed differences the repayment system may be further operable to compute a repayment amount. In one embodiment, the repayment amount may be computed by applying a percentage factor to an amount of a computed difference. In embodiments of the invention, the percentage factor may be the same for all resources, or may differ based on the resource that is associated with a computed difference. Alternatively, the repayment amount may be computed by applying a monetary amount to each unit or part thereof of a computed difference and then applying a percentage factor (e.g., 0 to 100%). Still further, the repayment factor may be computed by using a different method that applies a multiplication factor, and/or a percentage factor in another combination of steps.

Once a repayment amount is computed the entity that has financed the construction, installation, retrofit or modification may be able to distribute the repayment amounts to one or more investment entities or apply the amounts to one or more financial instruments. Such computed repayment amounts may also be stored in a database or another memory for future use by the repayment system or other systems.

In embodiments of the invention, one or both of the computed differences and repayment amounts may be proportional to the amount of unwanted material in a liquid that is treated by an inventive device described herein, such as a plasma device, dual-field device, or some combination of the two for example.

Figure 14:
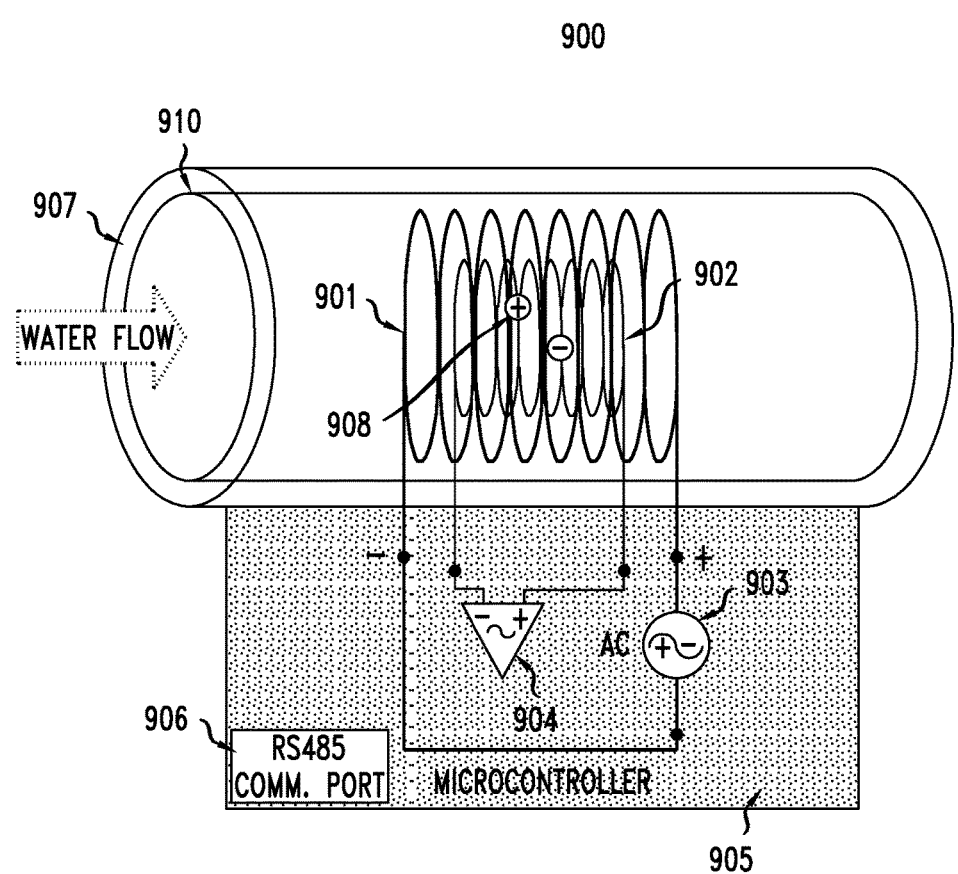
FIG. 14 depicts another device that may be used to detect and determine unwanted material according to an embodiment of the invention.

Referring now to FIG. 14 there is depicted a susceptibility device 900 is operable to detect and determine the type of trace elements or minerals in a liquid, such as water that form unwanted material (such as scale) in order to determine the appropriated ionic cyclic frequency. Because scale forming trace elements (ions) have different charges and masses, selecting the appropriate ionic cyclotron frequency value for a particular trace element or mineral.

Minerals may be categorized as magnetic if they cause magnetic induction in the presence of a magnetic field. In embodiments of the invention, device 900 makes use of this phenomena to detect and determine the types of trace elements and minerals in a liquid. Mineral magnetism (M) is related to the applied field strength (H) by the equation M=$\chi$H; where $\chi$ is the magnetic susceptibility of the material. It is a dimensionless quantity which expresses the efficiency with which trace elements may be magnetized.

All mineral substances exhibit magnetic susceptibility at temperatures above absolute zero. Accordingly, device 900 is operable to detect different types of scales based on magnetic susceptibility. The principal types of interaction of a substance with a magnetic field are classified into five major divisions: diamagnetism, para-magnetism, ferro-magnetism, ferri-magnetism and anti-ferromagnetism. The device 900 uses the aforementioned magnetic phenomenon to determine the types of scale formation deposits, which comes in several forms.

For example, inorganic scale deposits are mostly from aqueous supersaturated type solutions, with cooling tower make-up water being one such type. In the petroleum industry, scale can be mineral, chemical, or organic type (as in the case of crude oil compounds) formed as a result of fluid-fluid (and fluid-substrate) interactions leading generally to their super-saturation. The two most common types of Ca scale found in hydrocarbon fields are calcium carbonate ($CaCO_3$) and calcium sulphate ($CaSO_4$).

Most inorganic scales can be classified by the anion type in one of the following seven classes:

The carbonate scales—formed by cations and bicarbonate ($HCO_3^-$) ion precipitation in fluids, and include $CaCO_3$ and $FeCO_3$.

The sulphate scales—formed as a result of precipitation of cations and sulphate ions ($SO_4^{2-}$), which includes $BaSO_4$, $SrSO_4$, and $CaSO_4$.

The sulphide scales—formed by cations and sulphide ($S^{2-}$) ion precipitation, for example $FeS$, $FeS_2$, $PbS$, and $ZnS$.

The chloride scales—formed mainly by brine evaporation and sodium (Na) and chloride (Cl) ion precipitation, yielding $NaCl$.

The fluoride scales—caused by reaction of cations and fluoride ($F^-$) ions, including $CaF_2$ and $FeF_2$.

The aluminum-silicon group of scales—formed by reaction of cation-silicon or aluminum-silicon elements.

Native scales—formed exclusively by native cations or cation covalent bonds, including $Pb$, $SiO_2$.

Magnetic susceptibility is the ratio of the intensity of magnetization to the applied magnetic field strength. The magnetic susceptibility mathematically equals:

$$\chi = \frac{M}{H}$$

Where (M) is the magnetization of the material (magnetic dipole moment per unit volume), and (H) is the magnetic field strength measured in amperes per meter. The volume susceptibility is given as:

$$\chi_v = \frac{M}{H}$$

Where $X_v$ is the volume susceptibility and M is the magnetization per unit volume. The molar susceptibility is the third type of susceptibility and is defined as:

$$\chi_{mol} = \frac{M\chi_v}{\rho}$$

Where ρ is density.

Magnetic susceptibility is dimensionless while M and H are in amperes per meter (A/m). A linear relationship exists between magnetization and magnetic field strength, as a result, a linear relationship also exists between magnetic induction (B) and field strength (H) as shown below:

$$B = \mu H$$

Where μ is the magnetic permeability. The magnetic permeability (p) can be expressed mathematically as:

$$\mu/\mu_o = 1 + \chi$$

Where $\mu_o$ is magnetic permeability of air. Magnetic induction (B) is measured in Tesla (T) and its dimension in SI units is Newton per ampere-meter (N/Am). There are two other expressions used to demonstrate the relationship between B, J and H as follows:

$$B = \mu_o(J+H)$$

$$B = \mu_o(1+\chi)H$$

Generally, materials are paramagnetic, diamagnetic or ferromagnetic (ferro- and ferrimagnetic). Materials with positive susceptibility (χ) where (1+χ)>1 are called paramagnetic materials. This means the applied magnetic field is strengthened by the presence of the material. Molecularly speaking, it is the nature of the electrons in the material that determines the magnetic properties of the material. Since free electrons add to magnetic forces, a material becomes paramagnetic when the number of free unpaired electrons is high. In instances where susceptibility (χ) is negative, that is where (1+χ)<1, the material is said to be diamagnetic. When such is the case, the magnetic field is weakened by the presence of the diamagnetic material. Molecularly, the material lacks free unpaired electrons.

The measurement of magnetic susceptibility is achieved by quantifying the change of force felt upon the application of a magnetic field to a substance, in this case, trace elements. For trace elements in aqueous samples, the magnetic susceptibility is measured from the dependence of the natural magnetic resonance (NMR) frequency of the trace element on its shape and or orientation.

Accordingly, device 900 may be operable to apply a uniform alternating field produced by a transmitting coil 901 carrying an alternating current. A pickup coil consisting of an inner winding, 902 is placed at the center of the transmitting coil. Known trace elements specimens are placed at the center of the pickup coil for calibration purposes using distilled as the aqueous medium. The trace elements cause an induced voltage output because of its closer coupling with the pick-up coil. By using a low-noise, high-gain amplifier 904, the pickup coil induced voltage is amplified and digitized by the micro-controller. The magnetic susceptibility values for each trace element are stored in the microcontroller's memory look-up table.

The device 900 may be installed in a cooling tower makeup water path or an oil field well, for example. The transmitting coil of device 900 may be energized, and the pickup coil's induced voltages may be detected and then compared to stored look-up table trace element values by a microcontroller. By constantly measuring the pick-up coil induce voltage and comparing it with known trace elements look-up table induced voltages the device 900 may be operable to determine the type of trace elements or minerals in a liquid, such as in a cooling tower's make-up water or oil field well. Once trace elements or minerals are determined by a combination of device 900 and the microcontroller, this information may be used by the microcontroller in order to adjust the operating frequency and modulation frequency of a generator in order to optimize the treatment of the trace element or mineral (i.e., unwanted material) in a liquid (e.g., insure the modulation frequency corresponds to the ionic cyclotron frequency of the determined trace element of mineral). The microcontroller and generator (as well as other microcontrollers and generators described herein) may be connected via a communication bus.

It should be apparent that the foregoing describes only selected embodiments of the invention. Numerous changes and modifications may be made to the embodiments disclosed herein without departing from the general spirit and scope of the invention. For example, though water has been the liquid utilized in the description herein, other suitable liquids may be used such as those used in the heating and/or cooling systems of buildings or those transported in the petrochemical industry. That is, the inventive devices, systems and methods described herein may be used to partially or substantially treat these other liquids as well. Further, though the inventive devices and systems described herein are described as being used in non-living systems (e.g., an industrial water transport system) the scope of the present invention is not so limited. In additional embodiments the devices and systems described herein may be modified for use in treating unwanted material in the human bloodstream, for example. In more detail, inventive devices may be miniaturized for insertion into the human bloodstream, related organs, or circulatory system (collectively "circulatory system") or digestive system, using a catheter, scope, surgical tool or other types of insertion devices. Structurally, the inventive devices may be formed as a stent or as a part of a stent to name just one example of an exemplary structure. Operationally, the inventive devices and associated generators may be modified to operate at frequencies that correspond to the ionic cyclotron frequencies of targeted, unwanted material in the circulatory or digestive system such as salts, fats, sugars, or cancer causing cells, for example.

What is claimed is:

1. A system for treating unwanted material in a liquid comprising:
    a dual-field electromagnetic device (EM) section comprising,
        an immersible magnetic field section operable to generate a time-varying magnetic field and an induced electric field in a liquid, and
        an immersible electric field section operable to generate a time-varying electric field, and an induced magnetic field in the liquid; and a plasma discharge section comprising,
   a plurality of immersible and parallel, dielectric barrier discharge elements, where the number of elements varies based on a desired mass flow rate, and each element comprises negatively charged and positively charged electrodes operable to generate one or more plasma discharges within the liquid to create reactive and molecular species of ions in the liquid.

2. The system as in claim 1 wherein the plurality of immersible and parallel, dielectric barrier discharge elements comprises double dielectric barrier discharge elements or single dielectric barrier discharge elements.

3. The system as in claim 1 wherein each of the plurality of dielectric barrier discharge elements comprises an isolation section operable to physically separate and electrically isolate the electrodes and create channels within each element.

4. The system as in claim 1 wherein the immersible electric field section comprises at least two immersible elements, wherein one of the elements is a positively charged element and the other element is a negatively charged element.

5. The system as in claim 4 wherein the at least two immersible elements are cylindrically shaped.

6. The system as in claim 1 wherein the immersible magnetic field section is further operable to generate a time-varying magnetic field modulated at an ionic cyclotron frequency of an unwanted material in a liquid, and the immersible electric field section is further operable to generate a time-varying electric field modulated at the ionic cyclotron frequency.

7. The system as in claim 6 wherein the unwanted material is one or more ions of calcium carbonate, a bacteria or biological contaminant.

8. The system as in claim 1 further comprising:
   impedance matching circuitry operable to,
      maintain an impedance of the dual-field EM device, a signal generator and a transmission medium connecting the EM device and generator at a matched impedance, and
      maintain a constant amplitude of an electric field created by the electric field section and a constant amplitude of a magnetic field created by the magnetic field section.

9. A system for treating unwanted material in a liquid comprising:
   a dual-field EM device section, the EM device section comprising an immersible magnetic field section operable to generate a time-varying magnetic field modulated at an ionic cyclotron frequency of unwanted material in a liquid and an induced electric field, and apply the time varying magnetic field and induced electric field to unwanted material in a liquid, and an immersible electric field section operable to generate a time-varying electric field modulated at the ionic cyclotron frequency, and an induced magnetic field, and apply the time-varying electric field and induced magnetic field to the unwanted material at the same time as the magnetic field section is applying the generated magnetic field and the induced electric field;
   a plasma discharge section comprising a plurality of immersible and parallel, dielectric barrier discharge elements, where the number of elements varies based on a desired mass flow rate, and each element comprises negatively charged and positively charged electrodes operable to generate one or more plasma discharges within the liquid to create reactive and molecular species of ions in the liquid; and
   a signal generator operable to output a time-varying signal modulated at the ionic cyclotron frequency to the immersible magnetic field section and the immersible electric field section of the dual-field EM device section.

10. The system as in claim 9 wherein the plurality of immersible and parallel, dielectric barrier discharge elements comprises double dielectric barrier discharge elements or single dielectric barrier discharge elements.

11. The system as in claim 9 wherein each of the plurality of dielectric barrier discharge elements comprises an isolation section operable to physically separate and electrically isolate the electrodes and create channels within each element.

12. The system as in claim 9 wherein the unwanted material is one or more ions of calcium carbonate, a bacteria or biological contaminant.

13. The system as in claim 9 wherein the signal generator is further operable to output an oscillating or uniform time-varying signal modulated at the ionic cyclotron frequency to the immersible magnetic field section.

14. The system as in claim 13 wherein the signal generator is an integrated signal generator and is further operable to generate or adjust a carrier frequency, percentage of modulation, modulation frequency, modulation waveform, output gain or offset levels of the time-varying signal.

15. The system as in claim 9 further comprising a controller operable to determine a carrier frequency of the time-varying signal and a modulation signal corresponding to the ionic cyclotron frequency, and control the signal generator to output the time-varying signal at the determined carrier frequency and including the determined modulation signal.

16. The system as in claim 9 wherein the controller is further operable to determine a percentage of modulation, a modulation frequency of the modulation signal, modulation waveform of the modulation signal, output gain or offset levels of the time-varying signal, and control the signal generator to output the time-varying signal and the modulation signal using the determined percentage of modulation, modulation frequency, modulation waveform, output gain and offset levels.

17. The system as in claim 9 further comprising a graphical user interface (GUI) for displaying a combination of a fouling resistance, conductivity, power consumption, turbidity, corrosion, pH, and temperatures of the liquid and pump speeds, fan speeds, flow rates, biofouling, saturation index, hold/cold temperature differentials of components of the system used to treat the liquid, and parameters and data associated with the plasma discharge section.

18. The system as in claim 17 wherein the GUI is part of an apparatus that communicates remotely with the signal generator.

19. The system as in claim 9 further comprising:
   impedance matching circuitry operable to,
      maintain an impedance of the EM device section, the generator and a transmission medium connecting the EM device section and generator at a matched impedance, and
      maintain a constant amplitude of the electric field and a constant amplitude of the magnetic field.

* * * * *